United States Patent

Kumada

[11] Patent Number: 5,825,994
[45] Date of Patent: Oct. 20, 1998

[54] IMAGE PROCESSING METHOD AND APPARATUS

[75] Inventor: Shuichi Kumada, Yokohama, Japan

[73] Assignee: Canon Kabushiki Kaisha, Tokyo, Japan

[21] Appl. No.: 911,664

[22] Filed: Jul. 8, 1992

[30] Foreign Application Priority Data

| Jul. 9, 1991 | [JP] | Japan | 3-168307 |
| Jul. 9, 1991 | [JP] | Japan | 3-168308 |
| Jul. 9, 1991 | [JP] | Japan | 3-168319 |
| Jun. 25, 1992 | [JP] | Japan | 4-167718 |

[51] Int. Cl.$^6$ ................................ G06F 15/00
[52] U.S. Cl. .......................... 395/116; 395/117
[58] Field of Search ................... 395/117, 116, 395/115, 110, 109, 108, 105, 164, 103, 114, 102, 101, 501; 358/453, 452, 296, 406, 434, 438, 502, 504, 515, 523, 524, 539; 345/501; 347/5, 43; 382/232

[56] References Cited

U.S. PATENT DOCUMENTS

| 4,590,585 | 5/1986 | Cummings et al. | 395/275 |
| 4,660,029 | 4/1987 | Hovda et al. | 395/164 |
| 4,752,894 | 6/1988 | Deering et al. | 395/103 |
| 4,778,288 | 10/1988 | Nakamura | 400/76 |
| 4,841,453 | 6/1989 | Finlay et al. | 395/110 |
| 4,893,257 | 1/1990 | Dominiquez, Jr. et al. | 395/116 |
| 4,939,669 | 7/1990 | Nishino | 395/117 |
| 5,018,081 | 5/1991 | Yamaguchi et al. | 395/113 |

FOREIGN PATENT DOCUMENTS

| 0167166 | 1/1986 | European Pat. Off. . |
| 0253078 | 1/1988 | European Pat. Off. . |
| 3244653 | 7/1983 | Germany . |

OTHER PUBLICATIONS

IBM Technical Disclosure Bulletin, Tokunaga, "Variable Image Generation Cycle in Page Printer", vol. 26, No. 4, pp. 2043–2045, Sep. 1983.

IBM Technical Disclosure Bulletin, "Improved Graphic Printing on a Text and Graphics Printer", vol. 29, No. 1, pp. 12–13, Jun. 1986.

Primary Examiner—Arthur G. Evans
Assistant Examiner—Dov Popovici
Attorney, Agent, or Firm—Fitzpatrick, Cella, Harper & Scinto

[57] ABSTRACT

An image processing system for receiving a coded record information in units of pages for use with a recording head includes a method and apparatus for (1) analyzing the received coded record information to derive a minimum band number and a maximum band number of a band in which an object image represented by the coded record information exists, the band having a height which is an integer multiple of a height of the record head, (2) storing the derived minimum band number and the maximum band number for each object image, (3) comparing the stored minimum band number and the maximum band number with a current band number to obtain a comparison result, and (4) determining, in response to the obtained comparison result, whether the object image is to be developed into dot data in the band.

23 Claims, 103 Drawing Sheets

FIG. 4

| COMMAND NO. | THE NO. OF DATA | Y | M | C | Bk |
|---|---|---|---|---|---|

FIG. 5

| COMMAND NO. | THE NO. OF DATA | CENTER (x) | CENTER (y) | RADIUS |
|---|---|---|---|---|

FIG. 6

| COMMAND NO. | THE NO. OF DATA | Y | M | C | Bk |
|---|---|---|---|---|---|

FIG. 7

| COMMAND NO. | THE NO. OF DATA | $x_c$ | $y_c$ | r |
|---|---|---|---|---|

| COMMAND NO. | 3 | 150 | 150 | 50 |
|---|---|---|---|---|

| COMMAND NO. | 3 | 1770 | 2950 | 590 |

| COMMAND NO. | 4 | 255 | 0 | 0 | 0 |

FIG. 20

| | RETREAT AREA | VARIABLE AREA |
|---|---|---|
| POINTER → | LINE WIDTH | lwidth |
| | LINE COLOR | lymck |
| | PAINT COLOR | fymck |
| | CHR COLOR | tymck |
| | CLIP AREA | dspxmi |
| | CLIP AREA | dspymi |
| | CLIP AREA | dspxmx |
| | CLIP AREA | dspymx |
| | PAINT PATTERN | fpat |
| | PRESENCE/ABSENCE OF OUTLINE | fpevmt |
| | ⋮ | |
| m-1 | | |
| m | | |

FIG. 27A

| COMMAND NO. | THE NO. OF DATA | KIND FLAG | R | G | B |
|---|---|---|---|---|---|

| COMMAND NO. | THE NO. OF DATA | KIND FLAG | L* | a* | b* |
|---|---|---|---|---|---|

| COMMAND NO. | THE NO. OF DATA | KIND FLAG | Y | M | C | Bk |
|---|---|---|---|---|---|---|

| COMMAND NO. | THE NO. OF DATA | LINE WIDTH |
|---|---|---|

FIG. 28B

| COMMAND NO. | THE NO. OF DATA | MIN. (x) | MIN. (y) | MAX. (x) | MAX. (y) |
|---|---|---|---|---|---|

FIG. 28C

| COMMAND NO. | THE NO. OF DATA | PAINT PATTERN NO. | OUTLINE FLAG |
|---|---|---|---|

FIG. 29

| COMMAND NO. | THE NO. OF DATA | x IN COORDI-NATES 1 | y IN COORDI-NATES 1 | x IN COORDI-NATES 2 | y IN COORDI-NATES 2 | ... | x IN COORDI-NATES n | y IN COORDI-NATES n |

FIG. 30A

| COMMAND NO. | THE NO. OF DATA | CENTER (x) | CENTER (y) | RADIUS |

FIG. 30B

| COMMAND NO. | THE NO. OF DATA | DRAWING POSITION (x) | DRAWING POSITION (y) | CHR DATA |

FIG. 31

| | | COMMAND NO. |
|---|---|---|
| POINTER → | JUMP ADDRESS TO LINE-DRAWING-COMMAND-ANALYSIS FUNCTION | 0 |
| | JUMP ADDRESS TO POLYGON-DRAWING-COMMAND-ANALYSIS FUNCTION | 1 |
| | JUMP ADDRESS TO CIRCLE-DRAWING-COMMAND-ANALYSIS FUNCTION | 2 |
| | JUMP ADDRESS TO CHR-DRAWING-COMMAND-ANALYSIS FUNCTION | 3 |
| | ⋮ | |
| | JUMP ADDRESS TO LINE-WIDTH-DESIGNATION-COMMAND-ANALYSIS FUNCTION | 10 |
| | JUMP ADDRESS TO LINE-COLOR-DESIGNATION-COMMAND-ANALYSIS FUNCTION | 11 |
| | JUMP ADDRESS TO PAINT-COLOR-DESIGNATION-COMMAND-ANALYSIS FUNCTION | 12 |
| | JUMP ADDRESS TO CHR-COLOR-DESIGNATION-COMMAND-ANALYSIS FUNCTION | 13 |
| | JUMP ADDRESS TO CLIP-AREA-DESIGNATION-COMMAND-ANALYSIS FUNCTION | 14 |
| | JUMP ADDRESS TO PAINT-DEFINITION-DESIGNATION-COMMAND-ANALYSIS FUNCTION | 15 |
| | ⋮ | |
| | | n-1 |
| | | n |

$$X = X_n \left(\frac{L^* + 16}{116} + \frac{a^*}{500}\right)^3 \quad \text{(a)}$$

$$Y = \begin{cases} Y_n \left(\frac{L^* + 16}{116}\right)^3 & (L^* > 8) \quad \text{(b)} \\ Y_n \dfrac{L^*}{903.3} & (L^* < 8) \quad \text{(c)} \end{cases}$$

$$Z = Z_n \left(\frac{L^* + 16}{116} - \frac{b^*}{200}\right)^3 \quad \text{(d)}$$

FIG. 41

$$\begin{pmatrix} R \\ G \\ B \end{pmatrix} = \begin{pmatrix} 3.497 & -1.734 & -0.543 \\ -1.065 & 1.975 & 0.034 \\ -0.055 & -0.197 & 1.051 \end{pmatrix} \begin{pmatrix} X \\ Y \\ Z \end{pmatrix}$$

FIG. 42

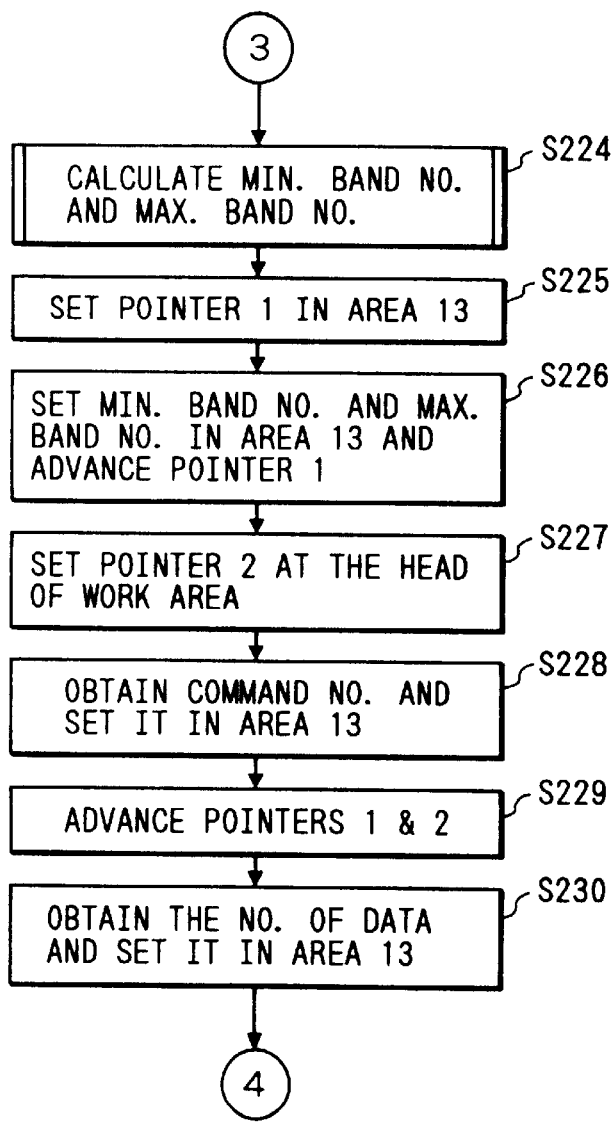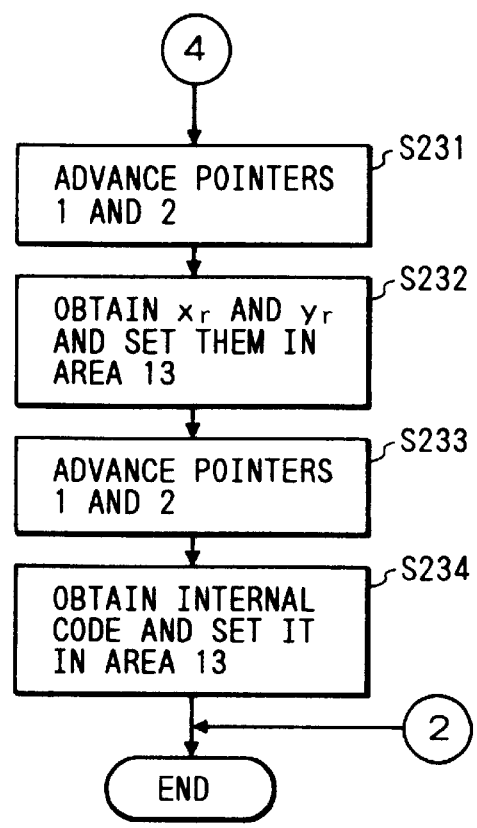

| COMMAND NO. | THE NO. OF DATA | Y-VALUE | M-VALUE | C-VALUE | Bk-VALUE |
|---|---|---|---|---|---|
| | | | | | |

FIG. 82A

| MIN. BAND NO. | MAX. BAND NO. | COMMAND NO. | THE NO. OF DATA | LINE WIDTH |
|---|---|---|---|---|

FIG. 82B

| MIN. BAND NO. | MAX. BAND NO. | COMMAND NO. | THE NO. OF DATA | CLIP Xmin | CLIP Ymin | CLIP Xmax | CLIP Ymax |
|---|---|---|---|---|---|---|---|

FIG. 82C

| MIN. BAND NO. | MAX. BAND NO. | COMMAND NO. | THE NO. OF DATA | PAINT PATTERN NO. | OUTLINE FLAG |
|---|---|---|---|---|---|

FIG. 83A

| MIN. BAND NO. | MAX. BAND NO. | COMMAND NO. | THE NO. OF DATA | x1 | y1 | x2 | y2 | ------ | xn | yn |
|---|---|---|---|---|---|---|---|---|---|---|

FIG. 83B

| MIN. BAND NO. | MAX. BAND NO. | COMMAND NO. | THE NO. OF DATA | x1 | y1 | x2 | y2 | ------ | xn | yn | x1 | y1 |
|---|---|---|---|---|---|---|---|---|---|---|---|---|

FIG. 84A

| MIN. BAND NO. | MAX. BAND NO. | COMMAND NO. | THE NO. OF DATA | $x_c$ | $y_c$ | RADIUS |
|---|---|---|---|---|---|---|

FIG. 84B

| MIN. BAND NO. | MAX. BAND NO. | COMMAND NO. | THE NO. OF DATA | $x_r$ | $y_r$ | INTERNAL CODE |
|---|---|---|---|---|---|---|

FIG. 86A

PAINT DEFINITION DESIGNATION

| 0 | 3 | 15 | 2 | 0 | 1 |

FIG. 86B

LINE WIDTH DESIGNATION

| 0 | 3 | 10 | 1 | 1 |

FIG. 86C

LINE COLOR DESIGNATION

| 0 | 3 | 11 | 4 | 0 | 0 | 0 | 255 | 0 |

FIG. 86D

CIRCLE DRAWING

| 1 | 2 | 2 | 3 | xc | yc | r |

FIG. 87A
PAINT DEFINITION DESIGNATION

| 0 | 3 | 15 | 2 | 1 | 0 |
|---|---|----|---|---|---|

FIG. 87B
PAINT COLOR DESIGNATION

| 0 | 3 | 12 | 4 | 0 | 255 | 0 |
|---|---|----|---|---|-----|---|

FIG. 87C
POLYGON DRAWING

| 0 | 1 | 1 | 8 | x1 | y1 | x2 | y2 | x3 | y3 | x1 | y1 |
|---|---|---|---|----|----|----|----|----|----|----|----|

FIG. 87D
CHR COLOR DESIGNATION

| 0 | 3 | 13 | 4 | 255 | 0 | 0 |
|---|---|----|---|-----|---|---|

FIG. 87E
CHR DRAWING

| 3 | 3 | 3 | 3 | xr | yr | INTERNAL CODE |
|---|---|---|---|----|----|---------------|

FIG. 89A

| 0 | 3 | 10 | 1 | 3 |
|---|---|----|---|---|

LINE WIDTH DESIGNATION

FIG. 89B

| 0 | 3 | 11 | 4 | 255 | 255 | 0 |
|---|---|----|---|-----|-----|---|

LINE COLOR DESIGNATION

FIG. 89C

| 0 | 3 | 14 | 4 | Cxmin | Cymin | Cxmax | Cymax |
|---|---|----|---|-------|-------|-------|-------|

CLIP AREA DESIGNATION

FIG. 89D

| 1 | 2 | 0 | 8 | $x_1$ | $y_1$ | $x_2$ | $y_2$ | $x_3$ | $y_3$ | $x_4$ | $y_4$ |
|---|---|---|---|-------|-------|-------|-------|-------|-------|-------|-------|

LINE DRAWING

FIG. 90

| | COMMAND NO. |
|---|---|
| POINTER → JUMP ADDRESS TO LINE-DRAWING FUNCTION | ------ 0 |
| JUMP ADDRESS TO POLYGON-DRAWING FUNCTION | ------ 1 |
| JUMP ADDRESS TO CIRCLE-DRAWING FUNCTION | ------ 2 |
| JUMP ADDRESS TO CHR-DRAWING FUNCTION | ------ 3 |
| ⋮ | |
| JUMP ADDRESS TO LINE-WIDTH-DESIGNATION FUNCTION | ------ 10 |
| JUMP ADDRESS TO LINE-COLOR-DESIGNATION FUNCTION | ------ 11 |
| JUMP ADDRESS TO PAINT-COLOR-DESIGNATION FUNCTION | ------ 12 |
| JUMP ADDRESS TO CHR-COLOR-DESIGNATION FUNCTION | ------ 13 |
| JUMP ADDRESS TO CLIP-AREA-DESIGNATION FUNCTION | ------ 14 |
| JUMP ADDRESS TO PAINT-DEFINITION-DESIGNATION FUNCTION | ------ 15 |
| ⋮ | |
| | ------ n-1 |
| | ------ n |

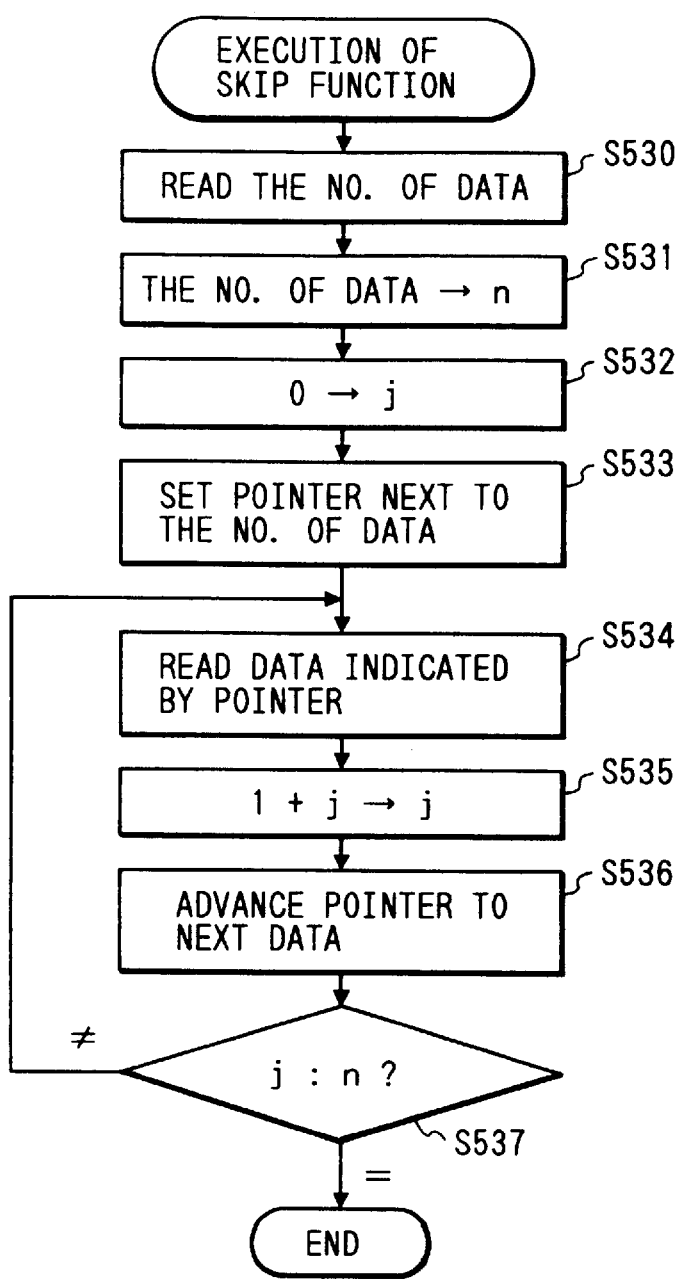

IMAGE PROCESSING METHOD AND APPARATUS

BACKGROUND OF THE INVENTION

1. Field of the Invention

The present invention relates to an image processing method and apparatus, which can perform a color print operation of characters, figures, raster images, and the like on the basis of print data, commands, and the like supplied from a host computer.

2. Related Background Art

FIG. 1 shows an example of a coordinate system (to be referred to as a user coordinate system hereinafter) serving as a reference for coordinate points to be designated when figures, characters, and the like are drawn using a PDL (Page Description Language) or page description commands.

A hatched rectangular portion indicates an effective print area (a drawing enable area in a sheet). As shown in FIG. 1, the length of the effective print area will be referred to as an effective print area height hereinafter, and the width of the effective print area will be referred to as an effective print area width hereinafter.

The coordinate system shown in FIG. 1 is a two-dimensional x-y orthogonal coordinate system, and as an origin as the lower left corner of the effective print area, as shown in FIG. 1.

Any coordinate unit (e.g., 0.01 mm or $1/72$ inch) can be arbitrarily set in this coordinate system.

Description elements of the PDL and page description commands for, e.g., figure drawing, which are set on the basis of the above-mentioned user coordinate system, are analyzed in an image processing apparatus in the reception order, and are converted into information to be developed onto a memory.

FIG. 2 shows an example of a coordinate system (to be referred to as a printer coordinate system hereinafter) serving as a reference when the above-mentioned memory development information is generated.

The coordinate unit of this coordinate system is determined by the resolution of an image processing apparatus (for example, when the resolution is 300 dpi, the coordinate unit is $1/300$ inch).

A hatched rectangular portion is the same as the effective print area shown in FIG. 1.

This coordinate system is a two-dimensional x-y orthogonal coordinate system, and has an origin as the upper left corner of the effective print area.

FIG. 3 shows an example of a memory map of an internal RAM area in a conventional image processing apparatus for performing a color print operation on the basis of the PDL or page description commands.

The RAM area is constituted by a system work memory, a reserved area, and page development memories (each having a size corresponding to the effective print area shown in FIG. 2) for Y (yellow), M (magenta), C (cyan), and Bk (black) as coloring agents (toners or inks).

The system work memory is used as a storage area of information (e.g., variables) used in control in the image processing apparatus, and a permanent work area.

The reserved area is used as an area for storing memory development information, a character cache memory, and the like.

FIG. 4 shows an example of a line color designation command of drawing attribute designation commands.

This command is used for designating a color of a line or an outline of a figure.

A command No. varies depending on the drawing attribute designation commands, and is used for identifying each command function.

The content of a number-of-data parameter indicates the number of data input after the number-of-data parameter.

In this case, the content of the number-of-data parameter of the line color designation command is 4.

Y-, M-, C-, and Bk-values respectively indicate density data values of Y (yellow), M (magenta), C (cyan), and Bk (black) as primary colors of coloring agents.

FIG. 5 shows an example of a circle drawing command of drawing commands.

A command No. varies depending on the drawing attribute designation commands, and is used for identifying each command function.

The content of a number-of-data parameter indicates the number of data input after the number-of-data parameter.

In this case, the content of the number-of-data parameter of the circle drawing command is 3.

The x- and y-coordinates of the center are those on the user coordinate system.

An actual radius is calculated by multiplying a coordinate unit of the user coordinate system with a "radius" value.

FIG. 6 shows an example of memory development information generated by analyzing the line color designation command shown in FIG. 4.

A command table No. is used for identifying each memory development information. Other parameters are the same as those in FIG. 4.

FIG. 7 shows an example of memory development information generated by analyzing the circle drawing command shown in FIG. 5.

A command table No. is used for identifying each memory development information. Values xc and yc represent the coordinates of the center of a circle on the printer coordinate system.

A value r represents a radius value converted to have the resolution of the image processing apparatus as a unit.

FIG. 8 shows a case wherein on the user coordinate system shown in FIG. 1, the coordinate unit is set to be 1 mm, and drawing of a circle having coordinates (150, 150) of the center and a radius of 50 is set.

FIG. 9 shows an example of a command issued when the circle drawing operation shown in FIG. 8 is set.

FIG. 10 shows a case wherein the circle drawing operation on the user coordinate system shown in FIG. 8 is converted into a circle drawing operation on the printer coordinate system having a coordinate unit=$1/300$ inch (about $1/11.8$ mm).

As shown in FIG. 10, the effective print area height is set to be 400 mm.

The x-coordinate of the center is 1,770 (150×11.8), the y-coordinate is 2,950 (250×11.8), and the radius is 590 (50×11.8).

FIG. 11 shows an example of memory development information of the circle drawing operation shown in FIG. 10, which information is generated by analyzing the circle drawing command shown in FIG. 9.

FIG. 12 shows an example of a line color designation command issued when the circle drawing operation shown in FIG. 8 is performed using yellow (a color corresponding to the coloring agent at a density of 100%).

Note that each of the Y-, M-, C-, and Bk-values falls within a range of 0 to 255. In this case, the Y-value is 255, and other values are 0.

As described above, in control of a conventional image processing apparatus for performing a color print operation on the basis of the PDL or page description commands, development memories each having a size corresponding to the effective print area of a sheet are used for Y (yellow), M (magenta), C (cyan), and Bk (black) as coloring agents of toners or inks.

However, the conventional apparatus suffers from the following drawbacks.

(1) When color print control is performed based on the PDL or page description commands in, e.g., an ink-jet printer which can interrupt recording at a halfway position of a sheet, and can restart recording, Y, M, C, and Bk memories each having a size corresponding to the effective print area of a sheet need not always be required, and the memory cannot be efficiently utilized.

(2) Since recording is started after all the page description elements or page description commands for recording one page are analyzed, and figures, characters, or the like are developed onto a memory, it takes much time for drawing.

(3) When color print control is performed based on the PDL or page description commands in, e.g., an ink-jet printer which can move a print head in the vertical and horizontal directions, control is not made to move the head within only a drawing range, or to print only the content of a memory which actually stores a drawing pattern of the Y, M, C, and Bk memories in the drawing range, resulting in the long drawing time.

SUMMARY OF THE INVENTION

It is an object of the present invention to provide an image processing method and apparatus, in which a horizontal range where data to be drawn is present is obtained and stored as a table in units of the height of a record head, and the moving range of the record head is controlled according to the table, so that the record head is moved within only a necessary range, thereby shortening a time required for drawing.

It is another object of the present invention to provide an image processing method and apparatus, which can specify an area for recording record information, and can eliminate unnecessary development onto a memory since information that falls outside the specified area is not developed to bit image data.

It is still another object of the present invention to provide an image processing method and apparatus, in which when paper jam occurs during recording, a table formed before the paper jam is held, paper jam recovery processing is performed, and the held table is utilized after the paper jam recovers, thereby shortening the processing time for re-forming the table.

It is still another object of the present invention to provide an image processing method and apparatus, which need not have attribute information in units of pages since attribute information of drawing information is reflected up to the next page, thereby effectively utilizing a memory.

It is still another object of the present invention to provide an image processing method and apparatus, which can perform efficient development in correspondence with a memory condition since the height of a development area is changed according to a memory capacity that can be used upon development of bit image data.

BRIEF DESCRIPTION OF THE DRAWINGS

FIG. 4 is a view showing an example of a line color designation command of drawing attribute commands;

FIG. 5 is a view showing an example of a circle drawing command of drawing commands;

FIG. 6 is a view showing an example of memory development information of a line-color-designation function of drawing attribute functions;

FIG. 7 is a view showing an example of memory development information of a circle drawing function of drawing functions;

FIG. 20 is a view showing an example of an attributes area for storing drawing attribute information used upon data development onto a memory;

FIGS. 27A to 27C are views showing examples of color designation commands of drawing attribute designation commands;

FIGS. 28A to 28C are views showing examples of a line width designation command, a clip area designation command, and a paint definition designation command;

FIG. 29 is a view showing an example of a line or polygon drawing command;

FIGS. 30A and 30B are views showing examples of a circle drawing command and a character print command;

FIG. 31 is a view showing an example of a command analysis jump table;

FIG. 41 shows color conversion processing;

FIG. 42 shows the color conversion processing;

FIG. 58 is a flow chart showing the processing upon execution of the character-drawing-command-analysis function;

FIG. 59 is a flow chart showing the processing upon execution of the character-drawing-command-analysis function;

FIGS. 82A to 82C are views showing examples of memory development information;

FIGS. 83A and 83B are views showing examples of memory development information;

FIGS. 84A and 84B are views showing examples of memory development information;

FIGS. 86A to 86D are views showing examples of memory development information;

FIGS. 87A to 87E are views showing examples of memory development information;

FIGS. 89A to 89D are views showing examples of memory development information;

FIG. 90 shows a command execution jump table 1;

FIG. 112 is a flow chart showing processing upon execution of the character-drawing function;

FIG. 120 is a flow chart showing the processing for initializing the band memory;

FIG. 121 is a flow chart showing the processing for initializing the band memory;

FIG. 122 is a flow chart showing processing which can be replaced with color print processing;

FIG. 123 is a flow chart showing processing which can be replaced with color print processing;

FIG. 124 is a flow chart showing processing which can be replaced with color print processing;

FIG. 125 is a flow chart showing processing which can be replaced with color print processing;

FIG. 126 is a flow chart showing processing for performing color print processing upon selection of a mode;

FIG. 127 is a view showing an example of an operator control panel 22 shown in FIG. 13;

FIG. 128 shows an example of a memory map using a set of band memories corresponding to coloring agents;

FIG. 129 is a flow chart showing processing for performing color print processing upon selection of a mode;

FIG. 130 is a view showing an example of a print control command shown in FIG. 129; and FIG. 131 is a flow chart showing selection processing of a print control mode on the basis of a reserved capacity of a RAM area.

FIG. 132 is a flow chart showing jamming detection/recovery processing;

Figure 133:
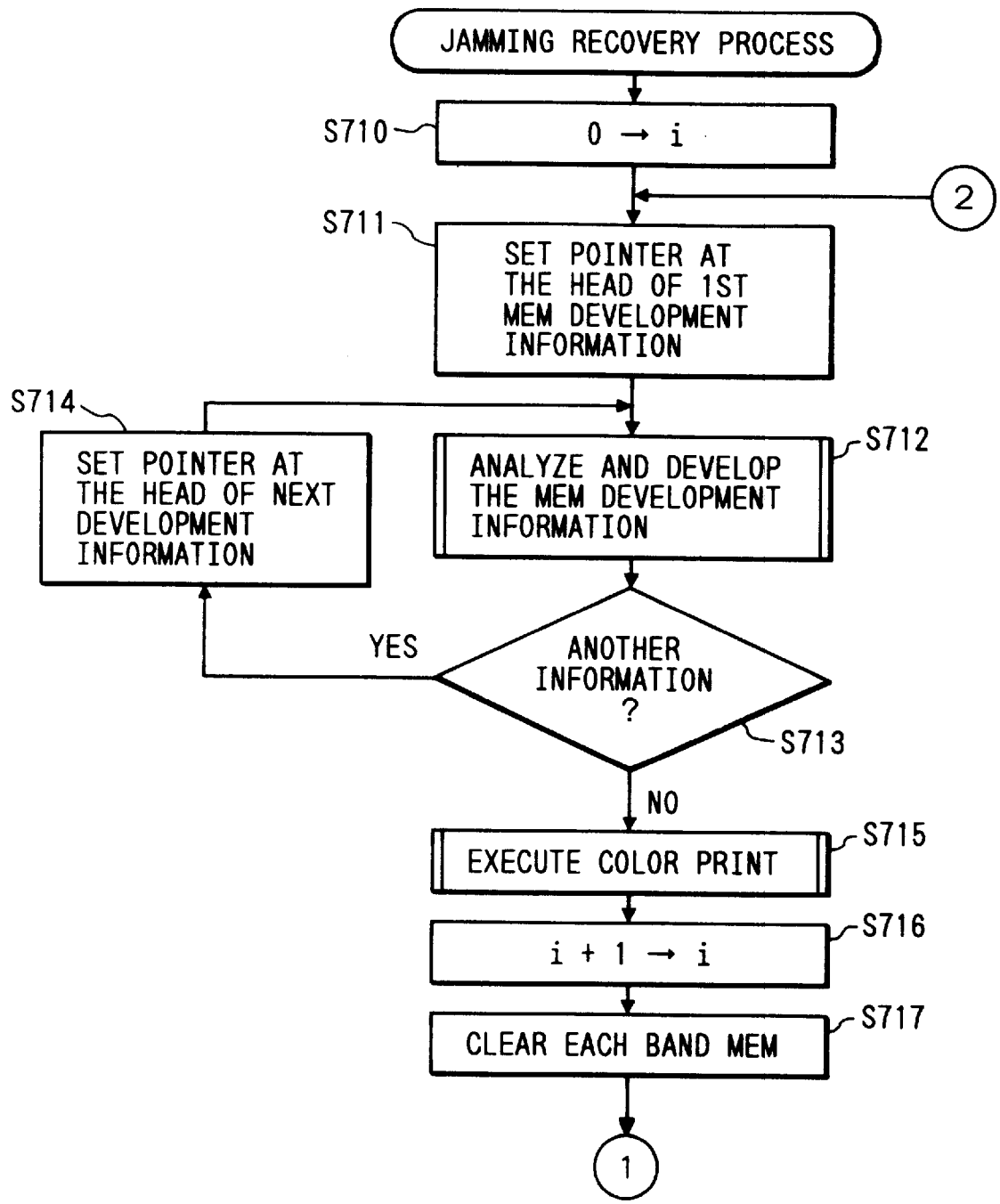
Figure 134:
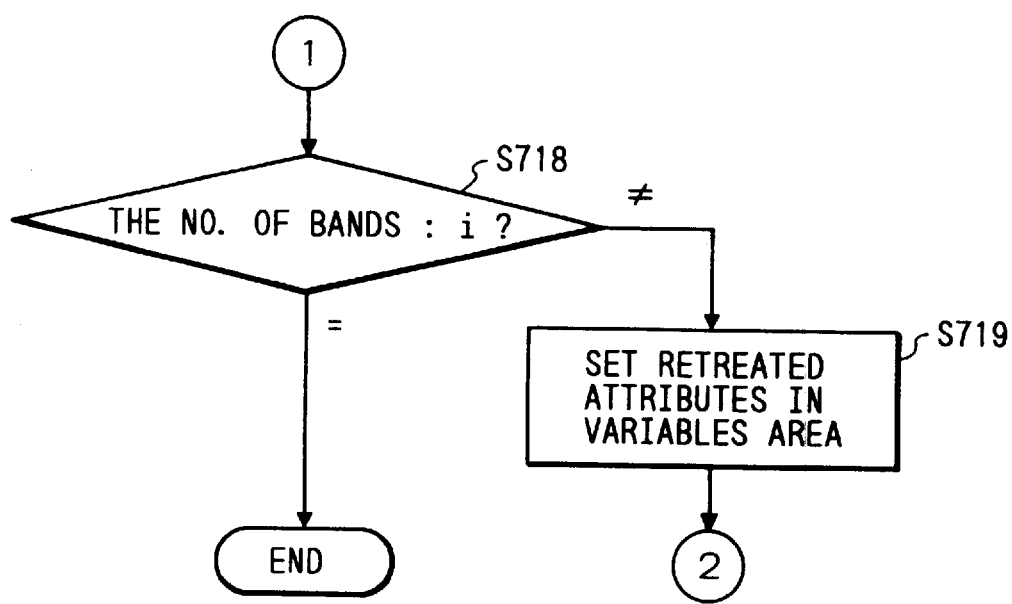

FIG. 133 is a flow chart showing details of jamming recovery processing in step S706; and FIG. 134 is a flow chart showing details of jamming recovery processing in step S706.

DESCRIPTION OF THE PREFERRED EMBODIMENTS

The preferred embodiments of the present invention will be described in detail hereinafter with reference to the accompanying drawings.

Figure 13:
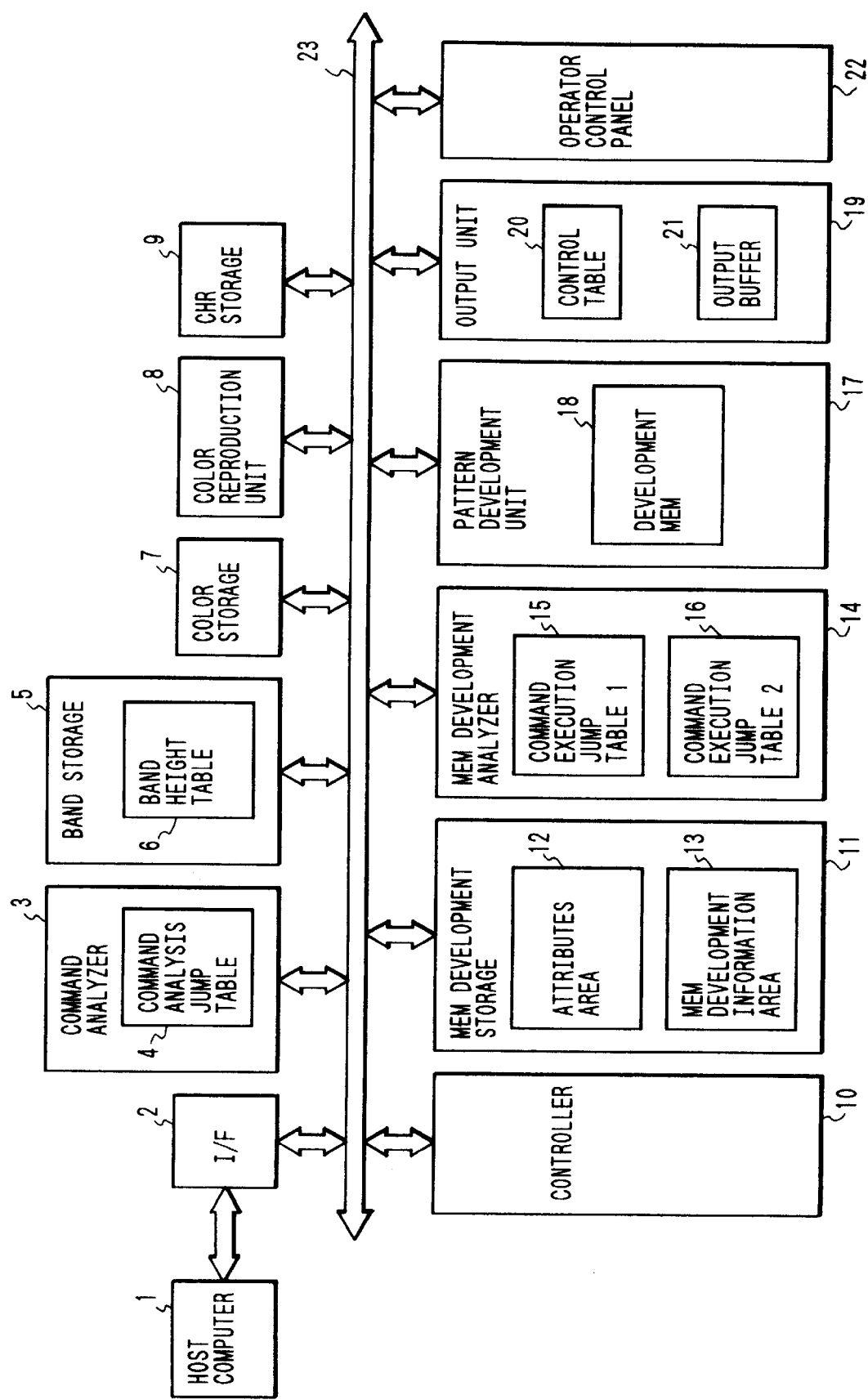
FIG. 13 is a block diagram showing a circuit arrangement of an image processing apparatus according to an embodiment of the present invention.

FIG. 13 is a block diagram showing a circuit arrangement of an image processing apparatus according to an embodiment of the present invention.

As shown in FIG. 13, an image processing apparatus according to this embodiment is constituted by a host computer 1 and an image processing apparatus main body 2.

The host computer 1 supplies print data or print commands to the image processing apparatus like in processing shown in the flow charts to be described later, and causes the image processing apparatus to execute print processing. The image processing apparatus has a microprocessor system including a CPU, a ROM, and a RAM. More specifically, the image processing apparatus main body comprises an interface 2 for exchanging data with the host computer 1, a command analyzer 3, which has a command analysis jump table 4 for storing jump addresses to analysis programs corresponding to command Nos. of commands sent from the host computer 1, and analyzes print data or commands sent from the host computer 1 to generate information for one page, which can be developed onto a development memory, a band storage 5, which has a band height table 6 for storing a band height and information (memory capacity) of the development memory for one coloring agent corresponding to the band height, and stores information such as the band height, a color storage 7 for storing information necessary for color reproduction processing, a color reproduction unit 8 for performing the color reproduction processing, a character storage 9 for storing information for drawing a character, a controller 10 for controlling the apparatus, a memory development storage 11 having an attributes area 12 for storing attribute information, and a memory development information area 13 for storing information for memory development, a memory development analyzer 14, which has a command execution jump table 1 (15) and a command execution jump table 2 (16), and analyzes memory development information, a pattern development unit 17 for developing the analyzed memory development information onto a development memory 18, an output unit 19, which has a path control table 20 for controlling, e.g., movement of a print head, and an output buffer 21, and outputs developed data onto a sheet as a permanently visualized image, an operator control panel 22 at which print environmental parameters can be changed and set, and a data bus 23.

Figure 14:
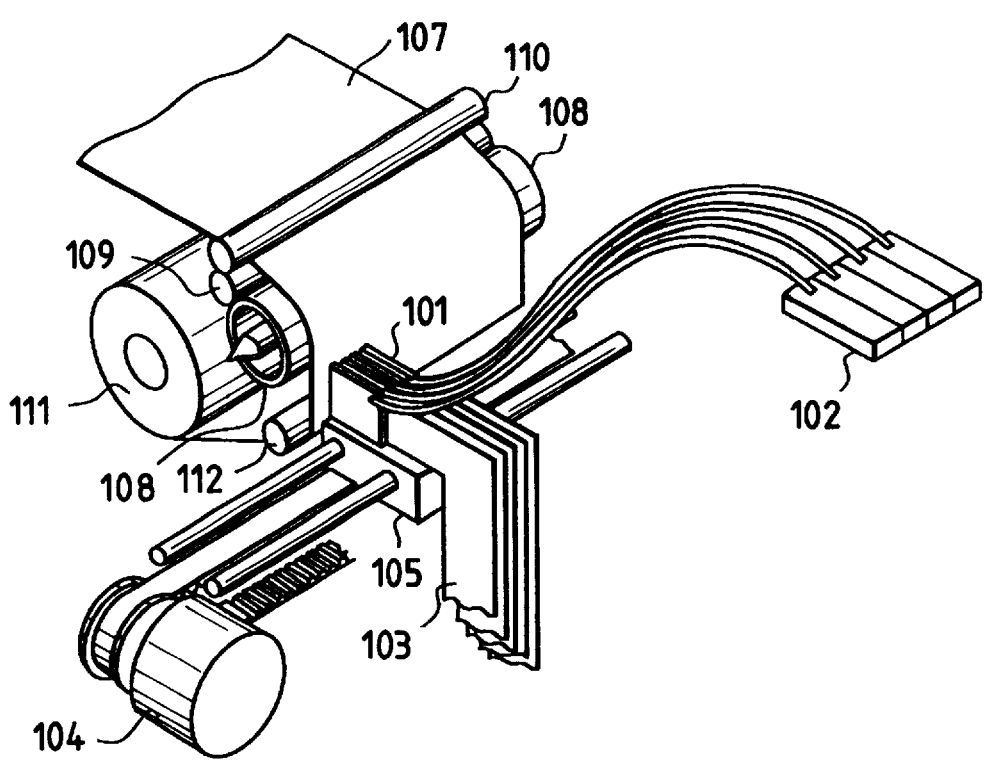
FIG. 14 is a perspective view showing details of a portion around a head unit of an ink-jet image processing apparatus.

FIG. 14 is a perspective view showing details of a portion around a head unit of an ink-jet image processing apparatus.

A head unit 101 is constituted by arranging a large number of ink-jet heads in the sub-scanning direction in correspondence with one coloring agent. In this embodiment, Y, M, C, and Bk head units are prepared.

Ink tanks 102 and signal lines 103 are connected to these head units. A carriage drive motor 104 moves a carriage, which mounts the head units thereon, along a rail in cooperation with a conveyor belt.

FIG. 14 also illustrates print paper 107, a platen 108, print paper convey rollers 109 and 110, a print paper roll 111, and a guide roller 112.

Figure 15:
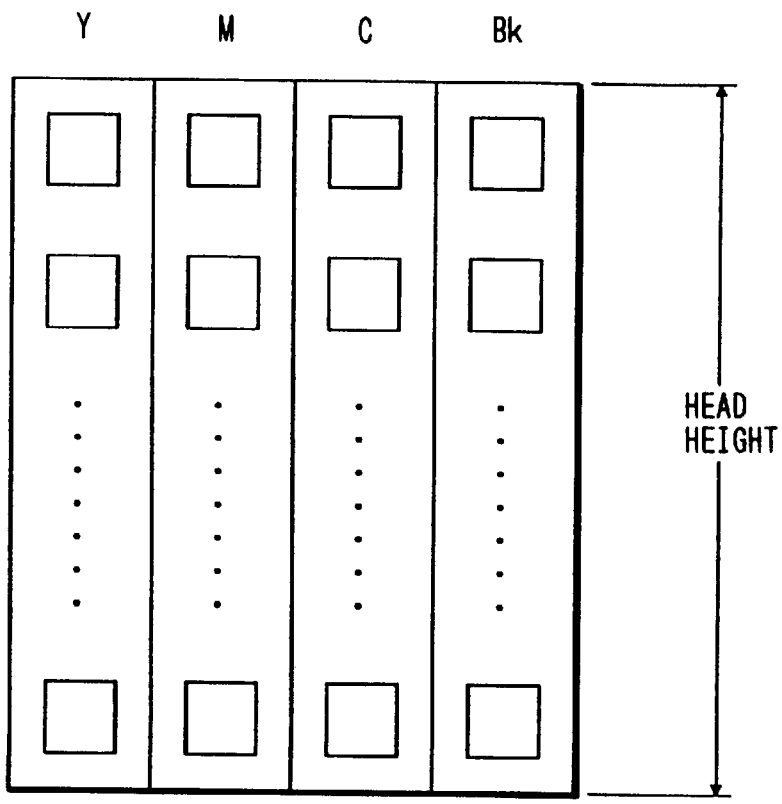
FIG. 15 is a view showing details of a heat unit 101 shown in FIG. 14.

Each head unit 101 is constituted by a plurality of ink-jet heads utilizing heat generation elements shown in FIG. 15. For example, ink-jet heads utilizing electro-mechanical conversion means such as piezo elements may also be used.

FIG. 15 shows details of the head units 101 shown in FIG. 14.

In FIG. 15, each head unit has the number of Y, M, C, or Bk nozzles corresponding to the head height.

More specifically, the head units 101 have yellow, magenta, cyan, and black ink ejection nozzles.

Figure 16:
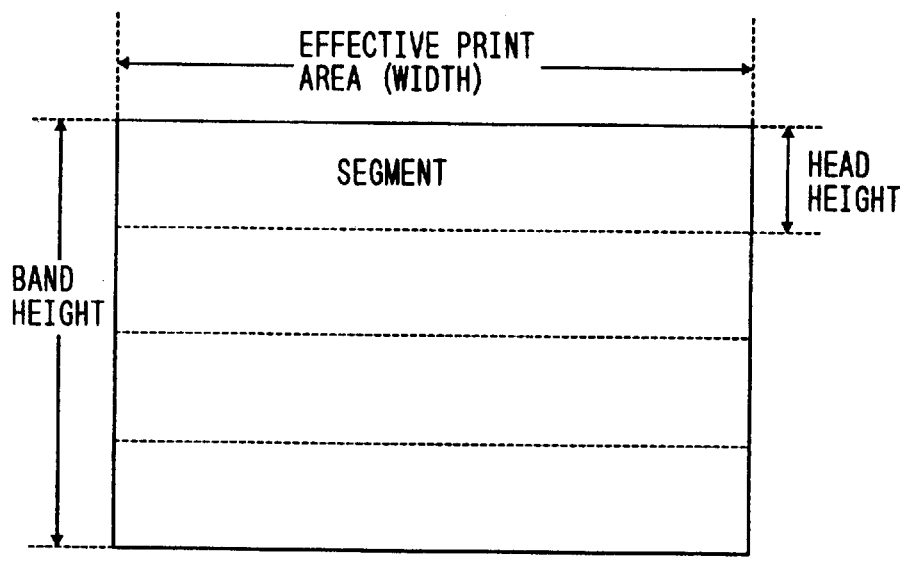
FIG. 16 is a view showing an example of a band structure.

FIG. 16 shows an example of a band structure.

As shown in FIG. 16, a rectangular area having a width corresponding to the effective print area width of a sheet, and a length corresponding to the head height is defined as a segment.

One band is defined by vertically arranging the segments, as shown in FIG. 16, and has a size corresponding to an integer multiple of the segment.

Therefore, the band height corresponds to an integer multiple of the head height.

In FIG. 16, one band is constituted by four segments.

Figure 17:
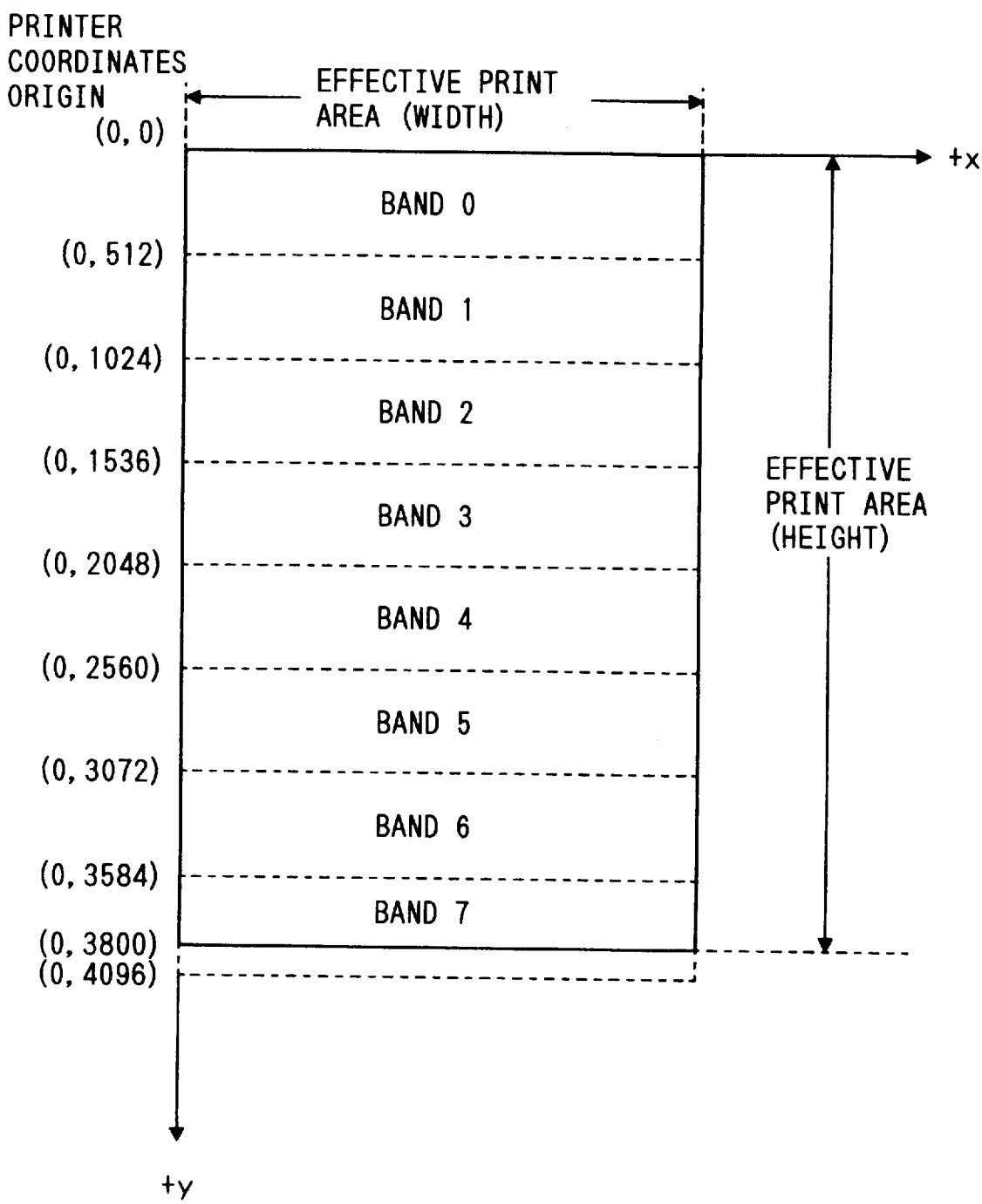
FIG. 17 is a view showing an example of a case wherein an effective print area of a sheet is divided into eight bands.

FIG. 17 shows a case wherein the effective print area of a sheet is divided into eight bands each having a band height corresponding to 512 scan lines.

As shown in FIG. 17, the eight bands respectively have band Nos. 0 to 7.

When the number of bands is n, the band Nos. are assigned from 0 to (n−1).

A point (e.g., (0, 512)) on the printer coordinates shown in FIG. 17 indicates a point at the upper left corner of each band area, and is calculated by (0, (n−1)×512).

The effective print area height is not always equal to the integer multiple of the band height. The height of a final band (a band 7 in FIG. 17) is sometimes equal to or smaller than the band height.

Figure 18:
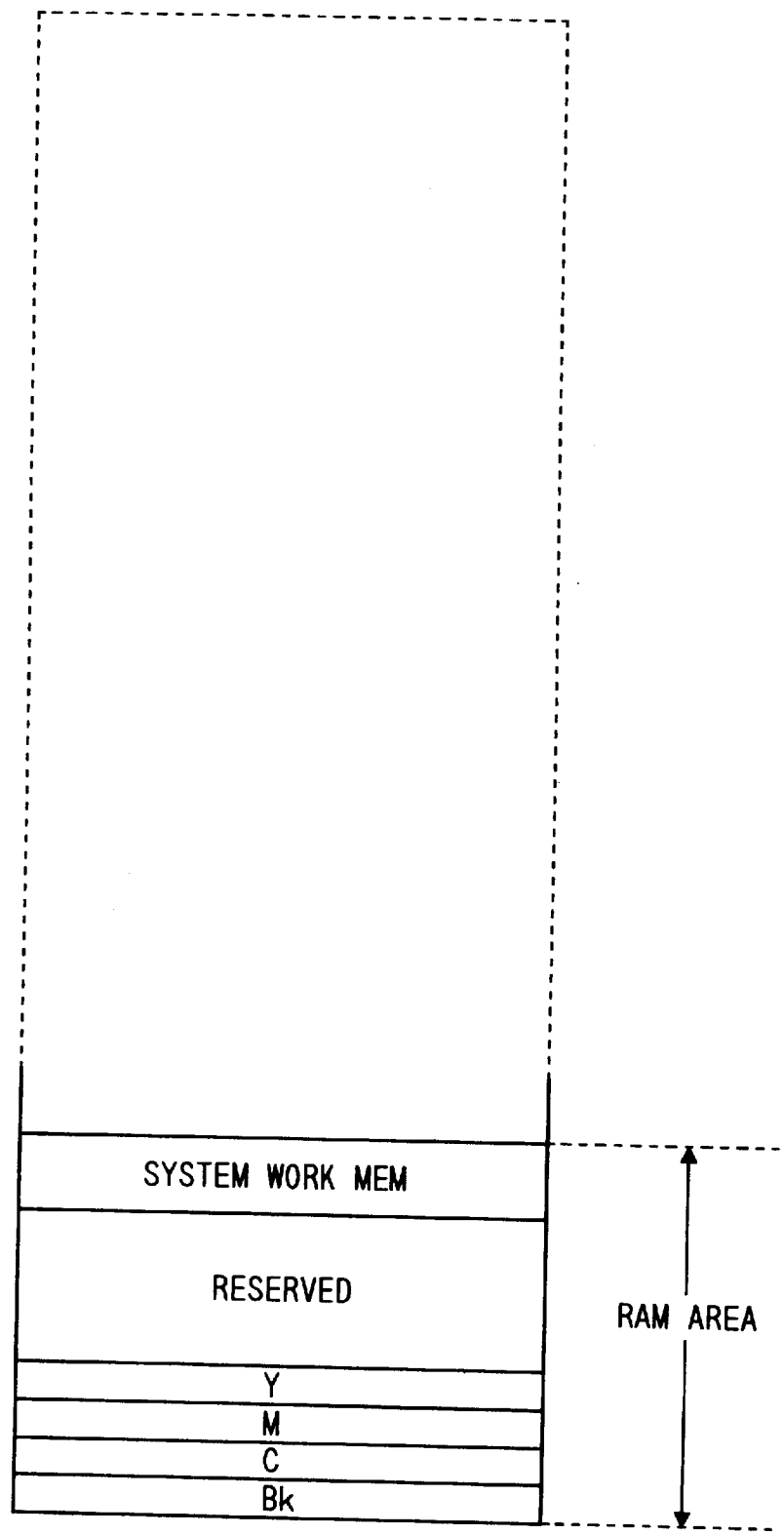
FIG. 18 shows an example of a memory map of a RAM area in which a development memory for one band is prepared for each coloring agent.

FIG. 18 shows an example of a memory map of an internal RAM area of the color image processing apparatus.

The RAM area is constituted by a system work memory, a reserved area, and memories (i.e., memories each having a size corresponding to one band area in FIG. 17) each having a size corresponding to one band for Y (yellow), M (magenta), C (cyan), and Bk (black) as coloring agents (toners or inks).

The system work memory is used as a storage area of information (e.g., variables) used in control in the image processing apparatus, and a permanent work area.

The reserved area is used as an area for storing memory development information, a character cache memory, and the like.

Figure 1:
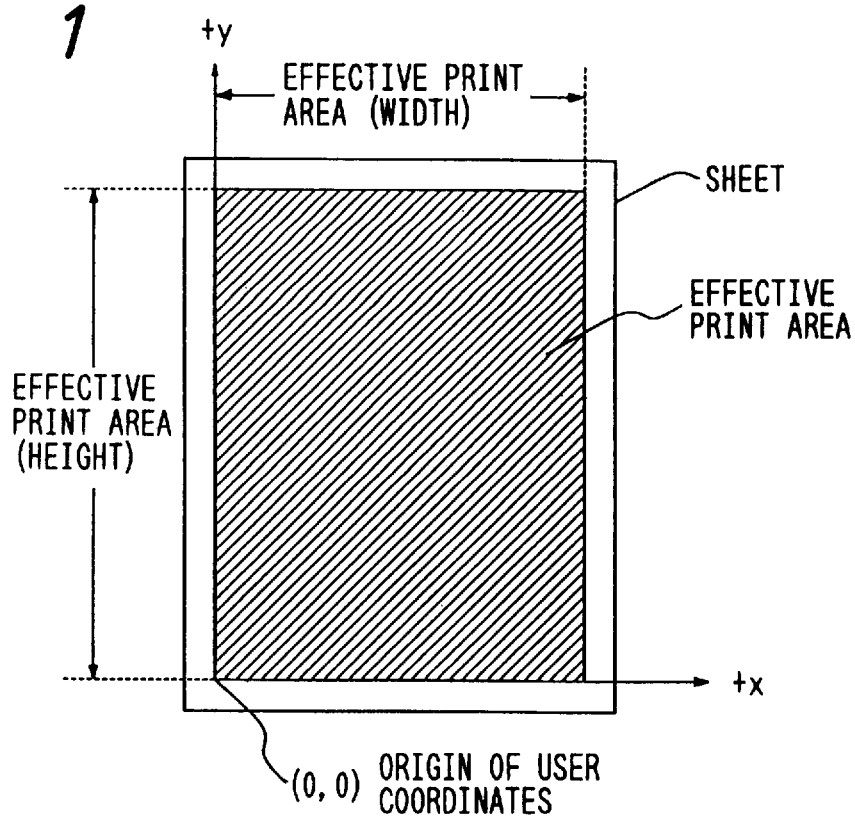
FIG. 1 is a view showing an example of a user coordinate system.
Figure 2:
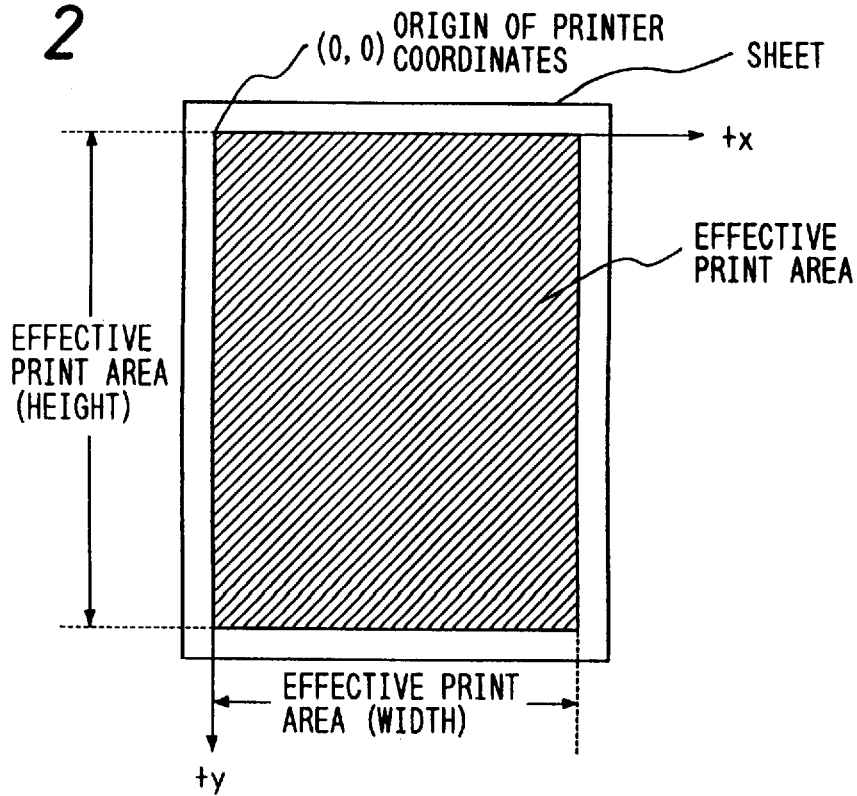
FIG. 2 is a view showing an example of a printer coordinate system.
Figure 3:
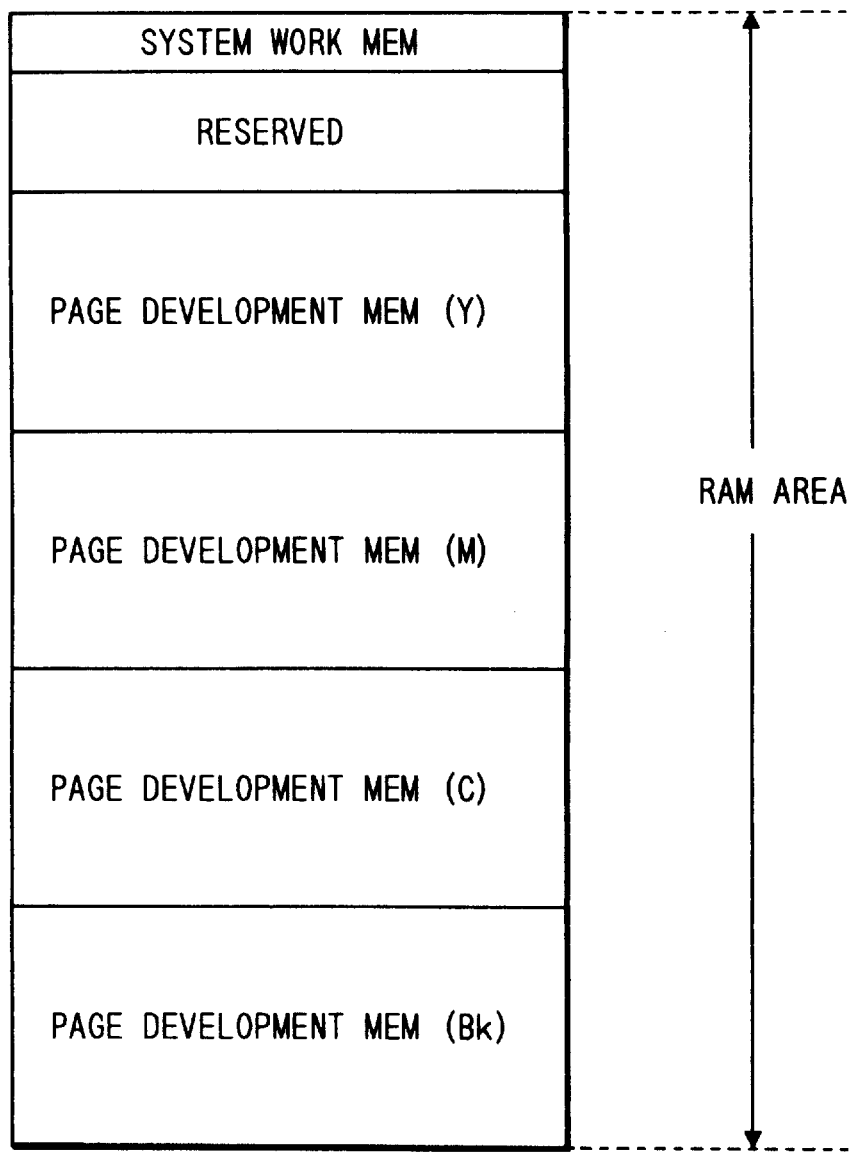
FIG. 3 shows an example of a memory map of an internal RAM area of a color image processing apparatus which has Y, M, C, and Bk memories each having a size corresponding to an effective print area of a sheet.
Figures 8, 9:
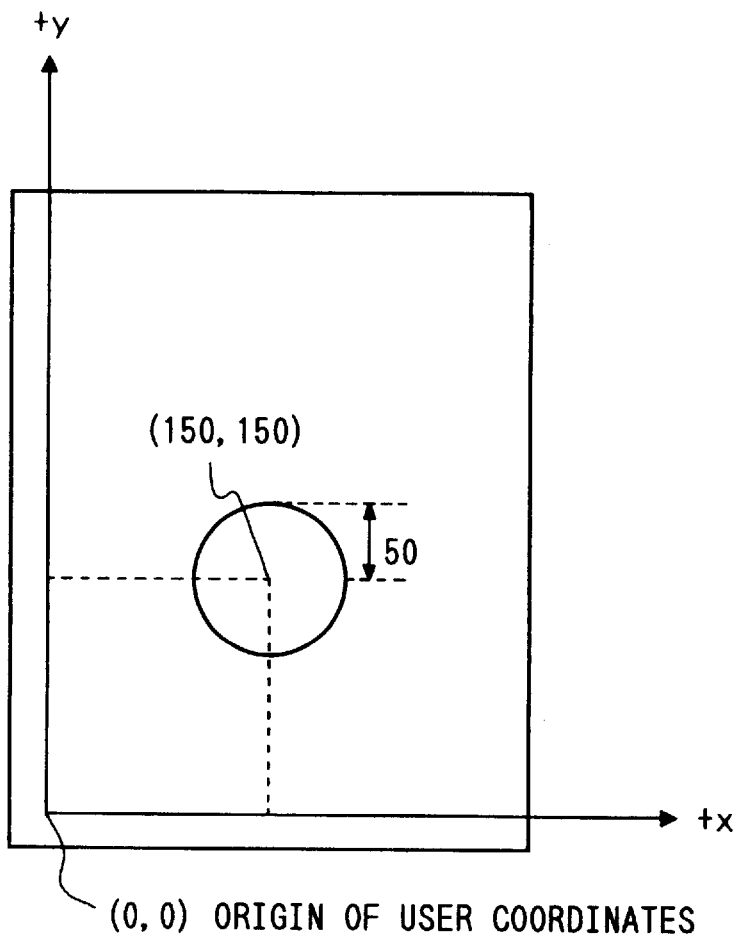
FIG. 8 is a view showing an example of a circle drawing operation on the user coordinate system.
FIG. 9 is a view showing an example of a circle drawing command issued when the circle drawing operation shown in FIG. 8 is set.
Figures 10, 11, 12:
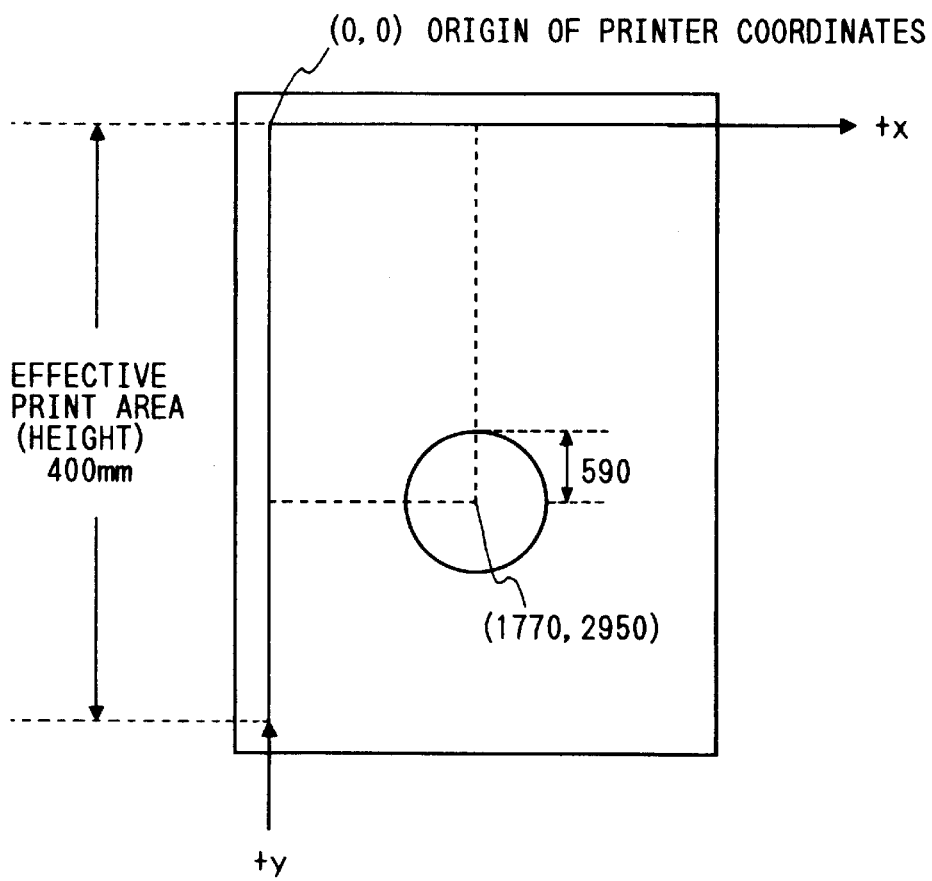
FIG. 10 is a view showing an example of conversion of the circle drawing operation shown in FIG. 8 onto the printer coordinate system.
FIG. 11 is a view showing an example of memory development information of the circle drawing operation shown in FIGS. 8 and 10.
FIG. 12 is a view showing an example of a line color command designated when an outline of the circle shown in FIG. 8 is drawn using yellow (coloring agent Yellow at 100%)

A dotted portion represents the size of the RAM area shown in FIG. 3.

In this manner, since the development memories need only have a size ⅛ that shown in FIG. 3, a color print operation can be performed using a smaller RAM area than a conventional apparatus.

Figure 19:
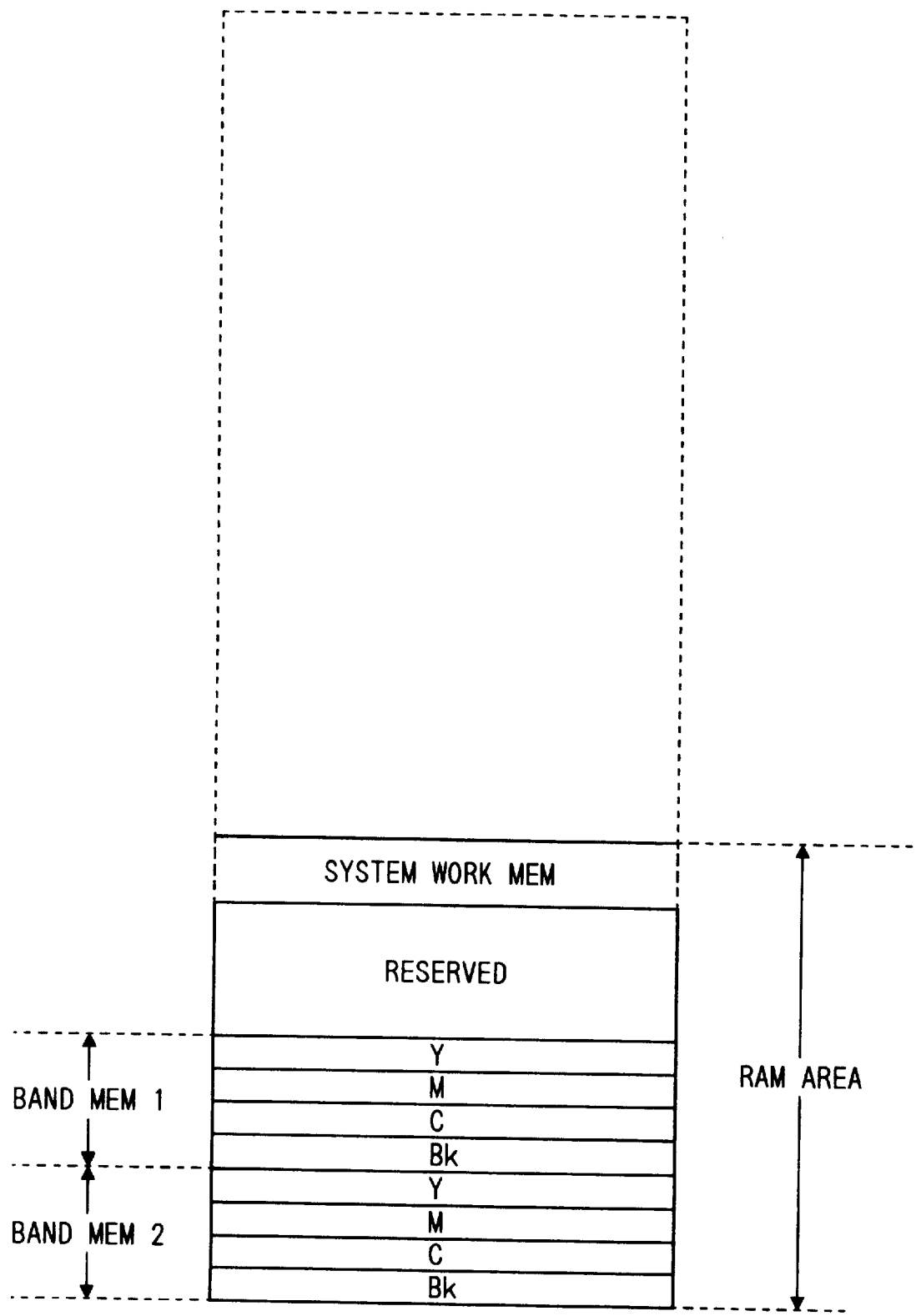
FIG. 19 shows an example of a memory map of a RAM area in which two development memories each for one band are prepared for each coloring agent.

FIG. 19 shows an example of a memory map when Y (yellow), M (magenta), C (cyan), and Bk (black) one-band memories are added to the RAM area shown in FIG. 18.

In this case, since the sizes of the development memories can be ¼ that shown in FIG. 4, a color print operation can be performed using a smaller RAM area than a conventional apparatus.

FIG. 20 shows the attributes area (RAM) 12 shown in FIG. 13.

The attributes area is constituted by areas for temporarily retreating drawing attribute information used upon data development onto a memory, and variable areas in which the drawing attribute information is set.

As shown in FIG. 20, a retreat area is determined for each drawing attribute, and m pieces of information can be retreated.

lwidth, lymck, and the like represent variables in which each drawing attribute information is set.

Figure 21:
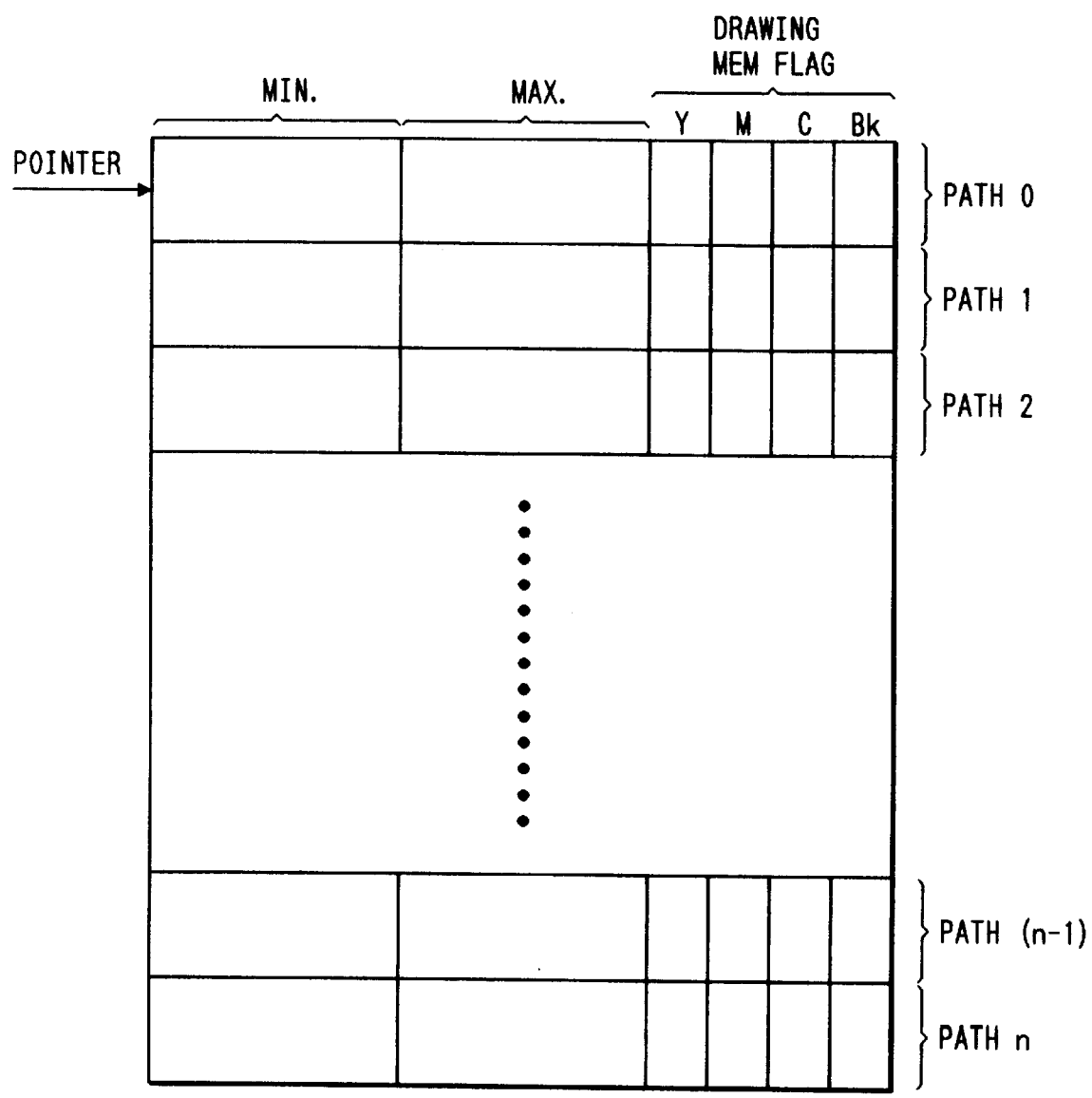
FIG. 21 is a view showing an example of a path control table.

FIG. 21 shows an example of the path control table 20 shown in FIG. 13.

In this case, a "path" means an area which has a width corresponding to the effective print area width, and a height corresponding to the head height, in which a print head is actually moved in the horizontal direction.

In FIG. 21, n of a path n corresponds to a value obtained by subtracting 1 from the number of paths in the effective print area of a sheet.

The path control table stores information for controlling horizontal movement of the print head, and information for confirming the presence/absence of the contents of the development memories to be printed.

In FIG. 21, minimum and maximum values are those of a drawing range of each path, and are values in a +x direction on the printer coordinates.

The minimum value corresponds to a horizontal idle moving amount (its unit is determined by the resolution of the image processing apparatus) of the print head without printing the contents of the development memories.

The maximum value indicates a maximum value when the print head is moved from the minimum value while recording the contents of the development memories.

In FIG. 21, a drawing memory flag indicates whether or not patterns are developed on Y, M, C, and Bk development memories corresponding to each path. The drawing memory flag consists of 4 bits, i.e., 1 bit for each of Y, M, C, and Bk.

If a bit is ON, this indicates that a pattern is developed on the corresponding development memory; otherwise, this indicates that no pattern is developed.

Figure 22:
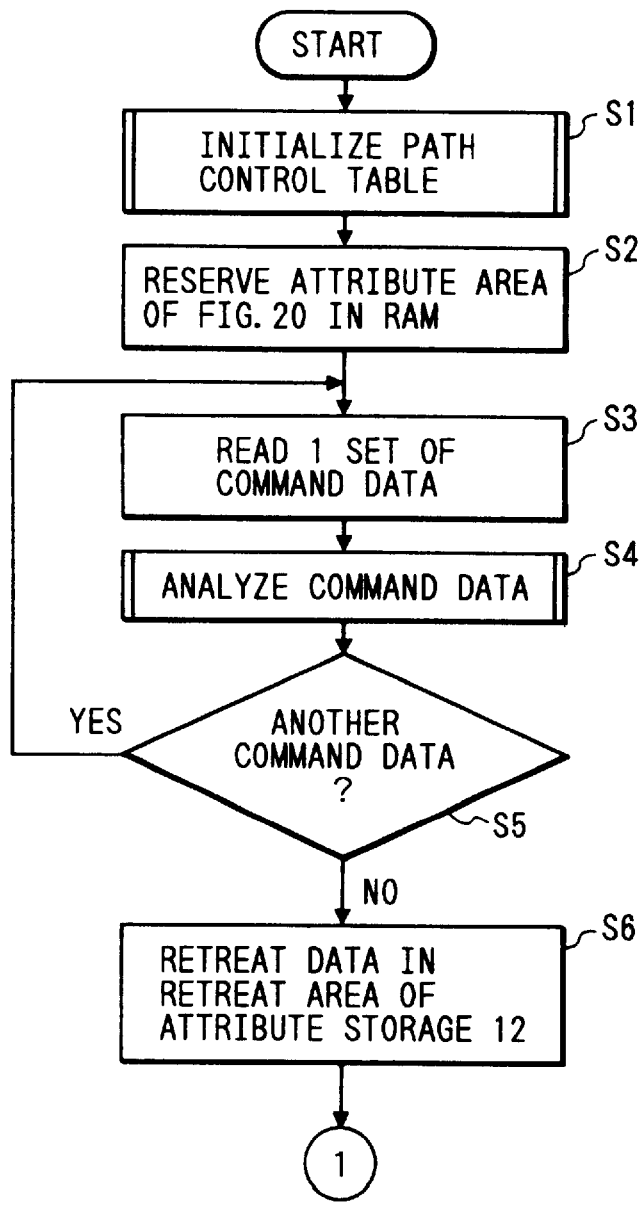
FIG. 22 is a flow chart executed when a color print operation is performed using only one-band memories corresponding to coloring agents.
Figure 23:
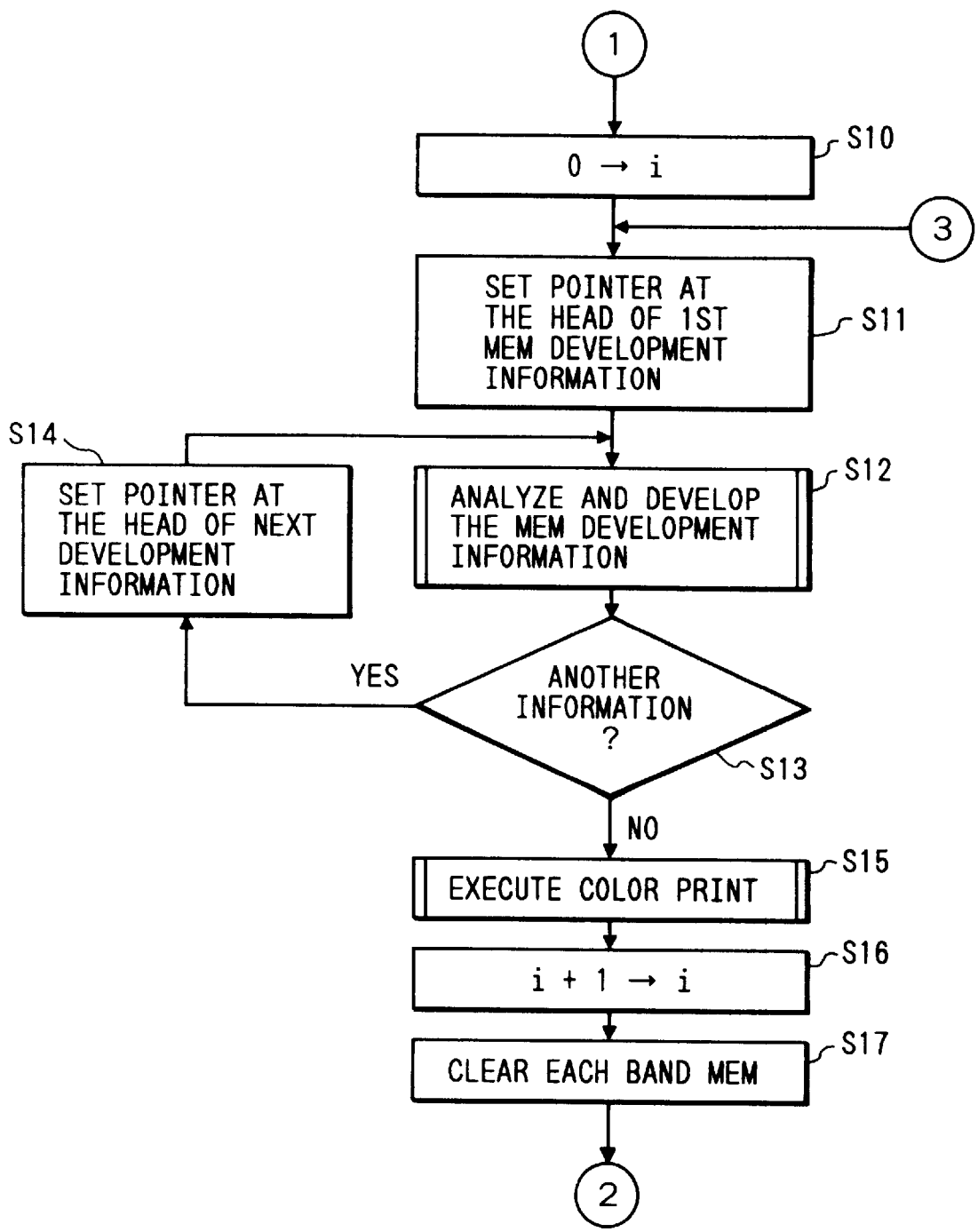
FIG. 23 is a flow chart executed when the color print operation is performed using only one-band memories corresponding to coloring agents.
Figure 24:
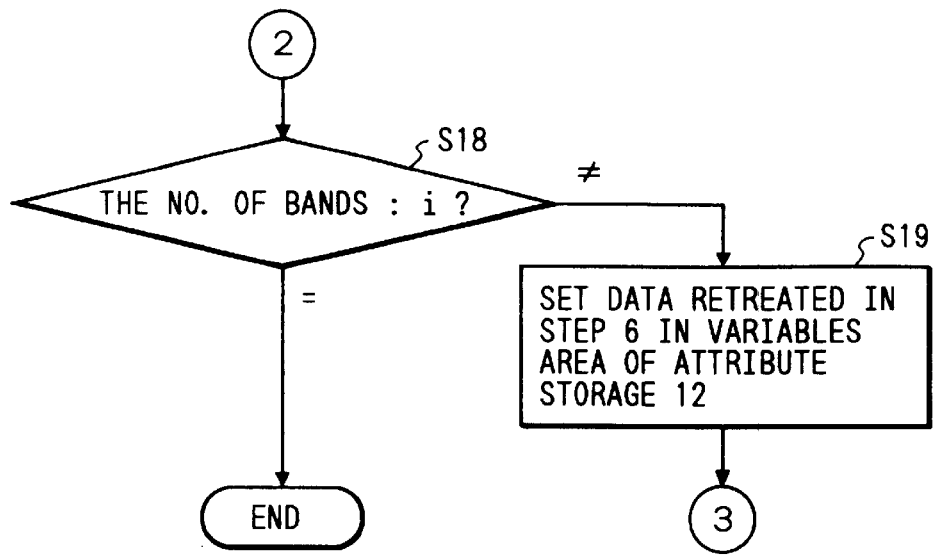
FIG. 24 is a flow chart executed when the color print operation is performed using only one-band memories corresponding to coloring agents.

FIGS. 22, 23, and 24 are flow charts when a color print operation is performed using only Y (yellow), n (magenta), C (cyan), and Bk (black) one-band memories in the color image processing apparatus for receiving page description command data in units of pages, and performing print control in units of pages.

In step S1, the path control table shown in FIG. 21 is initialized (set with initial values), and the flow advances to step S2.

In step S2, the attributes area shown in FIG. 20 is assured on the RAM, and the flow advances to step S3.

In step S3, a set of command data (e.g., one drawing command, drawing attribute command, or the like) is read, and the flow advances to step S4.

In step S4, the read command data is analyzed by the command analyzer 3, and the flow advances to step S5.

If it is determined in step S5 that another command data for a corresponding page remains, the flow returns to step S3; otherwise, the flow advances to step S6.

In step S6, drawing attribute information necessary for data development onto the memories at that time is temporarily retreated in the retreat areas of the attributes area 12 assured in step S2, and the flow advances to step S10.

In step S10, 0 is set in a constant i, and the flow advances to step S11.

In step S11, a pointer is set the head of the first memory development information (one set) stored in the memory development information area 13, and the flow then advances to step S12.

In step S12, the memory development information read in step S11 is analyzed by the memory development analyzer 14, and is developed onto the development memories (Y, M, C, and Bk band memories) corresponding to band portions i. Thereafter, the flow advances to step S13.

If it is determined in step S13 that another memory development information remains, the flow advances to step S14. In step S14, a pointer is set at the head of the next memory development information (one set), and the flow returns to step S12.

If it is determined in step S13 that no information remains, the flow advances to step S15.

In step S15, the contents of the memories developed in step S12 are color-printed by the output unit 19, and the flow advances to step S16.

In step S16, i is incremented by one, and the flow advances to step S17.

In step S17, the Y, M, C, and Bk band memories are cleared, and the flow advances to step S18.

In step S18, the number of bands is compared with i, and if a coincidence is found therebetween, the processing is ended.

If a non-coincidence is found, the flow advances to step S19. In step S19, the drawing attributes temporarily retreated in the retreat areas of the attributes area 12 in step S6 are loaded, and are set in the variable areas of attributes area 12. The flow then returns to step S11.

With the above-mentioned processing, page description command data in units of pages are received, and a color print operation can be performed using only the Y (yellow), M (magenta), C (cyan), and Bk (black) one-band memories.

Figure 25:
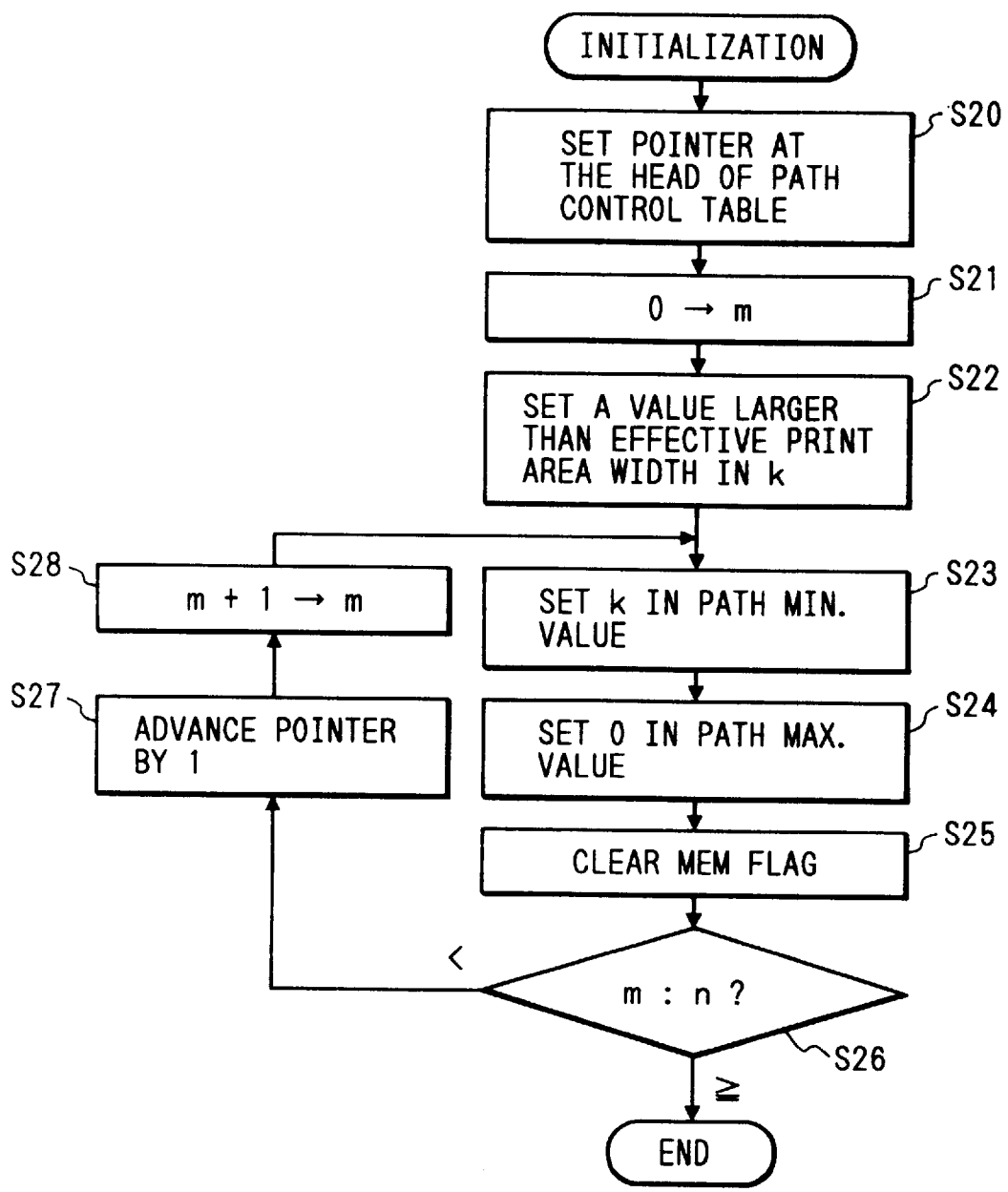
FIG. 25 is a flow chart executed when the path control table is initialized in step S1 in FIG. 22.

FIG. 25 is a flow chart showing processing upon initialization of the path control table in step S1 of FIG. 22.

In step S20, a pointer is set at the head of the path control table shown in FIG. 21, and the flow advances to step S21.

In step S21, 0 is set in a constant m, and the flow advances to step S22.

In step S22, a value larger than the effective print area width (its unit is equal to that of the printer coordinates) is set in a constant k, and the flow advances to step S23.

In step S23, the value k is set in the minimum value of the path indicated by the pointer, and the flow advances to step S24.

In step S24, 0 is set in the maximum value of the path indicated by the pointer, and the flow advances to step S25.

In step S25, the drawing memory flag indicated by the pointer is cleared to 0, and the flow advances to step S26.

In step S26, the values m and n are compared with each other. If m is equal to or larger than n, the processing is ended.

Otherwise, the flow advances to step S27, and the pointer is advanced by one. The flow then advances to step S28, and m is incremented by one. The flow then returns to step S23.

With the above-mentioned processing, the path control table can be initialized.

Figure 26:
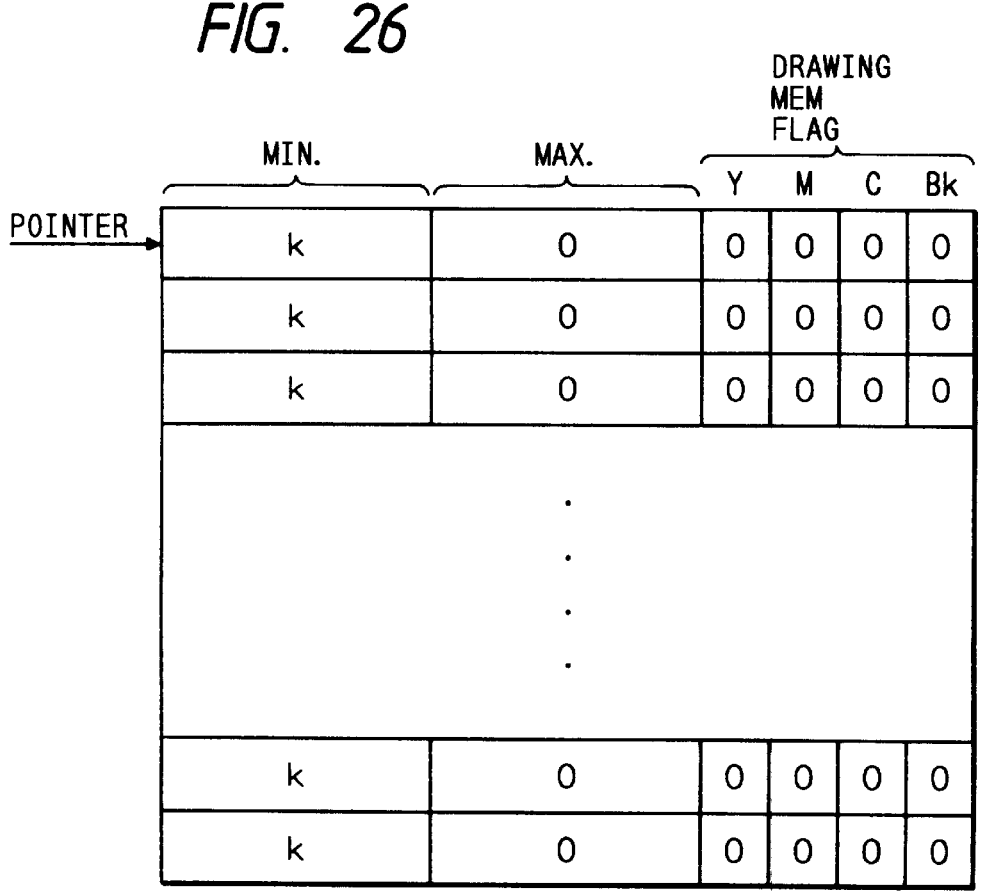
FIG. 26 is a view showing the content of the path control table initialized by the flow chart of FIG. 25.

FIG. 26 shows the content of the path control table initialized by the flow chart of FIG. 25.

FIGS. 27A, 27B, and 27C show examples of color designation commands (line color designation, paint color designation, and character color designation commands) of drawing attribute designation commands.

The line color designation command is used for designating a color of a line or an outline of a figure.

The paint color designation command is used for designating a color for painting a portion inside a closed figure.

The character color designation command is used for designating a character color.

A command No. varies depending on color designation commands, and is used for identifying a command.

The content of a number-of-data parameter indicates the number of data input after the number-of-data parameter.

The content of a kind flag parameter indicates a kind of color designation data.

FIG. 27A shows a case wherein the kind flag value is 0, and represents that color designation data are R (red), G (green), and B (blue) luminance data values as three primary colors of light.

FIG. 27B shows a case wherein the kind flag value is 1, and represents that color designation data are $L^*$, $a^*$, and $b^*$ data values of a uniform perceptual space defined by the CIE (Commission Internationale de l'Eelairage) in 1976.

FIG. 27C shows a case wherein the kind flag value is 2, and represents that color designation data are Y (yellow), M (magenta), C (cyan), and Bk (black) density data values as primary colors of coloring agents (toners or inks).

FIGS. 28A, 28B, and 28C show examples of a line width designation command, a clip area designation command, and a paint definition designation command of the drawing attribute designation commands.

A command No. varies depending on drawing attribute designation commands, and is used for identifying a command.

The content of a number-of-data parameter indicates the number of data input after the number-of-data parameter.

The line width designation command shown in FIG. 28A is used for designating a line width of a line or an outline of a figure.

The unit of a line width value corresponds to the coordinate unit of the user coordinate system.

The clip area designation command shown in FIG. 28B is used for designating a drawing enable area of figures, characters, or the like.

In FIG. 28B, the unit of x and y minimum and maximum values corresponds to the coordinate unit of the user coordinate system.

The paint definition designation command shown in FIG. 28C is used for designating a paint pattern inside an outline of a closed figure, and the presence/absence of the outline.

In FIG. 28C, a paint pattern No. is used for identifying a paint pattern. When the pattern No. is 0, this indicates the absence of a paint pattern (blank), and when the pattern No. is other than 0, this indicates a paint pattern such as a hatched pattern.

An outline flag indicates the absence of an outline when it is 0; it indicates the presence of an outline when it is 1.

FIG. 29 shows an example of a line or polygon drawing command of drawing commands.

A command No. varies depending on drawing functions, and is used for identifying a command.

The content of a number-of-data parameter indicates the number of data input after the number-of-data parameter.

The line drawing command is used for drawing a line.

The polygon drawing command is used for drawing a polygon.

Note that x- and y-coordinate values of coordinates 1 to n are those on the user coordinate system.

FIGS. 30A and 30B show examples of a circle drawing command and a character drawing command of the drawing commands.

A command No. varies depending on drawing functions, and is used for identifying a command.

The content of a number-of-data parameter indicates the number of data input after the number-of-data parameter.

The circle drawing command shown in FIG. 30A is used for drawing a circle.

The x- and y-coordinates of the center are those on the user coordinate system.

An actual radius is calculated by multiplying a coordinate unit of the user coordinate system with a "radius" value.

The character drawing command shown in FIG. 30B is used for drawing a character.

The x- and y-coordinates of the drawing position are those on the user coordinate system indicating a start reference position of a character drawing operation.

Character data represents a character string (e.g., ABC) to be printed.

FIG. 31 shows the command analysis jump table (ROM) 4 (FIG. 13) for storing jump addresses to functions for analyzing the drawing commands and drawing attribute commands.

The jump addresses to the respective command analysis functions are stored in correspondence with command Nos. (0 to n).

Figure 32:
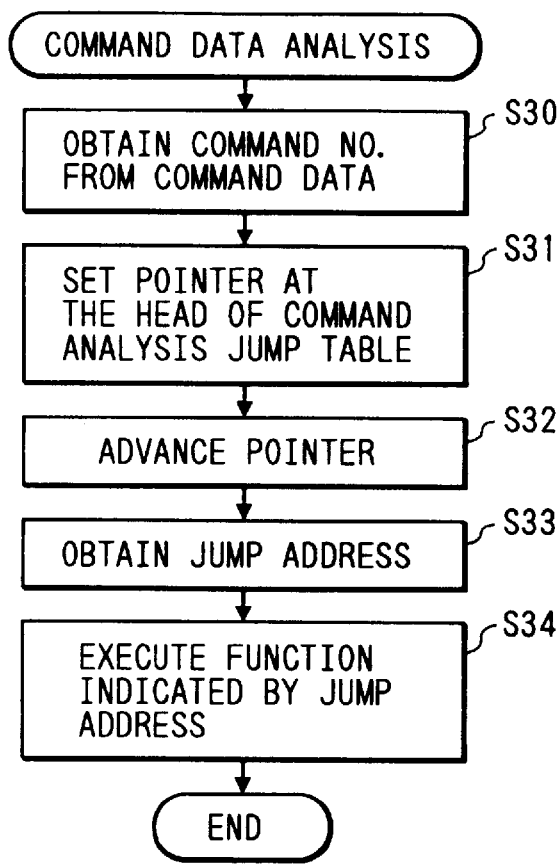
FIG. 32 is a flow chart showing details of command data analysis processing.

FIG. 32 is a flow chart showing details of command data analysis processing in step S4 shown in FIG. 22.

In step S30, a command No. is obtained from command data (one set), and the flow advances to step S31.

In step S31, a pointer is set at the head of the command analysis jump table shown in FIG. 31, and the flow advances to step S32.

In step S32, the pointer is advanced by an amount corresponding to the command No., and the flow advances to step S33.

In step S33, a content (jump address) indicated by the pointer is obtained, and the flow advances to step S34.

In step S34, a function indicated by the jump address is executed, and the processing is ended.

Figure 33:
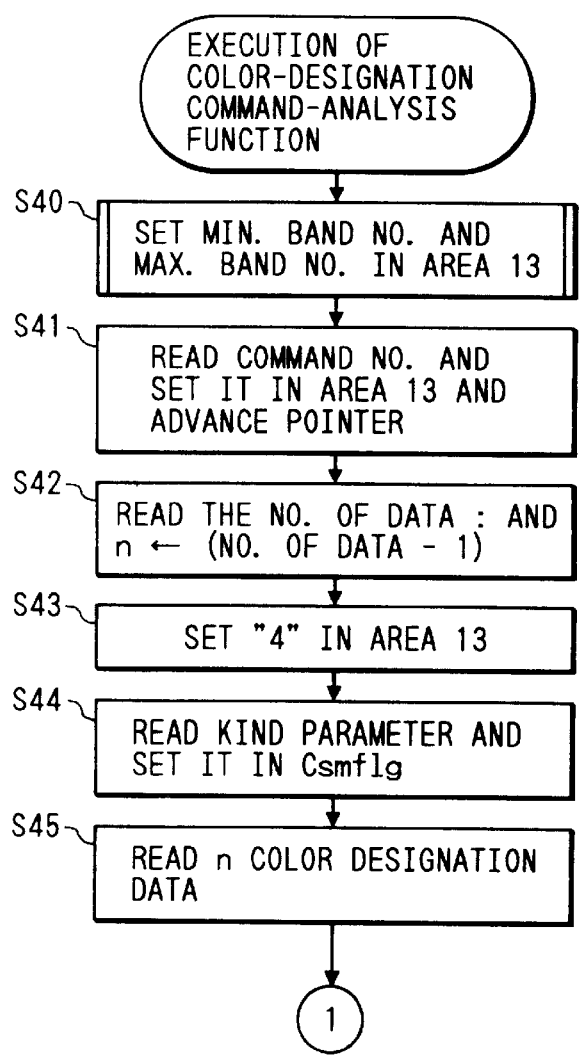
FIG. 33 is a flow chart showing details of processing for executing a color-designation-command-analysis function.
Figure 35:
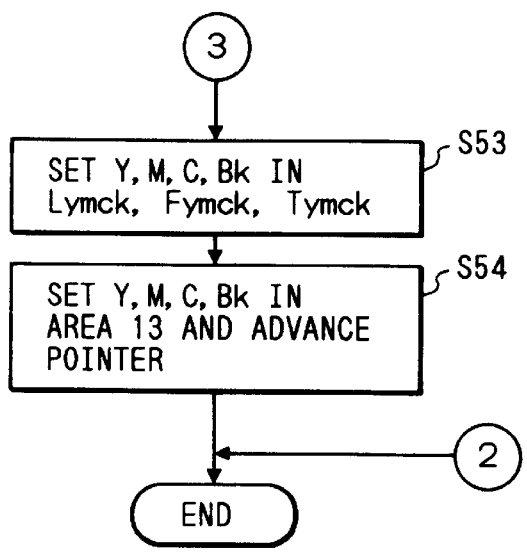
FIG. 35 is a flow chart showing the details of the processing for executing the color-designation-command-analysis function.
Figure 34:
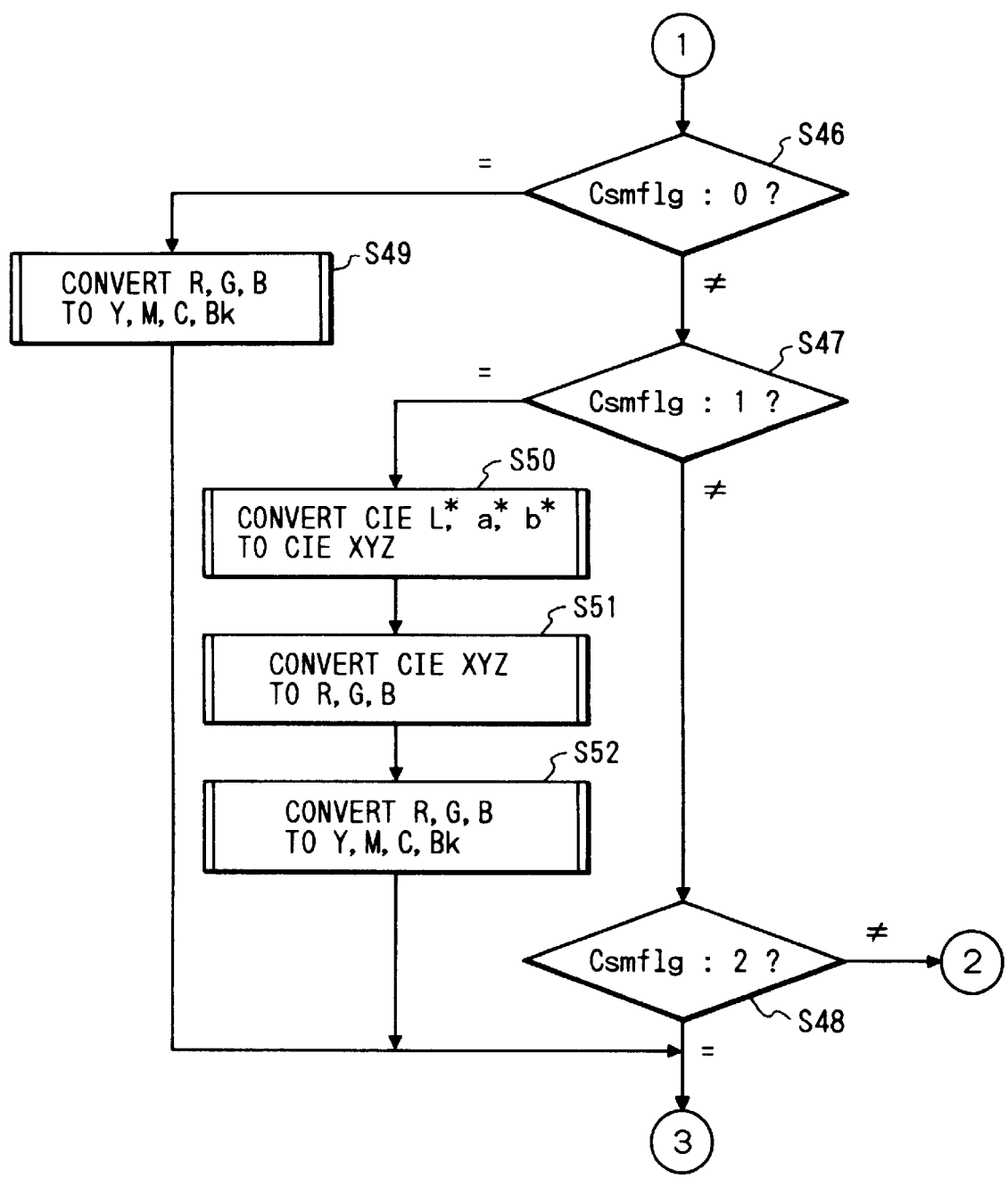
FIG. 34 is a flow chart showing the details of the processing for executing the color-designation-command-analysis function.

FIGS. 33 to 35 are flow charts showing details of processing upon execution of a color-designation-command-analysis function in step S34 in FIG. 32.

In step S40, a min band No. and a max band No. are set in the memory development information area 13, and the flow advances to step S41.

In step S41, a command No. is read from a command, and is set in the memory development information area 13 to advance the pointer. Thereafter, the flow advances to step S42.

In step S42, a number-of-data parameter is read out from the command, and (the number of data−1) is set in a constant n. Thereafter, the flow advances to step S43.

In step S43, "4" is set as the number of data in the memory development information area 13 to advance the pointer. The flow then advances to step S44.

In step S44, a kind parameter is read from the command, and is set in a kind flag Csmflg. The flow then advances to step S45.

In step S45, color designation data corresponding in number to the constant n are read, and the flow advances to step S46.

In step S46, the value of the kind flag Csmflg is compared with 0.

If it is determined in step S46 that the value of the kind flag Csmflg is equal to 0, it is determined that the color designation data read in step S45 are R, G, and B luminance data, and the flow advances to step S49. In step S49, the R, G, and B luminance data are converted into Y, M, C, and Bk density data, and the flow then advances to step S53.

If it is determined in step S46 that the value of the kind flag Csmflg is not equal to 0, the flow advances to step S47.

In step S47, the value of the kind flag Csmflg is compared with 1.

If it is determined in step S46 that the value of the kind flag Csmflg is equal to 0, it is determined that the color designation data read in step S45 are L*, a*, and b* data of the uniform perceptual space defined by the CIE (Commission Internationale de l'Eelairage) in 1976. The flow then advances to step S50, and the CIE L*, a*, and b* data are converted into CIE X, Y, and Z data (of an XYZ calorimetric system defined by the CIE in 1931). Thereafter, the flow advances to step S51.

In step S51, the CIE X, Y, and Z data are converted into R, G, and B luminance data, and the flow advances to step S52.

In step S52, the R, G, and B luminance data are converted into Y, M, C, and Bk density data, and the flow then advances to step S53.

If it is determined in step S47 that the value of the kind flag Csmflg is not equal to 1, the flow advances to step S48.

In step S48, the value of the kind flag Csmflg is compared with 2.

If it is determined in step S48 that the value of the kind flag Csmflg is equal to 2, it is determined that the color designation data read in step S45 are Y, M, C, and Bk density data, and the flow advances to step S53. In step S53, the Y, M, C, and Bk density data are set in internal variables (Lymck, Fymck, and Tymck), and the flow advances to step S54. In step S54, the Y, M, C, and Bk density data are set in the memory development information area 13 to advance the pointer. Thus, the processing is ended.

If it is determined in step S48 that the value of the kind flag Csmflg is not equal to 2, the processing is ended.

In this manner, the color designation command is analyzed, and memory development information of the color designation command is generated.

Figure 36:
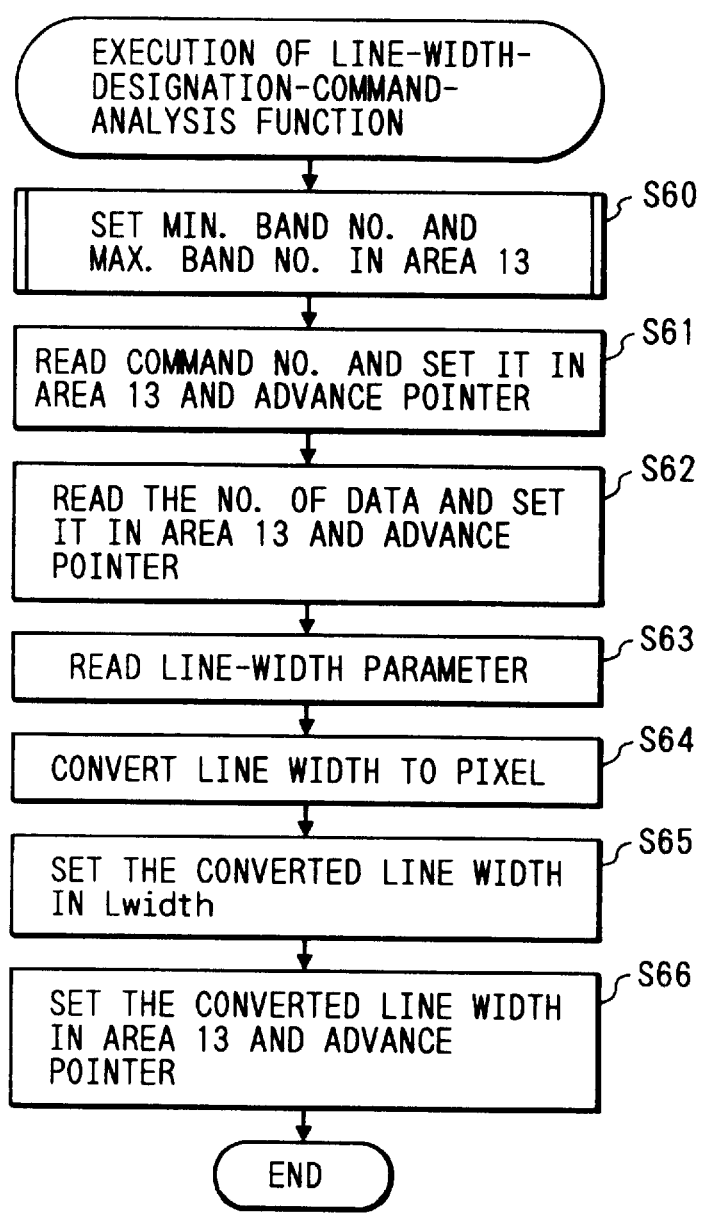
FIG. 36 is a flow chart showing details of processing for executing a line-width-designation-command-analysis function.

FIG. 36 is a flow chart showing details of processing upon execution of a line-width-designation-command-analysis function in step S34 in FIG. 32.

In step S60, a min band No. and a max band No. are set in the memory development information area 13, and the flow advances to step S61.

In step S61, a command No. is read from a command, and is set in the memory development information area 13 to advance a pointer. The flow then advances to step S62.

In step S62, a number-of-data parameter is read out from the command, and is set as the number of data in the memory development information area 13 to advance the pointer. The flow then advances to step S63.

In step S63, a line-width value parameter is read from the command, and the flow advances to step S64.

In step S64, the read line-width value is converted into a pixel (dot) value with reference to the resolution of the image processing apparatus, and the flow advances to step S65.

In step S65, the converted line-width value is set in an internal variable Lwidth, and the flow advances to step S66.

In step S66, the converted line-width value is set in the memory development information area 13 to advance the pointer. The processing is then ended.

In this manner, the line width designation command is analyzed, and memory development information of the line width designation command is generated.

Figure 37:
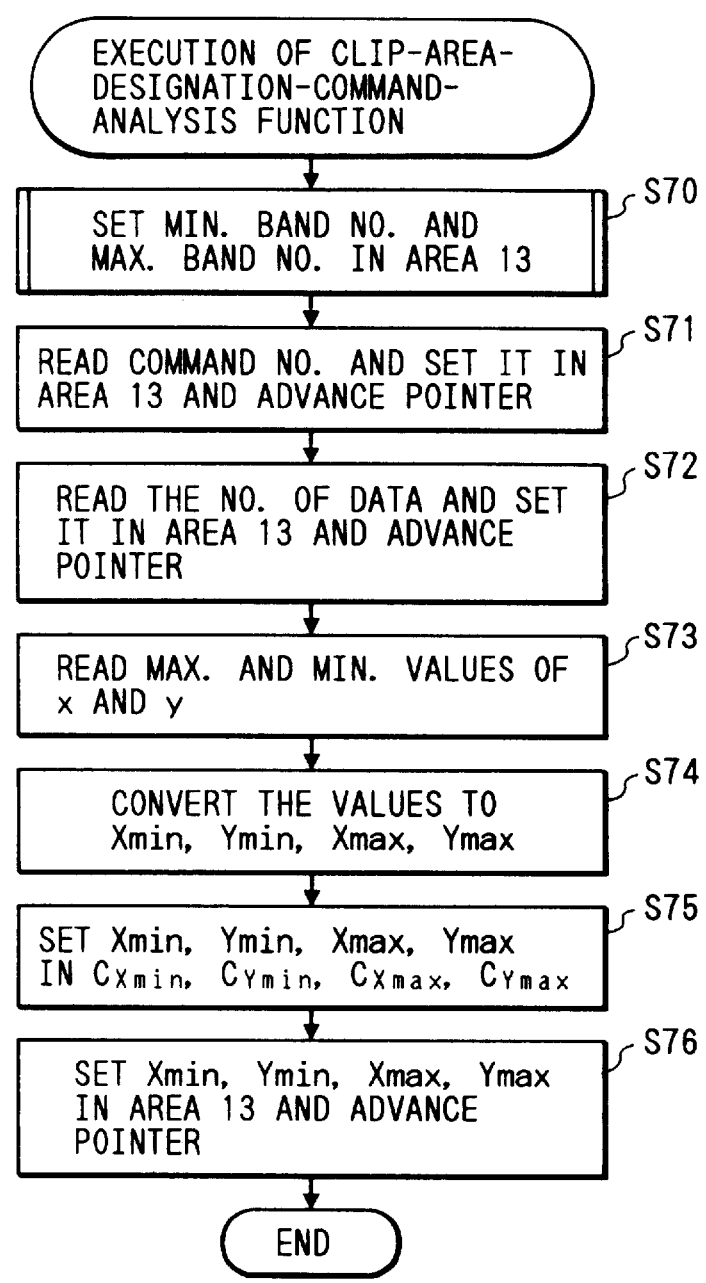
FIG. 37 is a flow chart showing details of processing for executing a clip-area-designation-command-analysis function.

FIG. 37 is a flow chart showing details of processing upon execution of a clip-area-designation-command-analysis function in step S34 in FIG. 32.

In step S70, a min band No. and a max band No. are set in the memory development information area 13, and the flow advances to step S71.

In step S71, a command No. is read from a command, and is set in the memory development information area 13 to advance a pointer. The flow then advances to step S72.

In step S72, a number-of-data parameter is read from the command, and is set as the number of data in the memory development information area 13 to advance the pointer. The flow then advances to step S73.

In step S73, x and y minimum and maximum value parameters of a clip area are read from the command, and the flow advances to step S74.

In step S74, the read x and y minimum and maximum values are converted into values xmin, ymin, xmax, and ymax on the printer coordinate system on the basis of the resolution of the image processing apparatus, and the flow advances to step S75.

In step S75, the values xmin, ymin, xmax, and ymax are respectively set in cxmin, cymin, cxmax, and cymax, and the flow advances to step S76.

In step S76, the values xmin, ymin, xmax, and ymax are set in the memory development information area 13 to advance the pointer. Thereafter, the processing is ended.

In this manner, the clip area designation command is analyzed, and memory development information of the clip area designation command is generated.

Figure 38:
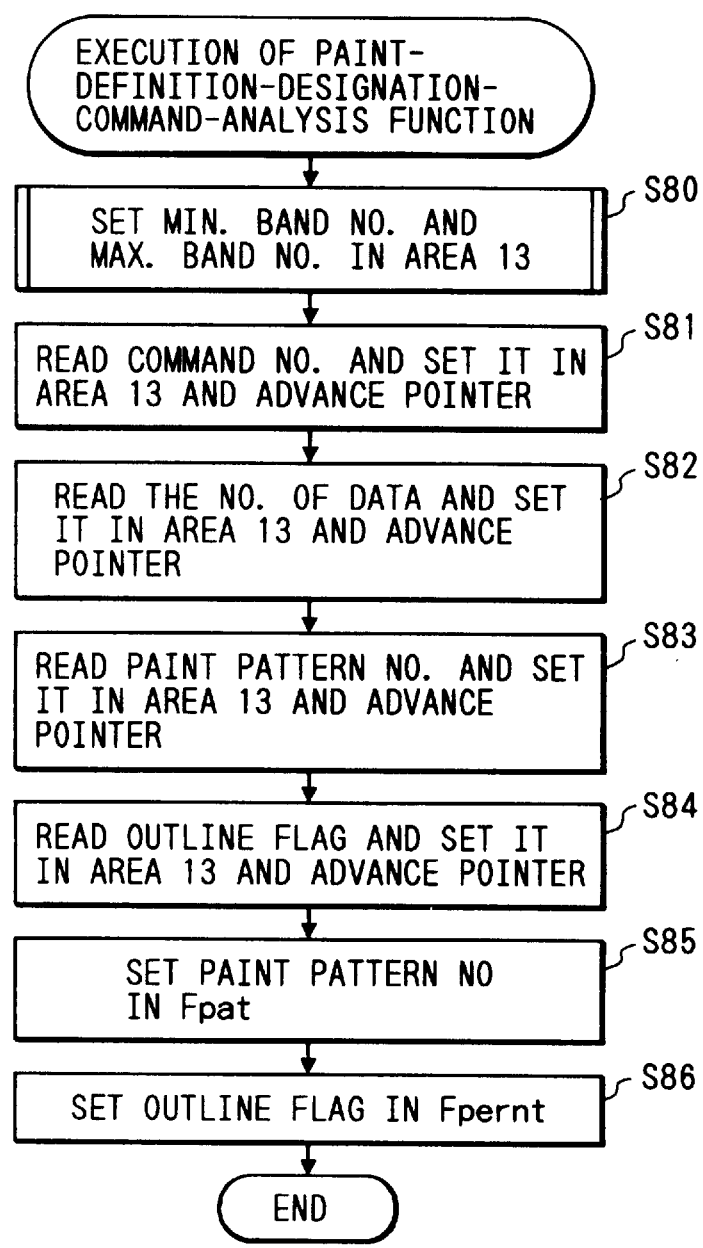
FIG. 38 is a flow chart showing details of processing for executing a paint-definition-designation-command analysis function.

FIG. 38 is a flow chart showing details of processing upon execution of a paint-definition-designation-command-analysis function in step S34 in FIG. 32.

In step S80, a min band No. and a max band No. are set in the memory development information area 13, and the flow advances to step S81.

In step S81, a command No. is read from a command, and is set in the memory development information area 13 to advance a pointer. The flow then advances to step S82.

In step S82, a number-of-data parameter is read from the command, and is set as the number of data in the memory development information area 13 to advance the pointer. The flow then advances to step S83.

In step S83, a paint pattern No. is read from the command, and is set in the memory development information area 13 to advance the pointer. The flow then advances to step S84.

In step S84, an outline flag is read from the command, and is set in the memory development information area 13 to advance the pointer. Thereafter, the flow advances to step S85.

In step S85, the paint pattern No. in an internal variable Fpat, and the flow advances to step S86.

In step S86, the content of the outline flag is set in an internal variable Fpermt, and the processing is ended.

In this manner, the paint definition designation command is analyzed, and designation memory development information of the paint definition designation command is generated.

Figure 39:
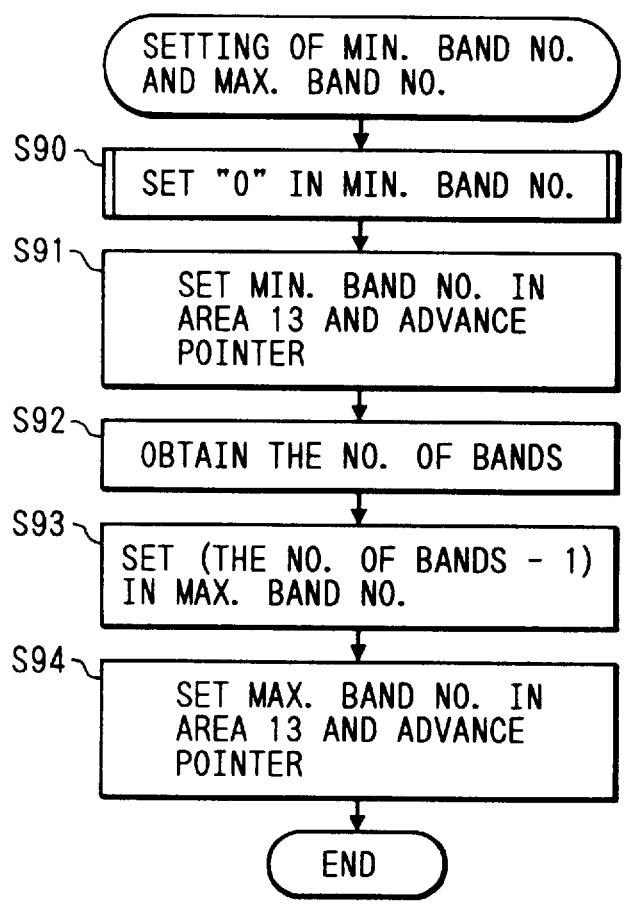
FIG. 39 is a flow chart showing details of processing for setting a min band No. and a max band No. in a memory development information area.

FIG. 39 is a flow chart showing details of processing for setting the min band No. and the max band No. in the memory development information area in steps S40, S60, S70, and S80 in FIGS. 33, 36, 37, and 38.

In step S90, 0 is set in the min band No., and the flow advances to step S91.

In step S91, the min band No. is set in the memory development information area 13 to advance a pointer, and the flow advances to step S92.

In step S92, information indicating the current number of bands is obtained from the band storage 5, and the flow advances to step S93.

In step S93, a value (the number of bands−1) is set in the max band No., and the flow advances to step S94.

In step S94, the max band No. is set in the memory development information area 13 to advance the pointer, and the processing is ended.

In this manner, in the memory development information of each drawing attribute, 0 is set in the min band No., and the value (the number of bands−1) is set in the max band No. so that the memory development information is analyzed in each band processing.

Figure 40:
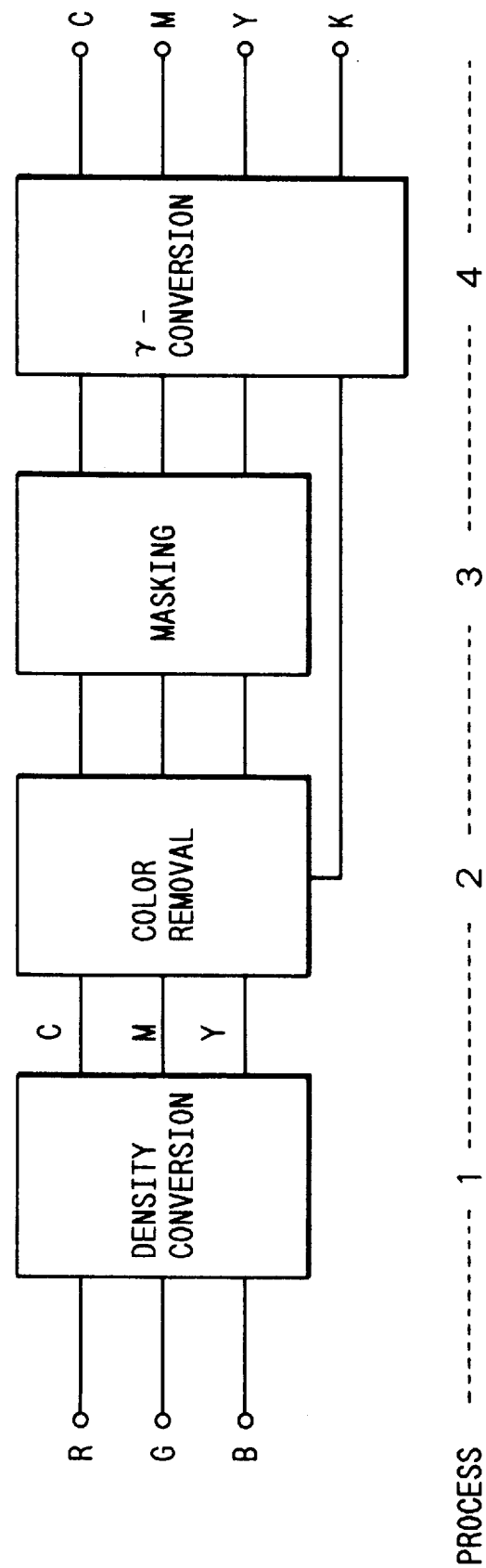
FIG. 40 is a diagram showing color reproduction processing.

FIG. 40 shows an example of color reproduction processing shown in steps S49 and S52 in FIG. 34.

In process 1, density conversion processing for LOG-converting R, G, and B values as luminance information into C, M, and Y as density information is executed.

In process 2, undercolor or color removal processing for extracting a Bk value from the C, M, and Y value is executed.

In process 3, masking processing is executed to correct unnecessary absorption characteristics of C, M, and Y toners or inks, so as to attain appropriate color reproduction.

In process 4, γ-conversion processing is executed to adjust a contrast and brightness according to an image.

The above-mentioned processing operations are performed by the color reproduction unit 8 using information in the color storage 7.

The above-mentioned R, G, and B data are assumed to have a predetermined conversion method with the CIE X, Y, and Z data.

FIG. 41 shows an example of color conversion processing in step S50 in FIG. 34.

The CIE L*, a*, and b* data can be converted into the CIE X, Y, and Z data by equations (a) to (d).

Note that Xn, Yn, and Zn are values determined according to one of CIE standard light sources to be used.

FIG. 42 shows an example of color conversion processing in step S51 in FIG. 34.

The CIE X, Y, and Z data can be converted into R, G, and B luminance data by a matrix conversion equation shown in FIG. 42.

The parameter values of the matrix are determined according to one of CIE standard light sources to be used, and this embodiment exemplifies values when the CIE standard light source D65 is used.

Figure 43:
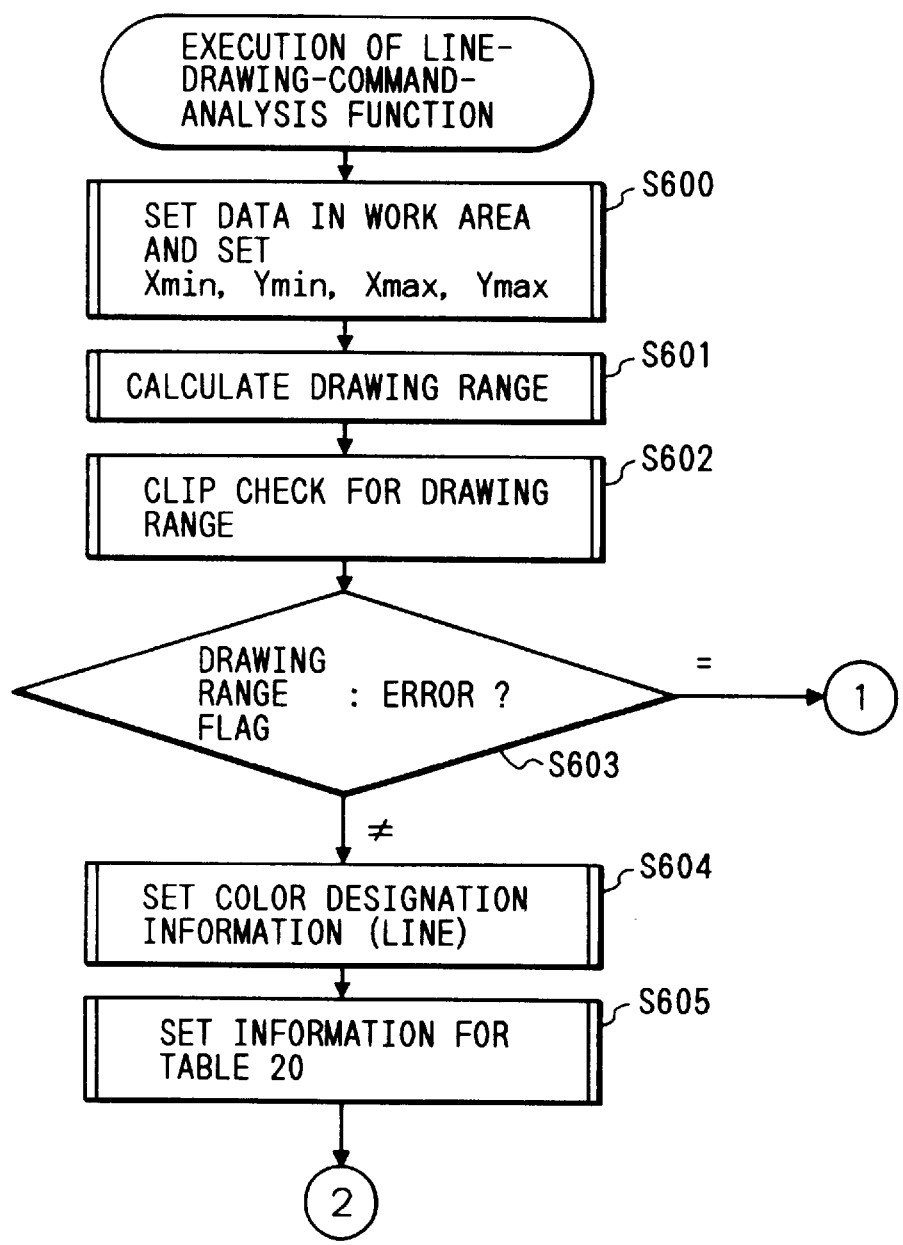
FIG. 43 is a flow chart showing processing upon execution of a line-drawing-command-analysis function.
Figure 44:
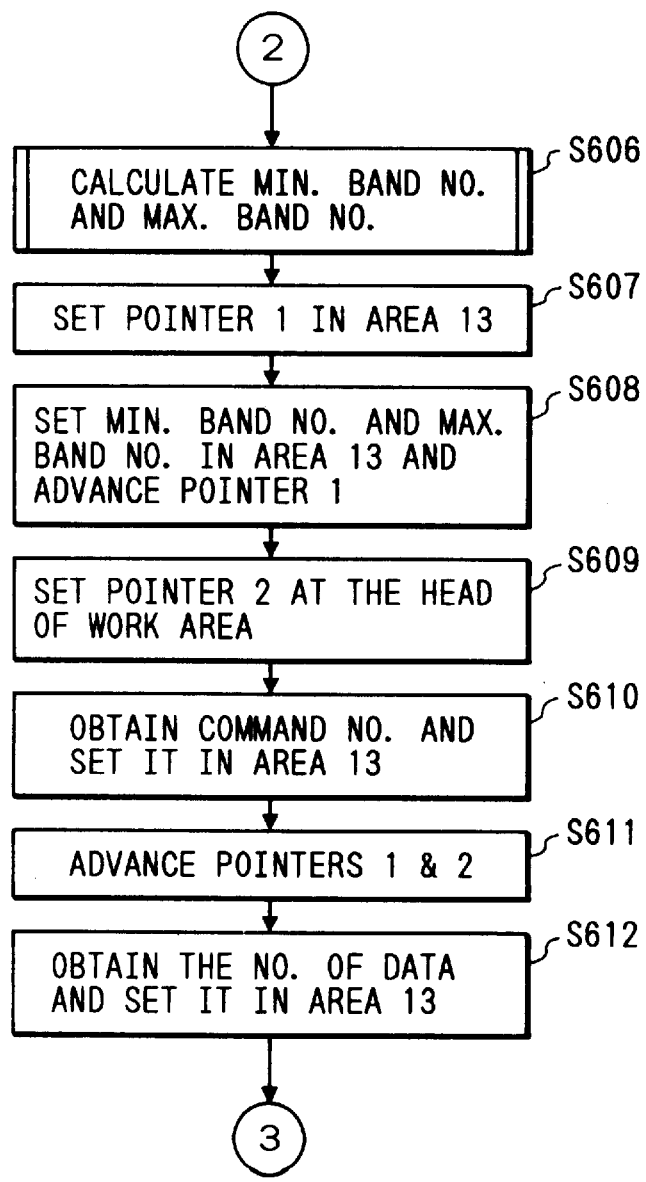
FIG. 44 is a flow chart showing the processing upon execution of the line-drawing-command-analysis function.
Figure 45:
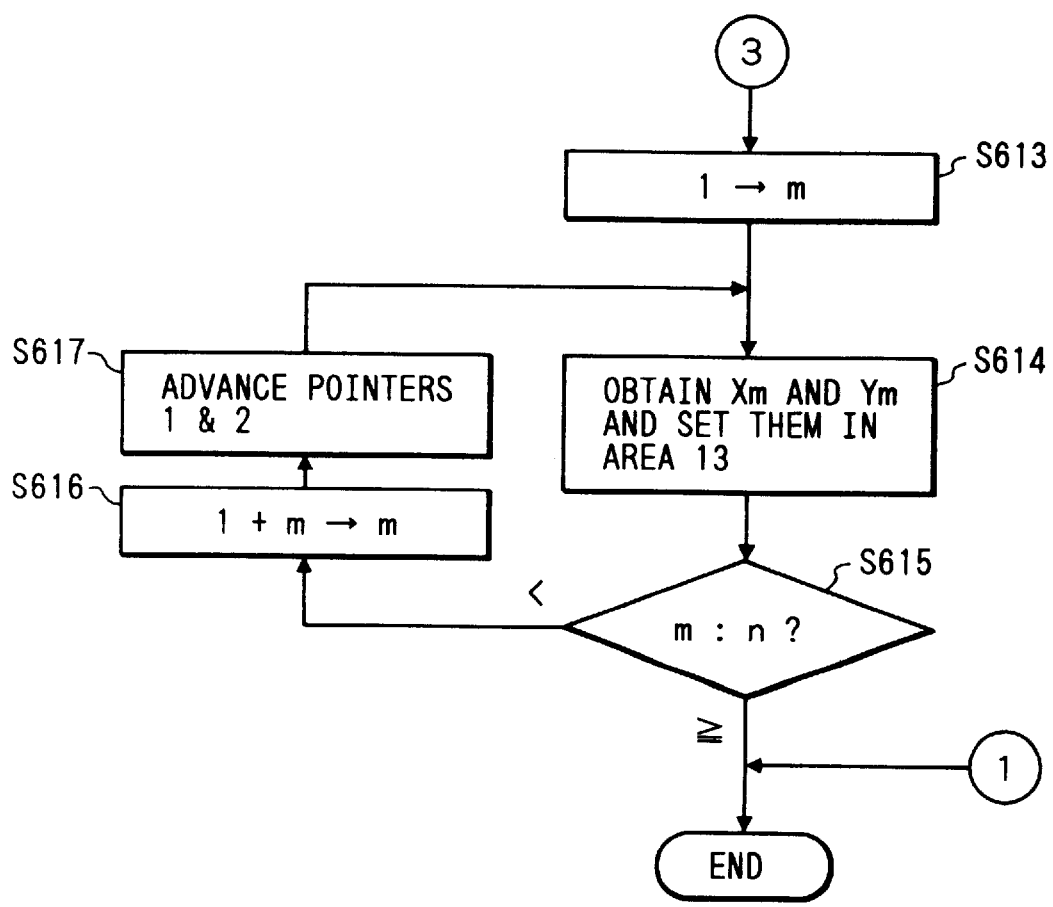
FIG. 45 is a flow chart showing the processing upon execution of the line-drawing-command-analysis function.

FIGS. 43 to 45 show processing upon execution of a line-drawing-command-analysis function in step S34 in FIG. 32.

In step S600, data are set in a work area, and xmin, ymin, xmax, and ymax are set. Thereafter, the flow advances to step S601.

In step S601, a drawing range (a line and a polygon) is calculated, and the flow advances to step S602.

In step S602, clip check processing for the drawing range is performed, and the flow advances to step S603.

In step S603, a drawing range flag set in the clip check processing of the drawing range is checked.

If it is determined in step S603 that the drawing range flag=ERROR, the processing is ended.

However, if it is determined in step S603 that the drawing range flag≠ERROR, the flow advances to step S604 to set color designation information (line). Thereafter, the flow advances to step S605.

In step S605, information for the path control table 20 used in the output unit 19 is set, and the flow advances to step S606.

In step S606, the min band No. and the max band No. are calculated, and the flow advances to step S607.

In step S607, a pointer 1 is set in the memory development information area 13, and the flow advances to step S608.

In step S608, the min band No. and the max band No. are set in the memory development information area 13 to advance the pointer 1, and the flow then advances to step S609.

In step S609, a pointer 2 is set at the head of the work area, and the flow advances to step S610.

In step S610, a command No. is obtained from the work area, and is set in the memory development information area 13. Thereafter, the flow advances to step S611.

In step S611, the pointers 1 and 2 are advanced, and the flow advances to step S612.

In step S612, the number of data is obtained from the work area, and is set in the memory development information area 13. The flow then advances to step S613.

In step S613, 1 is set in m, and the flow advances to step S614.

In step S614, xm and ym are obtained from the work area, and are set in the memory development information area 13. Thereafter, the flow advances to step S615.

In step S615, m and n (the numbers of coordinates) are compared with each other.

If m is equal to or larger than n, the processing is ended.

However, if n is larger than m, the flow advances to step S616 to increment m by 1, and the flow advances to step S617.

In step S617, the pointers 1 and 2 are advanced, and the flow returns to step S614.

In this manner, the line drawing command is analyzed, and memory development information of the line drawing command is generated.

Figure 46:
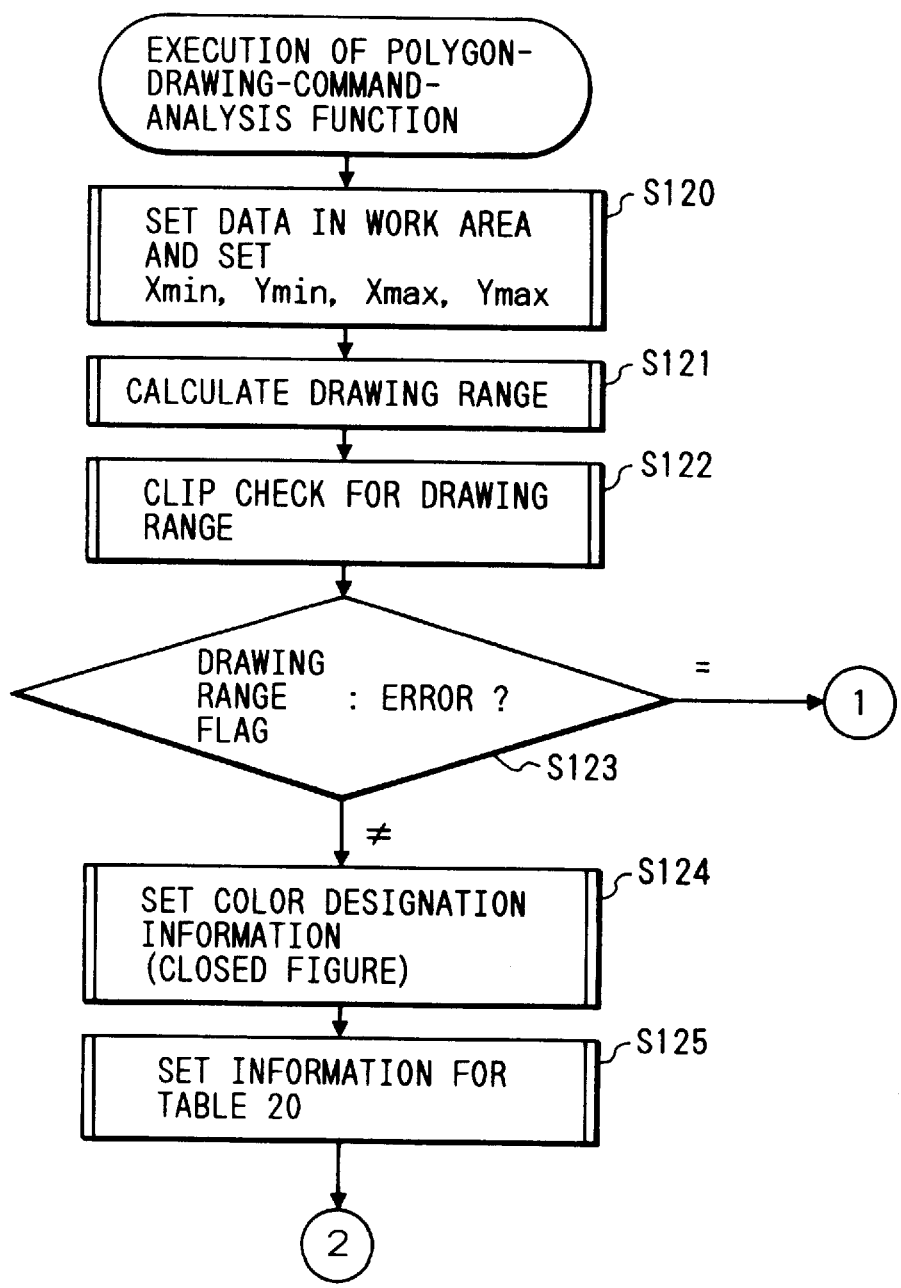
FIG. 46 is a flow chart showing processing upon execution of a polygon-drawing-command-analysis function.
Figure 47:
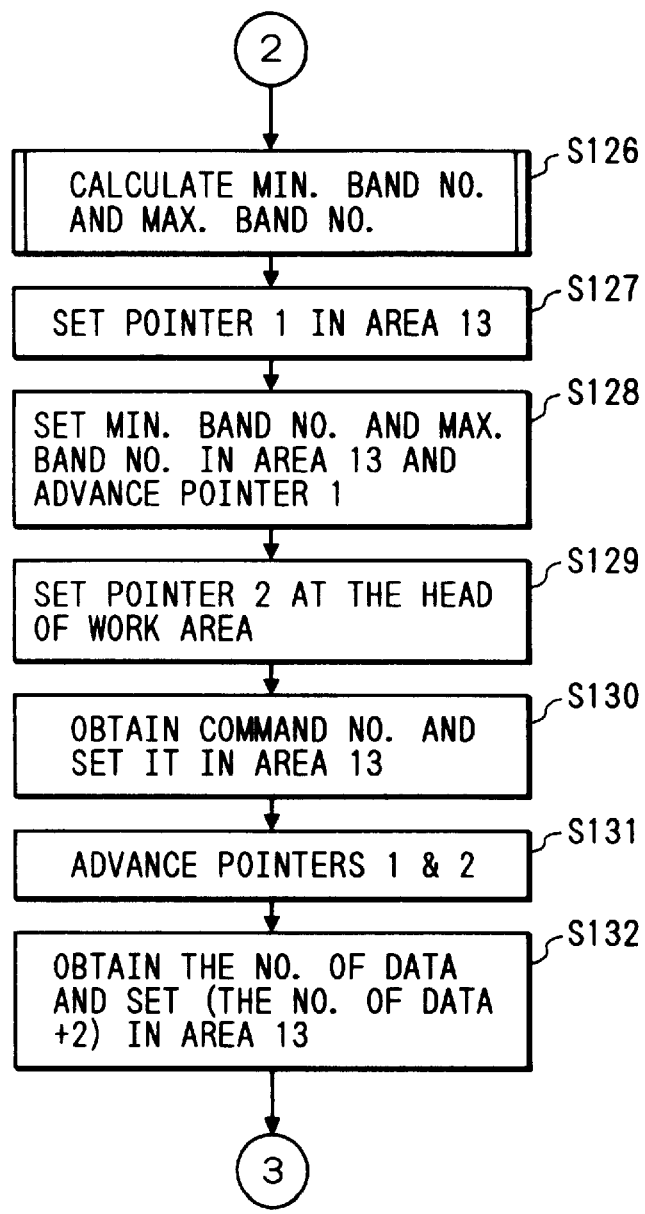
FIG. 47 is a flow chart showing the processing upon execution of the polygon-drawing-command-analysis function.
Figure 48:
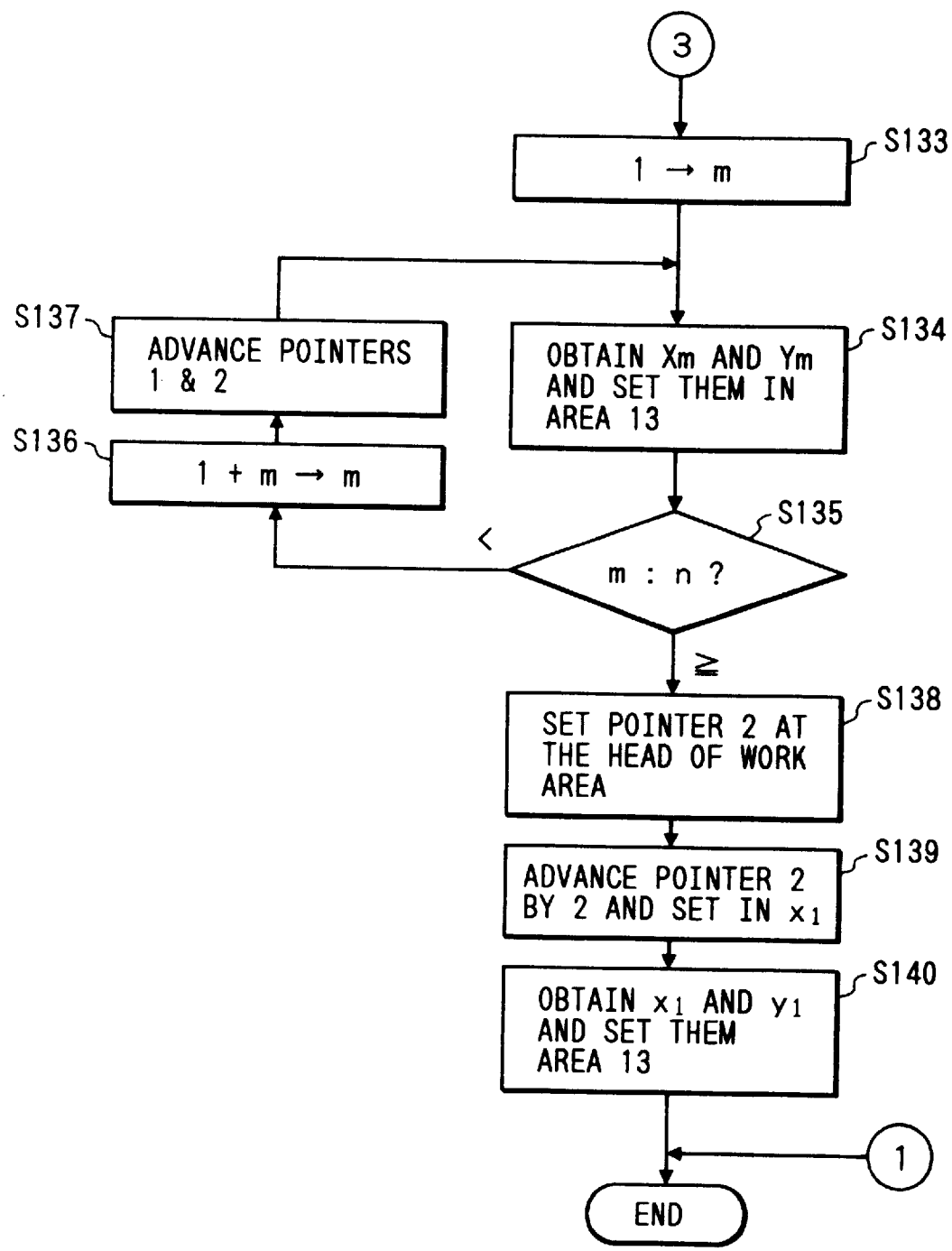
FIG. 48 is a flow chart showing the processing upon execution of the polygon-drawing-command-analysis function.

FIGS. 46 to 48 show processing upon execution of a polygon-drawing-command-analysis function in step S34 in FIG. 32.

In step S120, data are set in a work area, and xmin, ymin, xmax, and ymax are set. Thereafter, the flow advances to step S121.

In step S121, a drawing range (a line and a polygon) is calculated, and the flow advances to step S122.

In step S122, clip check processing for the drawing range is performed, and the flow advances to step S123.

In step S123, a drawing range flag set in the clip check processing of the drawing range is checked.

If it is determined in step S123 that the drawing range flag=ERROR, the processing is ended.

However, if it is determined in step S123 that the drawing range flag≠ERROR, the flow advances to step S124 to set color designation information (closed figure). Thereafter, the flow advances to step S125.

In step S125, information for the path control table 20 used in the output unit 19 is set, and the flow advances to step S126.

In step S126, the min band No. and the max band No. are calculated, and the flow advances to step S127.

In step S127, a pointer 1 is set in the memory development information area 13, and the flow advances to step S128.

In step S128, the min band No. and the max band No. are set in the memory development information area 13 to advance the pointer 1, and the flow then advances to step S129.

In step S129, a pointer 2 is set at the head of the work area, and the flow advances to step S130.

In step S130, a command No. is obtained from the work area, and is set in the memory development information area 13. Thereafter, the flow advances to step S131.

In step S131, the pointers 1 and 2 are advanced, and the flow advances to step S132.

In step S132, the number of data is obtained from the work area, and is set in the memory development information area 13. The flow then advances to step S133.

In step S133, 1 is set in m, and the flow advances to step S134.

In step S134, xm and ym are obtained from the work area, and are set in the memory development information area 13. Thereafter, the flow advances to step S135.

In step S135, m and n (the numbers of coordinates) are compared with each other.

If n is larger than m, the flow advances to step S136 to increment m by 1, and the flow advances to step S137.

In step S137, the pointers 1 and 2 are advanced, and the flow returns to step S134.

If it is determined in step S135 that m is equal to or larger than n, the flow advances to step S138.

In step S138, the pointer 2 is set at the head of the work area, and the flow advances to step S139.

In step S139, the pointer 2 is advanced by 2, and is set in x1. The flow then advances to step S140.

In step S140, x1 and y1 are obtained from the work area, and are set in the memory development information area 13, thus ending the processing.

In this manner, the polygon drawing command is analyzed, and memory development information of the polygon drawing command is generated.

Figure 49:
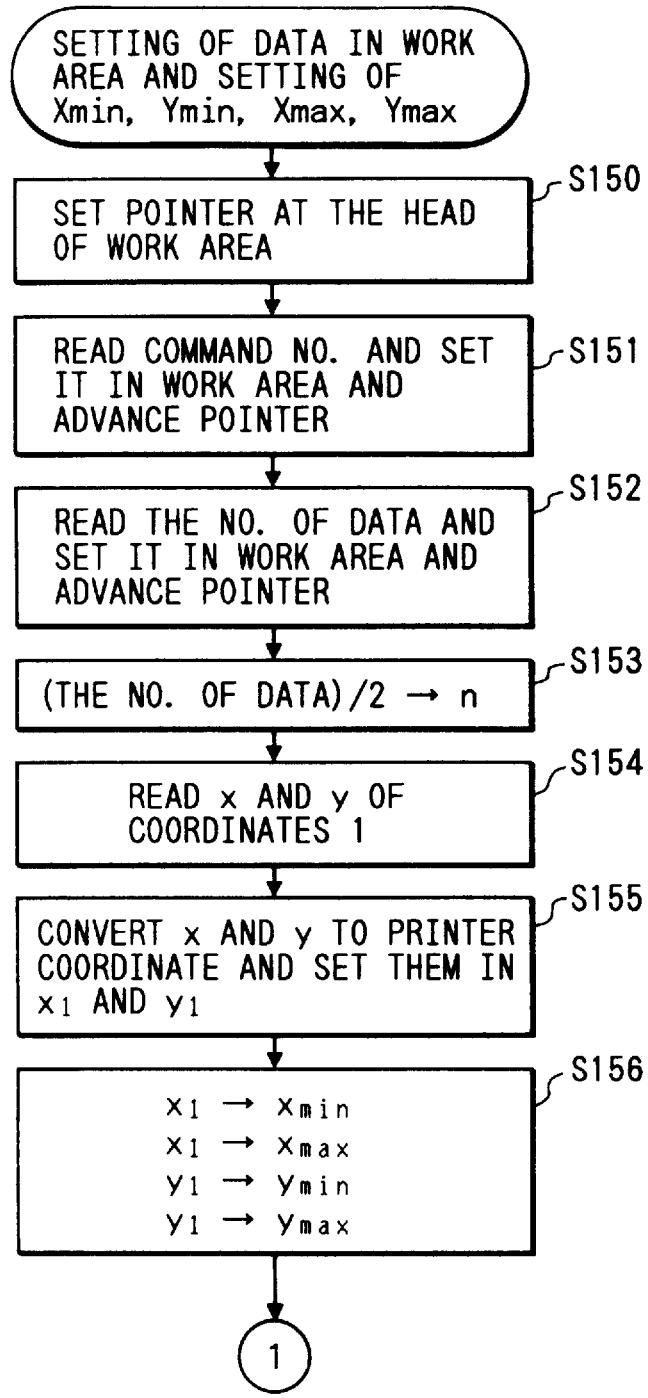
FIG. 49 is a flow chart showing processing for setting data in a work area.
Figure 50:
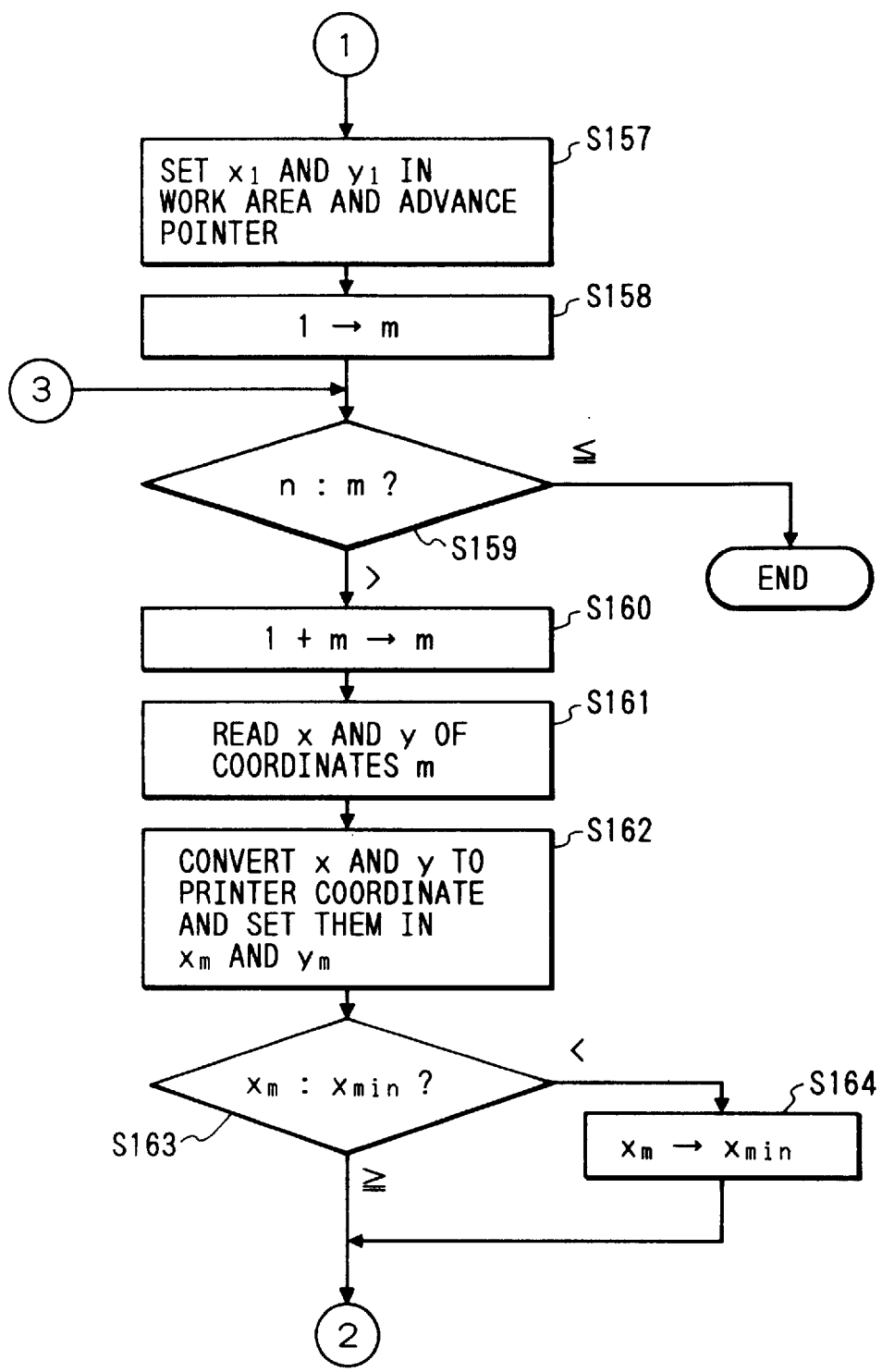
FIG. 50 is a flow chart showing the processing for setting data in the work area.
Figure 51:
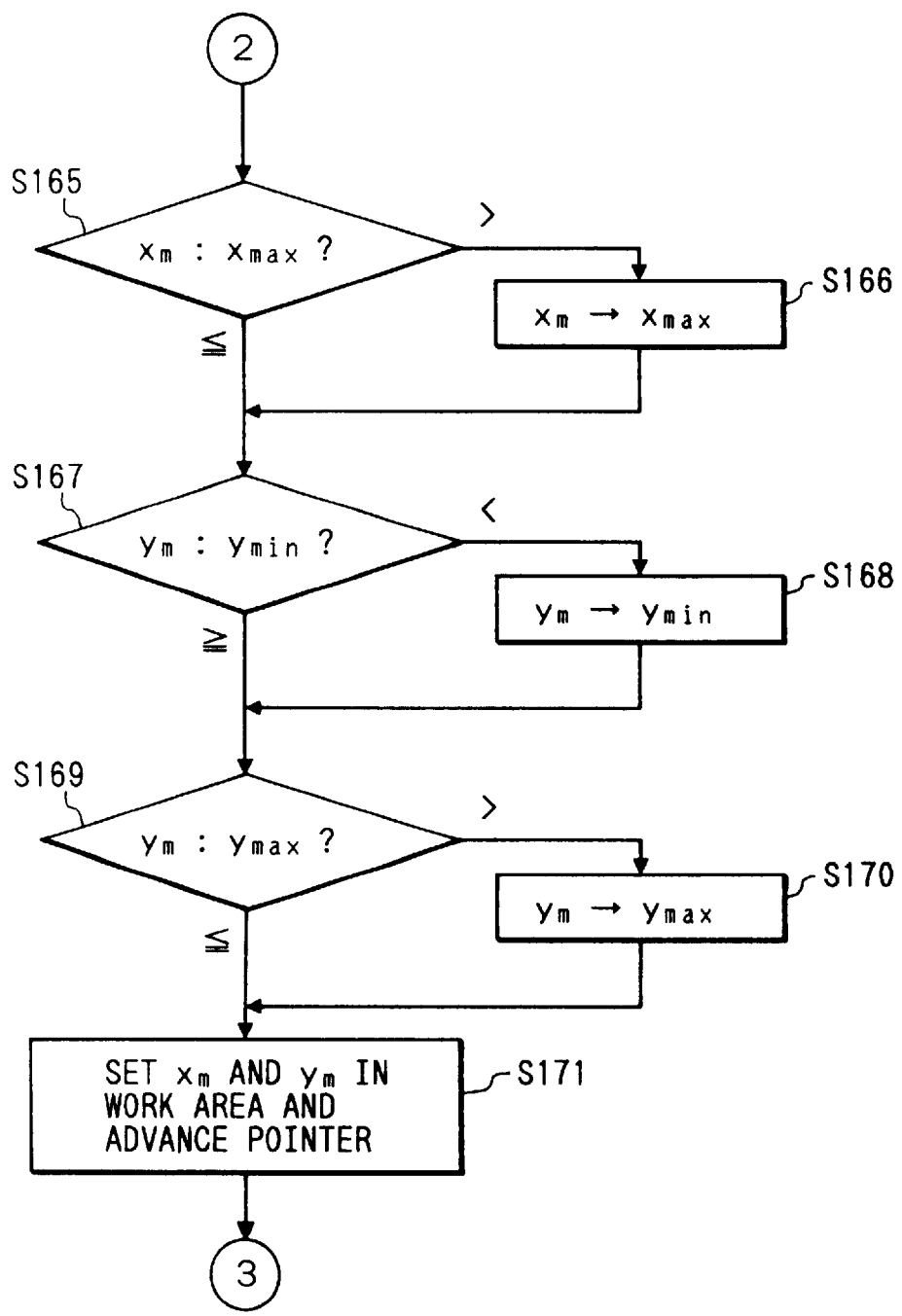
FIG. 51 is a flow chart showing the processing for setting data in the work area.
Figure 52:
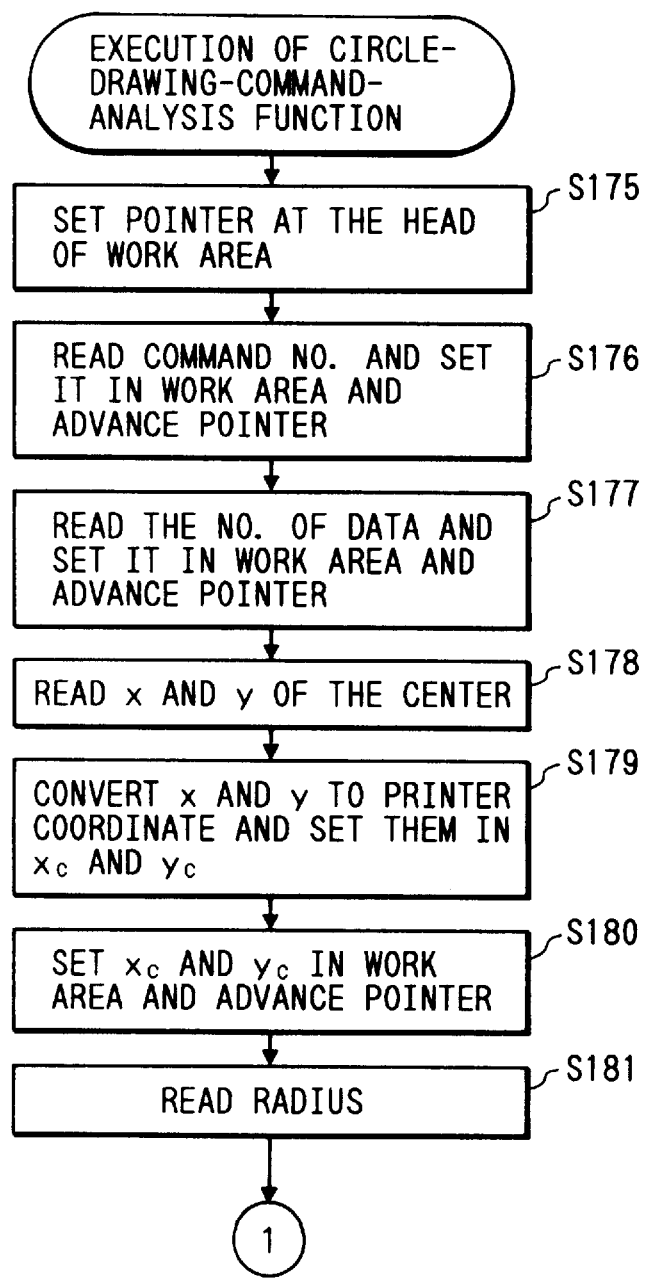
FIG. 52 is a flow chart showing processing upon execution of a circle-drawing-command-analysis function.

FIGS. 49 to 50 show details of processing for setting data in the work area, and setting xmin, ymin, xmax, and ymax in step S600 in FIG. 43 and S120 in FIG. 46.

In step S150, a pointer is set at the head of the work area, and the flow advances to step S151.

In step S151, a command No. is read, and is set in the work area to advance the pointer, and thereafter, the flow advances to step S152.

In step S152, the number of data is read, and is set in the work area to advance the pointer. Thereafter, the flow advances to step S153.

In step S153, a value ½ the number of data (the number of coordinate points of a line) is set in a constant n, and the flow advances to step S154.

In step S154, x- and y-coordinates of coordinates 1 are read, and the flow advances to step S155.

In step S155, the x- and y-coordinates of the coordinates 1 are converted into printer coordinates, and are set in x1 and y1. The flow then advances to step S156.

In step S156, x1 is set in xmin and xmax, and y1 is set in ymin and ymax. The flow then advances to step S157.

In step S157, x1 and y1 are set in the work area to advance the pointer. Thereafter, the flow advances to step S158.

In step S158, 1 is set in m, and the flow advances to step S159.

In step S159, m and n (the numbers of coordinates) are compared with each other.

If m is equal to or larger than n, the processing is ended.

However, if n is larger than m, the flow advances to step S160 to increment m by 1, and the flow advances to step S161.

In step S161, x- and y-coordinates of coordinates m are read, and the flow advances to step S162.

In step S162, the x- and y-coordinates of the coordinates m are converted into printer coordinates, and are set in xm and ym. Thereafter, the flow advances to step S163.

In step S163, values xm and xmin are compared with each other.

If xm is equal to or larger than xmin, the flow advances to step S165.

If xmin is larger than xm, the flow advances to step S164 to set the value xm in xmin, and the flow advances to step S165.

In step S165, values xm and xmax are compared with each other.

If xmax is equal to or larger than xm, the flow advances to step S167.

If xm is larger than xmax, the flow advances to step S166 to set the value xm in xmax, and the flow advances to step S167.

In step S167, values ym and ymin are compared with each other.

If ym is equal to or larger than ymin, the flow advances to step S169.

If ymin is larger than ym, the flow advances to step S168 to set the value ym in ymin, and the flow advances to step S169.

In step S169, values ym and ymax are compared with each other.

If ymax is equal to or larger than ym, the flow advances to step S171.

If ym is larger than ymax, the flow advances to step S170 to set the value ym in ymax, and the flow advances to step S171.

In step S171, xm and ym are set in the work area to advance the pointer. Thereafter, the flow returns to step S159.

In this manner, data can be set in the work area, and xmin, ymin, xmax, and ymax can be set.

FIGS. 52 to 55 show processing upon execution of a circle-drawing-command-analysis function in step S34 in FIG. 32.

In step S175, a pointer is set at the head of the work area, and the flow advances to step S176.

In step S176, a command No. is read, and is set in the work area to advance the pointer. Thereafter, the flow advances to step S177.

In step S177, the number of data is read, and is set in the work area to advance the pointer, and the flow then advances to step S178.

In step S178, x- and y-coordinates of the center are read, and the flow advances to step S179.

In step S179, the x- and y-coordinates of the center are converted into printer coordinates, and are set in xc and yc. Thereafter, the flow advances to step S180.

In step S180, xc and yc are set in the work area to advance the pointer, and the flow then advances to step S181.

In step S181, a radius value is read from the command, and the flow advances to step S182.

In step S182, the radius value is converted into a pixel (dot) value on the basis of the resolution of the image processing apparatus, and is set in r. Thereafter, the flow advances to step S183.

In step S183, r is set in the work area, and the flow advances to step S184.

In step S184, the drawing range of a circle is calculated, and the flow advances to step S185.

In step S185, clip check processing of the drawing range is executed, and the flow then advances to step S186.

In step S186, a drawing range flag set in the clip check processing of the drawing range is checked.

If it is determined in step S186 that the drawing range flag=ERROR, the processing is ended.

However, if it is determined in step S186 that the drawing range flag≠ERROR, the flow advances to step S187 to set color designation information (closed figure), and the flow then advances to step S188.

In step S188, information for the path control table 20 used in the output unit 19 is set, and the flow advances to step S189.

In step S189, the min band No. and the max band No. are calculated, and the flow advances to step S190.

In step S190, a pointer 1 is set in the memory development information area 13, and the flow advances to step S191.

In step S191, the min band No. and the max band No. are set in the memory development information area 13 to advance the pointer 1, and the flow then advances to step S192.

In step S192, a pointer 2 is set at the head of the work area, and the flow then advances to step S193.

In step S193, the command No. is obtained from the work area, and is set in the memory development information area 13. Thereafter, the flow advances to step S194.

In step S194, the pointers 1 and 2 are advanced, and the flow advances to step S195.

In step S195, the number of data is obtained from the work area, and is set in the memory development information area 13. The flow then advances to step S196.

In step S196, the pointers 1 and 2 are advanced, and the flow advances to step S197.

In step S197, xc and yc are obtained from the work area, and are set in the memory development information area 13. Thereafter, the flow advances to step S198.

In step S198, the pointers 1 and 2 are advanced, and the flow advances to step S199.

In step S199, r is obtained from the work area, and is set in the memory development information area 13, thus ending the processing.

In this manner, the circle drawing command is analyzed, and memory development information of the circle drawing command is generated.

FIGS. 56 to 59 show processing upon execution of a character-drawing-command-analysis function in step S34 in FIG. 32.

In step S210, a pointer is set at the head of the work area, and the flow advances to step S211.

In step S211, a command No. is read, and is set in the work area to advance the pointer. The flow then advances to step S212.

In step S212, the number of data is read, and the flow advances to step S213.

In step S213, x- and y-coordinates of a drawing position are read, and the flow advances to step S214.

In step S214, the x- and y-coordinates of the drawing position are converted into printer coordinates, and are set in xr and yr. Thereafter, the flow advances to step S215.

In step S215, character data is read from the command, and is converted into an internal code. The flow then advances to step S216.

In step S216, (the number of data in the internal code)+2 is set as the number of data in the work area to advance the pointer, and the flow advances to step S217.

In step S217, xr and yr are set in the work area to advance the pointer, and the flow advances to step S218.

In step S218, the internal code is set in the work area, and the flow advances to step S219.

In step S219, the drawing range of a character is calculated, and the flow advances to step S220.

In step S220, clip check processing of the drawing range is executed, and the flow then advances to step S221.

In step S221, a drawing range flag set in the clip check processing of the drawing range is checked.

If it is determined in step S221 that the drawing range flag=ERROR, the processing is ended.

However, if it is determined in step S221 that the drawing range flag≠ERROR, the flow advances to step S222 to set color designation information (character), and the flow then advances to step S223.

In step S223, information for the path control table 20 used in the output unit 19 is set, and the flow advances to step S224.

In step S224, the min band No. and the max band No. are calculated, and the flow advances to step S225.

In step S225, a pointer 1 is set in the memory development information area 13, and the flow advances to step S226.

In step S226, the min band No. and the max band No. are set in the memory development information area 13 to advance the pointer 1, and the flow then advances to step S227.

In step S227, a pointer 2 is set at the head of the work area, and the flow then advances to step S228.

In step S228, the command No. is obtained from the work area, and is set in the memory development information area 13. Thereafter, the flow advances to step S229.

In step S229, the pointers 1 and 2 are advanced, and the flow advances to step S230.

In step S230, the number of data is obtained from the work area, and is set in the memory development information area 13. The flow then advances to step S231.

In step S231, the pointers I and 2 are advanced, and the flow advances to step S232.

In step S232, xr and yr are obtained from the work area, and are set in the memory development information area 13. The flow then advances to step S233.

In step S233, the pointers 1 and 2 are advanced, and the flow advances to step S234.

In step S234, the internal code is obtained from the work area, and is set in the memory development information area 13, thus ending the processing.

In this manner, the character drawing command is analyzed, and memory development information of the character drawing command is generated.

Figure 60:
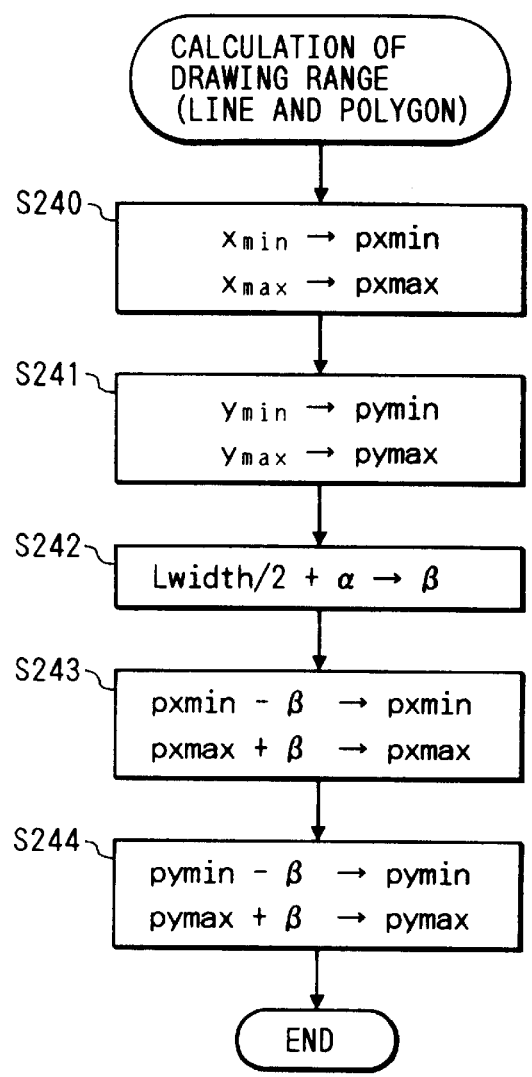
FIG. 60 is a flow chart showing processing for calculating a drawing range.

FIG. 60 shows details of the processing for calculating the drawing range in step S601 in FIG. 43 and in step S121 in FIG. 46.

In step S240, xmin and xmax are respectively set in pxmin and pxmax, and the flow advances to step S241.

In step S241, ymin and ymax are respectively set in pymin and pymax, and the flow advances to step S242.

In step S242, $\alpha$ (a constant equal to or larger than 0) is added to Lwidth/2, and the sum is set in $\beta$. The flow then advances to step S243.

In step S243, pxmin−$\beta$ is set in pxmin, and pxmax +$\beta$ is set in pxmax. The flow then advances to step S244.

In step S244, pymin−$\beta$ is set in pymin, and pymax +$\beta$ is set in pymax, thus ending the processing.

In this manner, the drawing range for a line and a polygon can be calculated.

Figure 61:
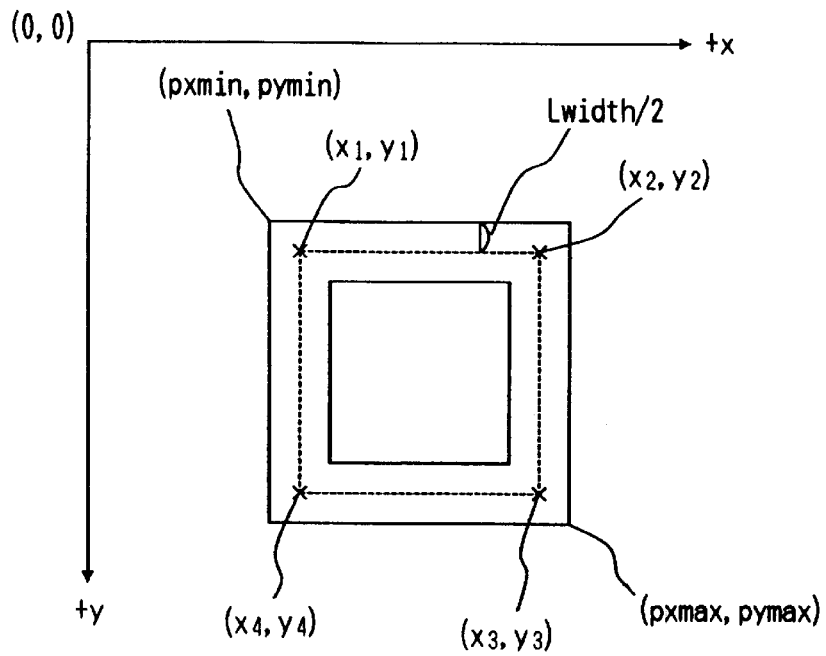
FIG. 61 is a view showing a drawing range of a polygon.

FIG. 61 shows a drawing range for a polygon designated by four points (x1, y1) to (x4, y4).

This range is a rectangular area surrounded by (pxmin, pymin) and (pxmax, pymax), and corresponds to a calculation result when the value $\alpha$ is set to be 0 in the processing shown in FIG. 60.

Figure 53:
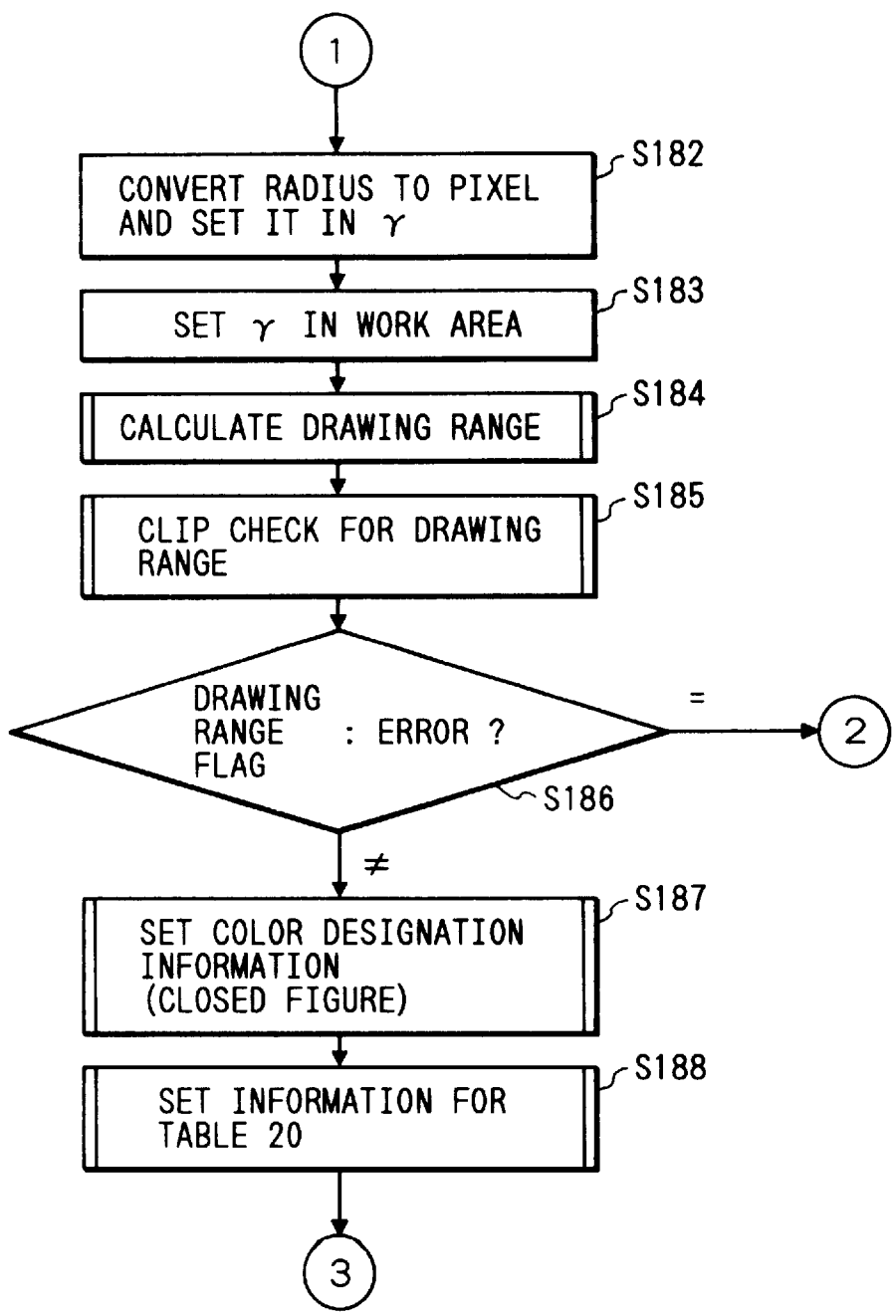
FIG. 53 is a flow chart showing the processing upon execution of the circle-drawing-command-analysis function.
Figure 62:
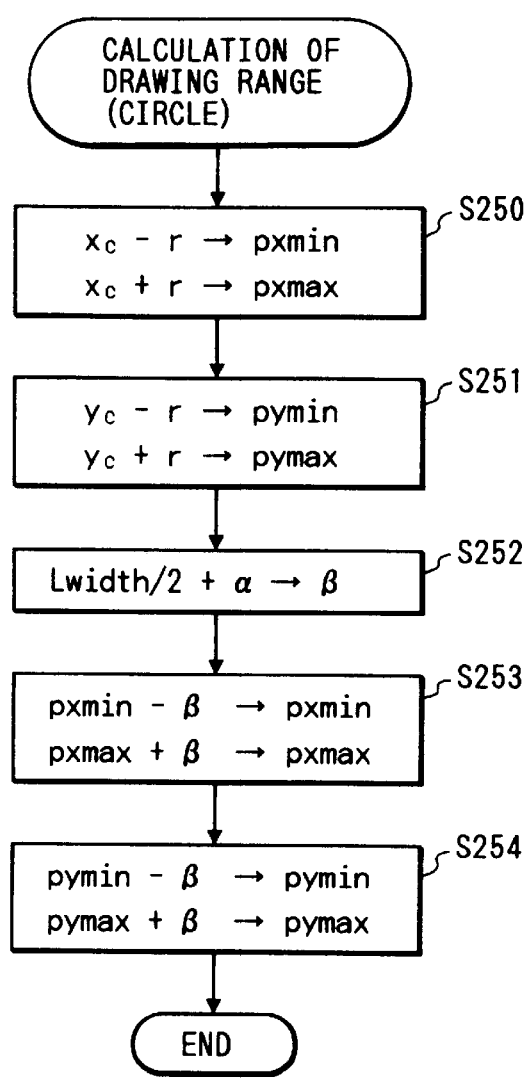
FIG. 62 is a flow chart showing processing for calculating a circle drawing range.

FIG. 62 shows details of the processing for calculating the drawing range for a circle in step S184 in FIG. 53.

In step S250, xc−r is set in pxmin, and xc+r is set in pxmax. The flow advances to step S251.

In step S251, yc−r is set in pymin, and yc+r is set in pymax. The flow advances to step S252.

In step S252, $\alpha$ (a constant equal to or larger than 0) is added to Lwidth/2, and the sum is set in β. The flow then advances to step S253.

In step S253, pxmin−β is set in pxmin, and pxmax +β is set in pxmax. The flow then advances to step S254.

In step S254, pymin−β is set in pymin, and pymax +β is set in pymax, thus ending the processing.

In this manner, the drawing range for a circle can be calculated.

Figure 63:
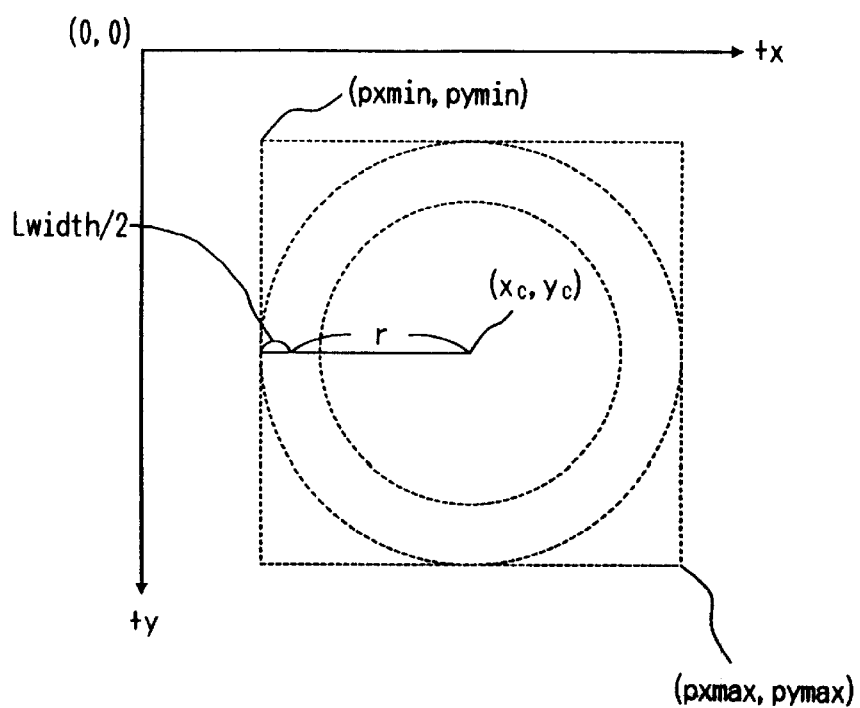
FIG. 63 is a view showing a circle drawing range.

FIG. 63 shows the drawing range for a circle.

This range is a rectangular area surrounded by (pxmin, pymin) and (pxmax, pymax), and corresponds to a calculation result when the value $\alpha$ is set to be 0 in the processing shown in FIG. 62.

Figure 57:
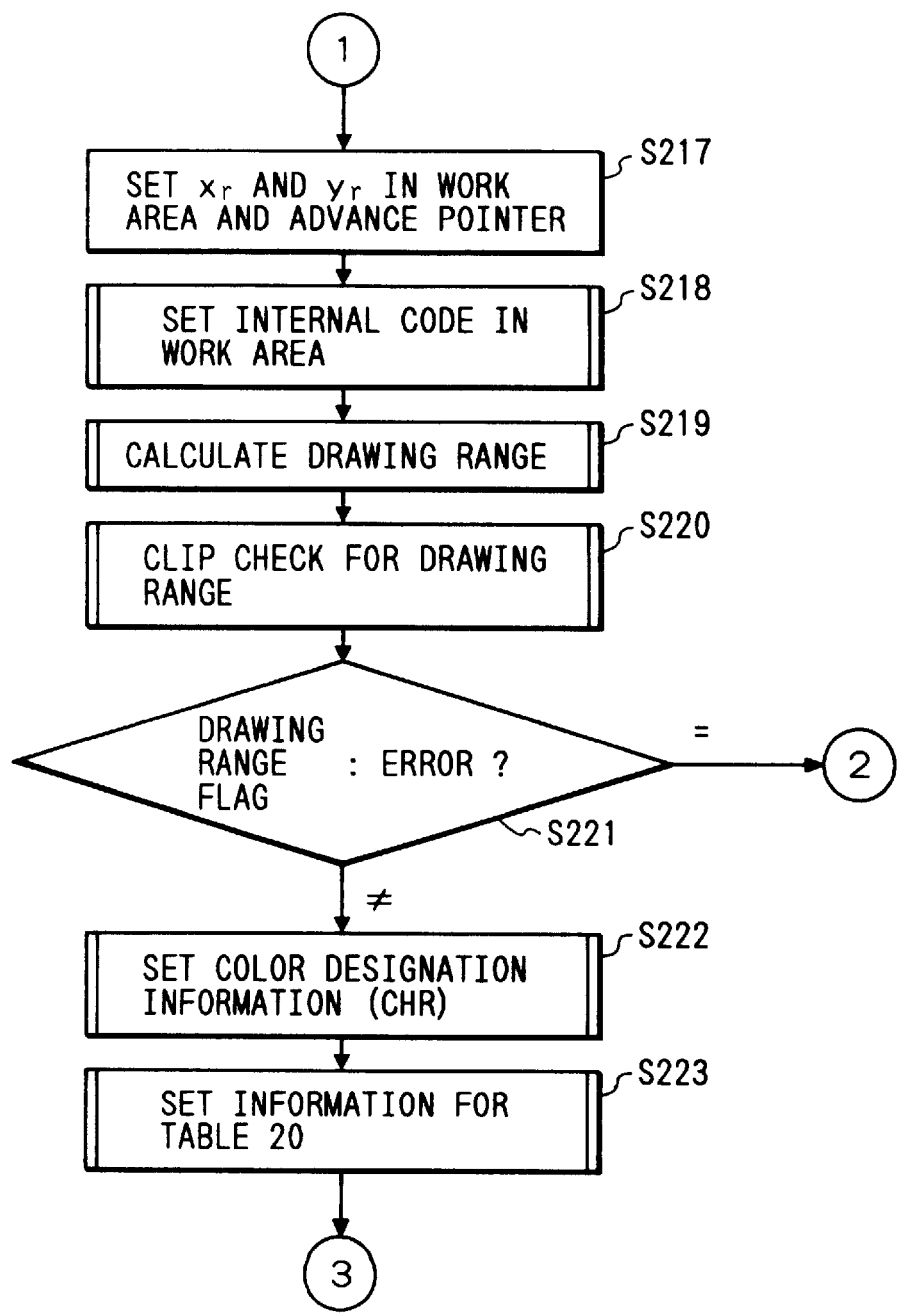
FIG. 57 is a flow chart showing the processing upon execution of the character-drawing-command-analysis function.
Figure 64:
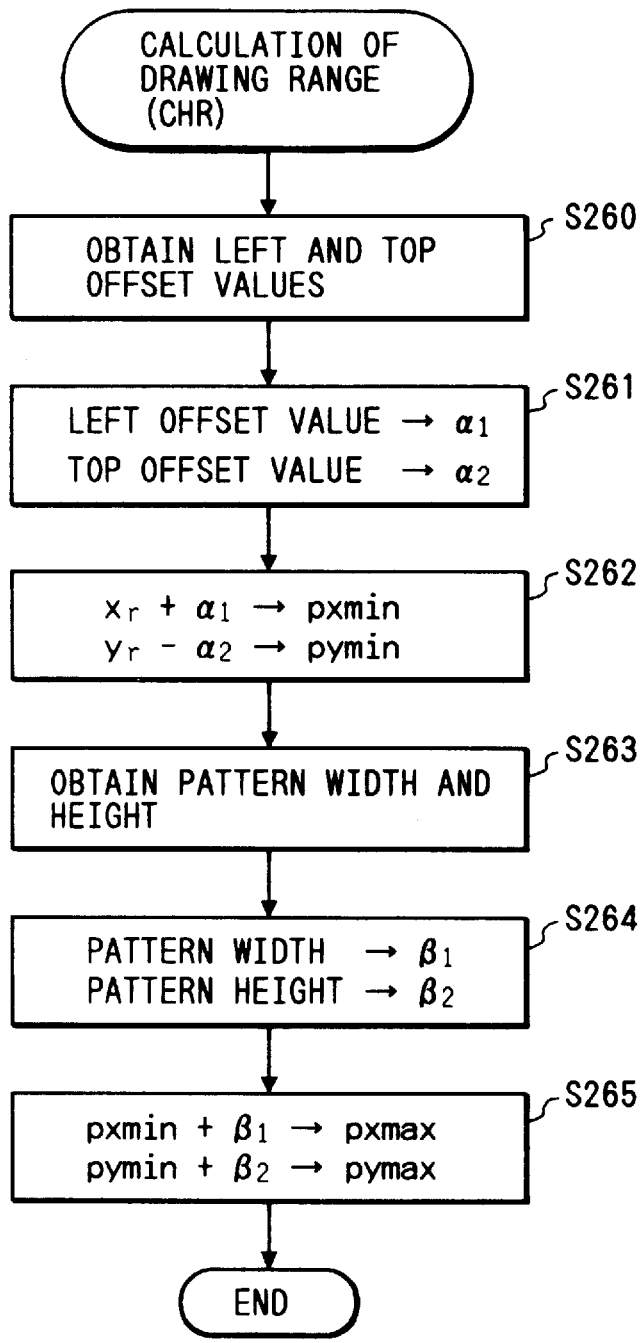
FIG. 64 is a flow chart showing processing for calculating a character drawing range.

FIG. 64 shows details of the processing for calculating the drawing range for a character in step S219 in FIG. 57.

In step S260, left and top offset values are obtained from the character storage 9 (FIG. 13), and the flow advances to step S261.

In step S261, the left and top offset values are respectively set in α1 and α2, and the flow advances to step S262.

In step S262, xr+α1 is set in pxmin, and yr+α2 is set in pymin. The flow then advances to step S263.

In step S263, a pattern width and pattern height are obtained from the character storage 9, and the flow advances to step S264.

In step S264, the pattern width is set in β1, and the pattern height is set in β2. The flow then advances to step S265.

In step S265, pxmin+β1 is set in pxmax, and pymin+β2 is set in pymax. Thus, the processing is ended.

In this manner, the drawing range for a character can be calculated.

Figure 65:
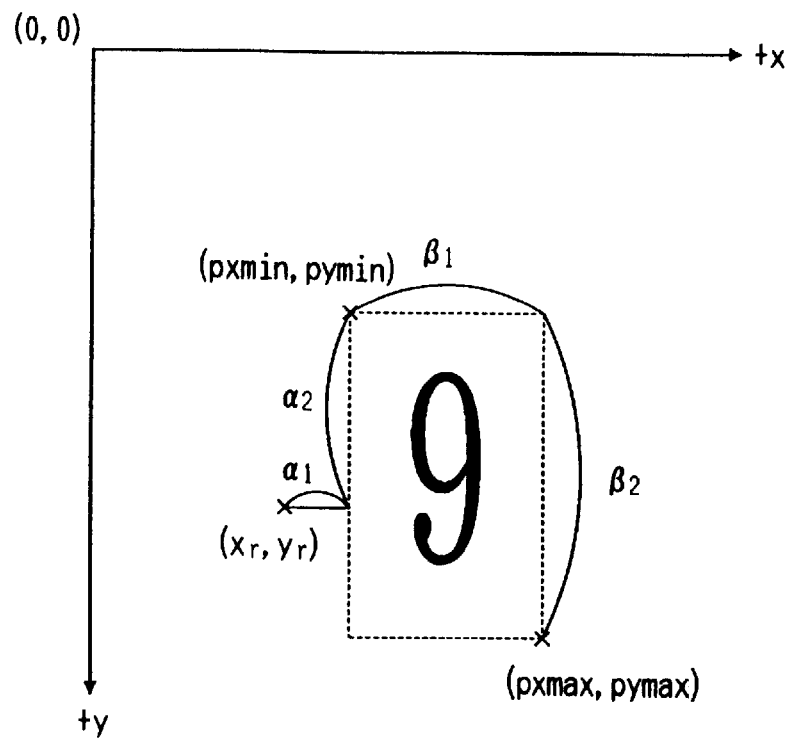
FIG. 65 is a view showing a character drawing range.

FIG. 65 shows the drawing range for a character.

This range is a rectangular area surrounded by (pxmin, pymin) and (pxmax, pymax).

Figure 66:
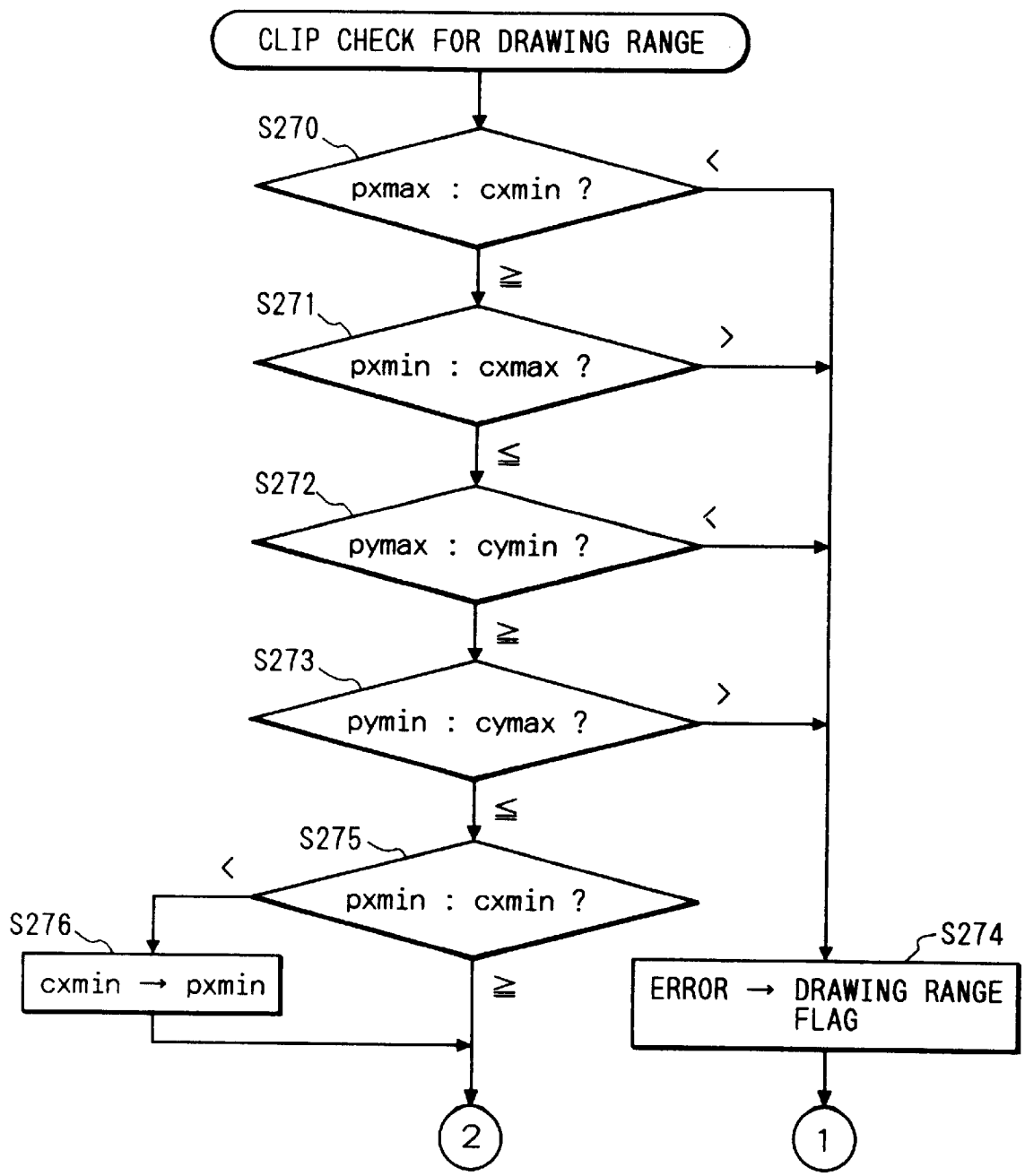
FIG. 66 is a flow chart showing clip check processing for a drawing range.
Figure 67:
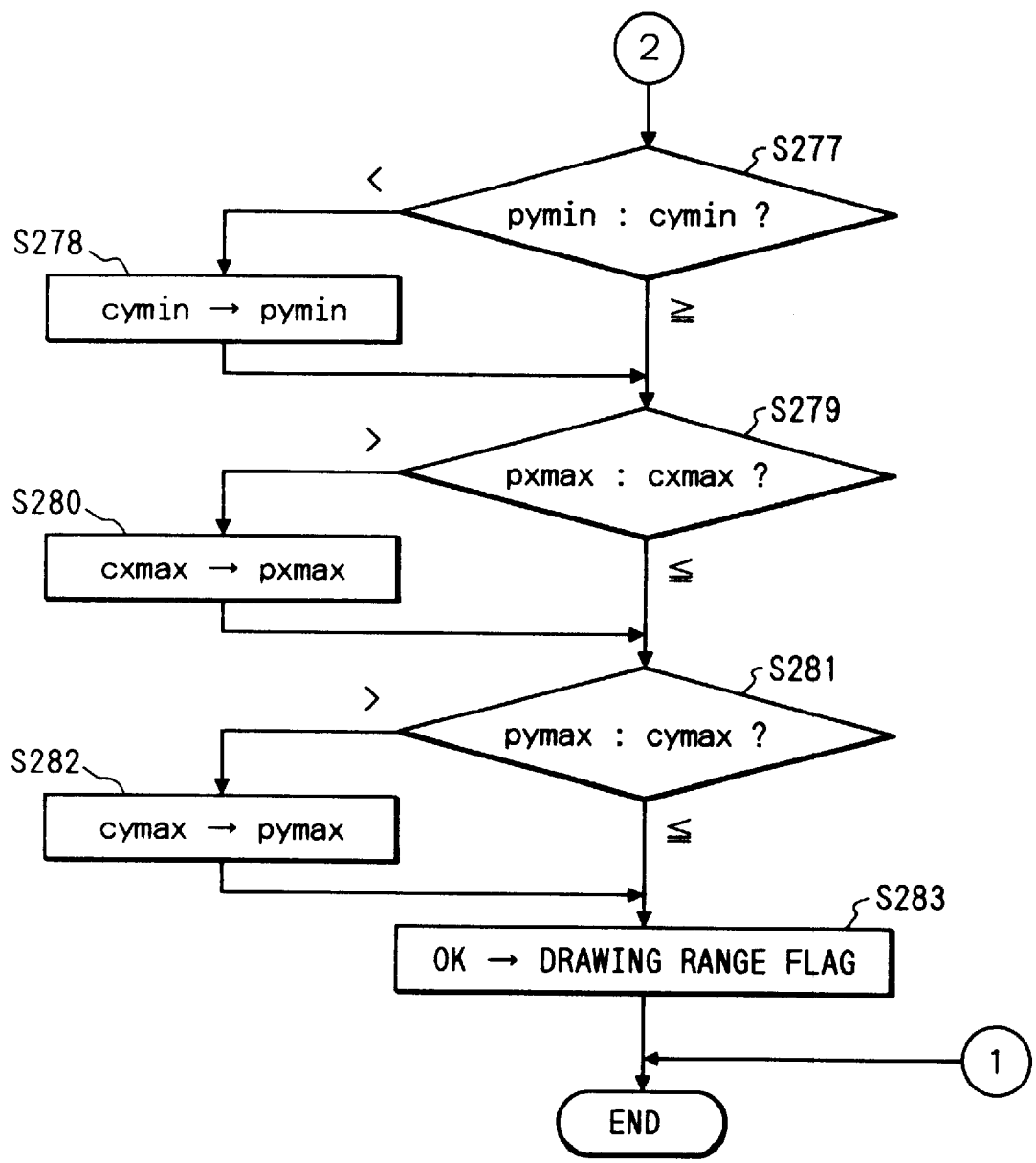
FIG. 67 is a flow chart showing the clip check processing for a drawing range.

FIGS. 66 and 67 show details of the clip check processing for the drawing range in step S602 in FIG. 43, step S122 in FIG. 46, step S185 in FIG. 53, and step S220 in FIG. 57.

In step S270, values pxmax and cxmin are compared with each other.

If cxmin is larger than the value pxmax, the flow advances to step S274, and the drawing range flag is set to be ERROR, thus ending processing.

Otherwise, the flow advances to step S271.

In step S271, values pxmin and cxmax are compared with each other.

If pxmin is larger than the value cxmax, the flow advances to step S274, and the drawing range flag is set to be ERROR, thus ending processing.

Otherwise, the flow advances to step S272.

In step S272, values pymax and cymin are compared with each other.

If cymin is larger than the value pymax, the flow advances to step S274, and the drawing range flag is set to be ERROR, thus ending processing.

Otherwise, the flow advances to step S273.

In step S273, values pymin and cymax are compared with each other.

If pymin is larger than the value cymax, the flow advances to step S274, and the drawing range flag is set to be ERROR, thus ending processing.

Otherwise, the flow advances to step S275.

In step S275, values pxmin and cxmin are compared with each other.

If cxmin is larger than the value pxmin, the flow advances to step S276, and the value cxmin is set in pxmin. The flow then advances to step S277.

Otherwise, the flow advances to step S277.

In step S277, values pymin and cymin are compared with each other.

If cymin is larger than the value pymin, the flow advances to step S278, and the value cymin is set in pymin. Thereafter, the flow advances to step S279.

If pymin$\geq$cymin in step S277, the flow advances to step S279.

In step S279, values pxmax and cxmax are compared with each other.

If pxmax is larger than the value cxmax, the flow advances to step S280, and the value cxmax is set in pxmax. The flow then advances to step S281.

If pxmax$\leq$cxmax in step S279, the flow advances to step S281.

In step S281, values pymax and cymax are compared with each other.

If pymax is larger than the value cymax, the flow advances to step S282, and the value cymax is set in pymax. The flow then advances to step S283.

If pymax$\leq$cymax in step S281, the flow advances to step S283.

In step S283, the drawing range flag is set to be OK, and the processing is ended.

In this manner, a common range between the drawing range and the clip area can be obtained.

Figure 68:
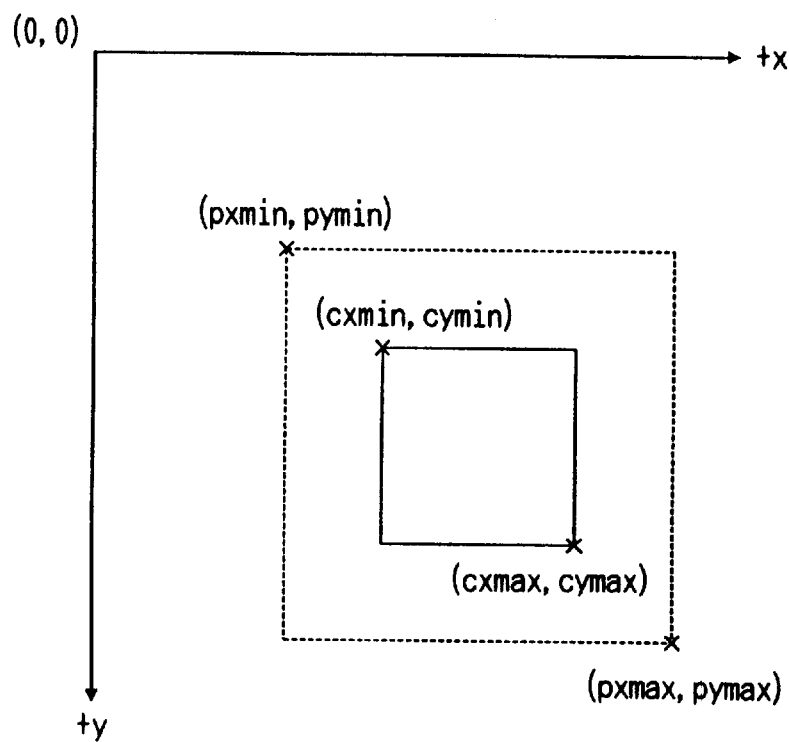
FIG. 68 is view showing a case wherein a clip area is set in a drawing range.

FIG. 68 shows a case wherein a clip area defined by a rectangular area surrounded by (cxmin, cymin) and (cxmax, cymax) is set for the drawing range defined by a rectangular area surrounded by (pxmin, pymin) and (pxmax, pymax).

With the processing shown in FIGS. 66 and 67, the drawing range shown in FIG. 68 is defined by a rectangular area surrounded by (cxmin, cymin) and (cxmax, cymax).

Figure 69:
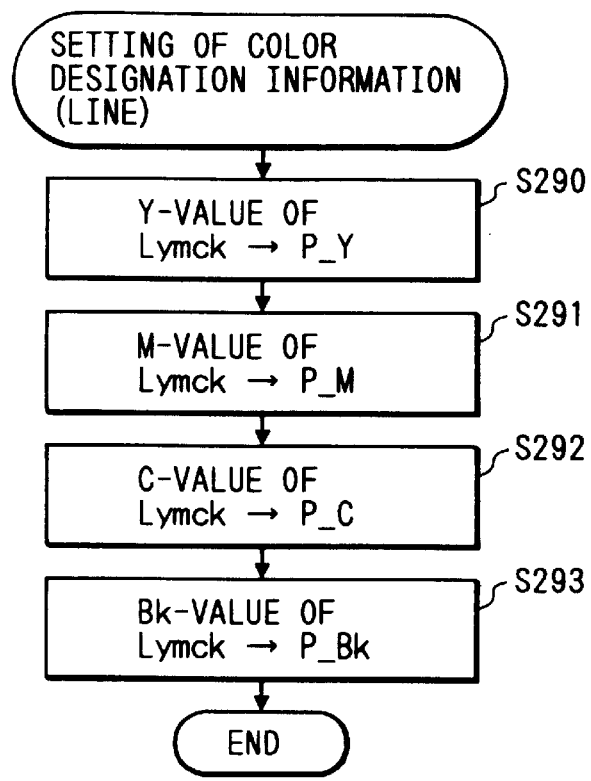
FIG. 69 is a flow chart showing processing for setting color designation information (line)

FIG. 69 shows details of the processing for setting color designation information (line) in step S604 in FIG. 43.

In step S290, a Y-value of Lymck is set in P__Y, and the flow advances to step S291.

In step S291, an M-value of Lymck is set in P__M, and the flow advances to step S292.

In step S292, a C-value of Lymck is set in P__C, and the flow advances to step S293.

In step S293, a Bk-value of Lymck is set in P__Bk, and the processing is ended.

In this manner, color designation information of a line can be set in P__Y, P__M, P__C, and P__Bk.

Figure 70:
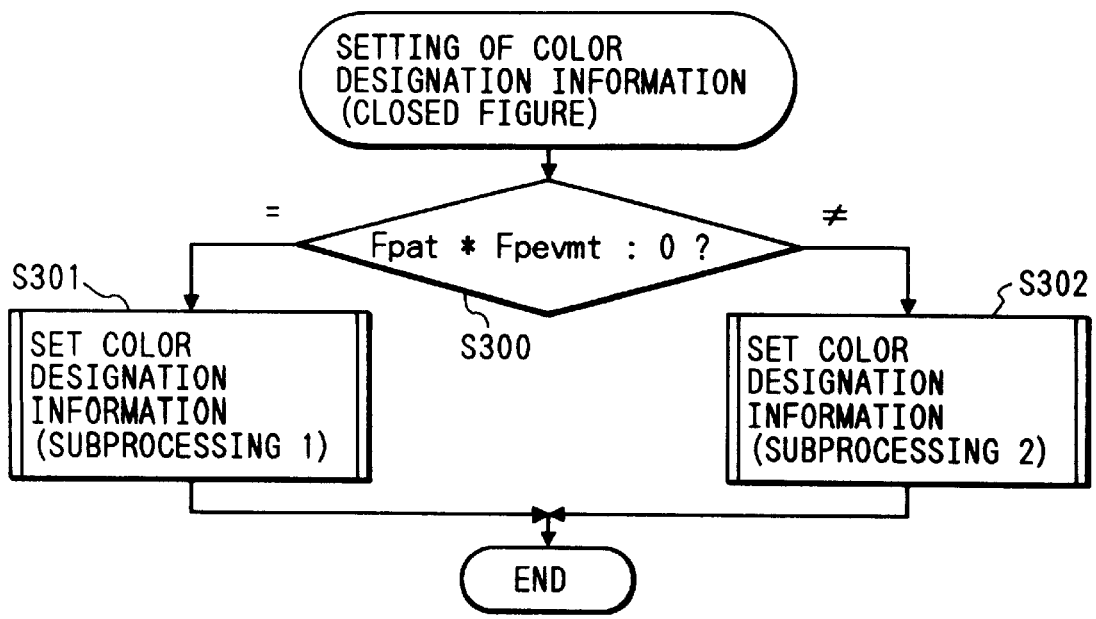
FIG. 70 is a flow chart showing processing for setting color designation information (closed figure)

FIG. 70 shows details of processing for setting color designation information (closed figure) in step S124 in FIG. 46 and step S187 in FIG. 53.

In step S300, a product of values Fpat and Fpermt is compared with 0.

If the product is equal to 0, the flow advances to step S301, and color designation information is set (subprocessing 1), thus ending the processing.

If the product is not equal to 0, the flow advances to step S302, and color designation information is set (subprocessing 2), thus ending the processing.

Figure 71:
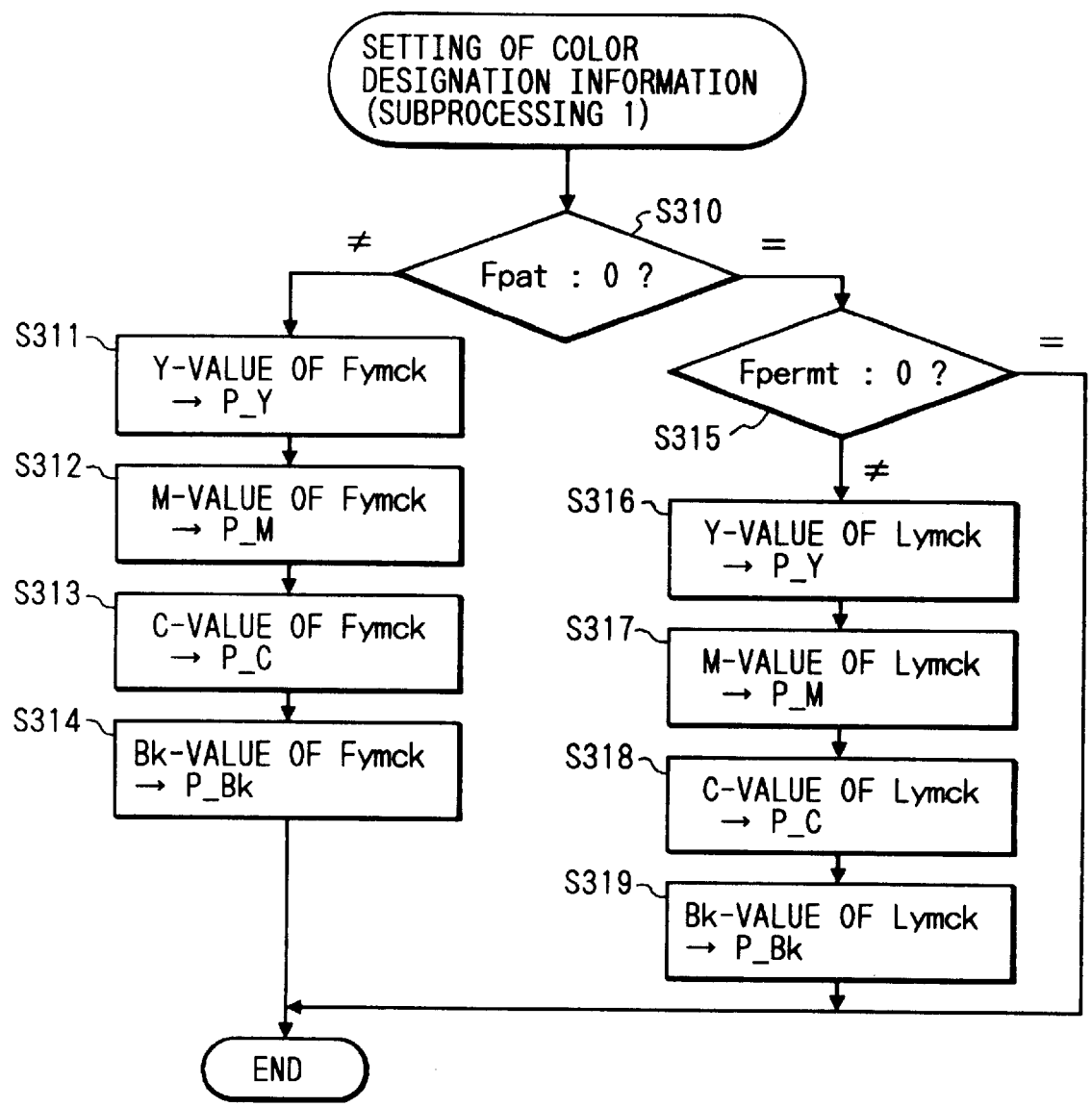
FIG. 71 is a flow chart showing processing in step S301 in FIG. 70.

FIG. 71 shows details of the processing in step S301 in FIG. 70.

In step S310, the value Fpat is compared with 0.

If the value Fpat is not equal to 0, the flow advances to step S311, and a Y-value of Fymck is set in P__Y. The flow then advances to step S312.

In step S312, an M-value of Fymck is set in P__M, and the flow advances to step S313.

In step S313, a C-value of Fymck is set in P__C, and the flow advances to step S314.

In step S314, a Bk-value of Fymck is set in P__Bk, and the processing is ended.

If it is determined in step S310 that the value Fpat is equal to 0, the flow advances to step S315, and the value Fpermt is compared with 0.

If the value Fpermt is equal to 0, the processing is ended.

If the value FpernMt is not equal to 0, a Y-value of Lyrck is set in P__Y, and the flow advances to step S317.

In step S317, an M-value of Lymck is set in P__M, and the flow advances to step S318.

In step S318, a C-value of Lyrnck is set in P__C, and the flow advances to step S319.

In step S319, a Bk-value of Lyt ck is set in P__Bk, and the processing is ended.

In this manner, color designation information for a closed figure can be set in P__Y, P__M, P__C, and P__Bk.

Figure 72:
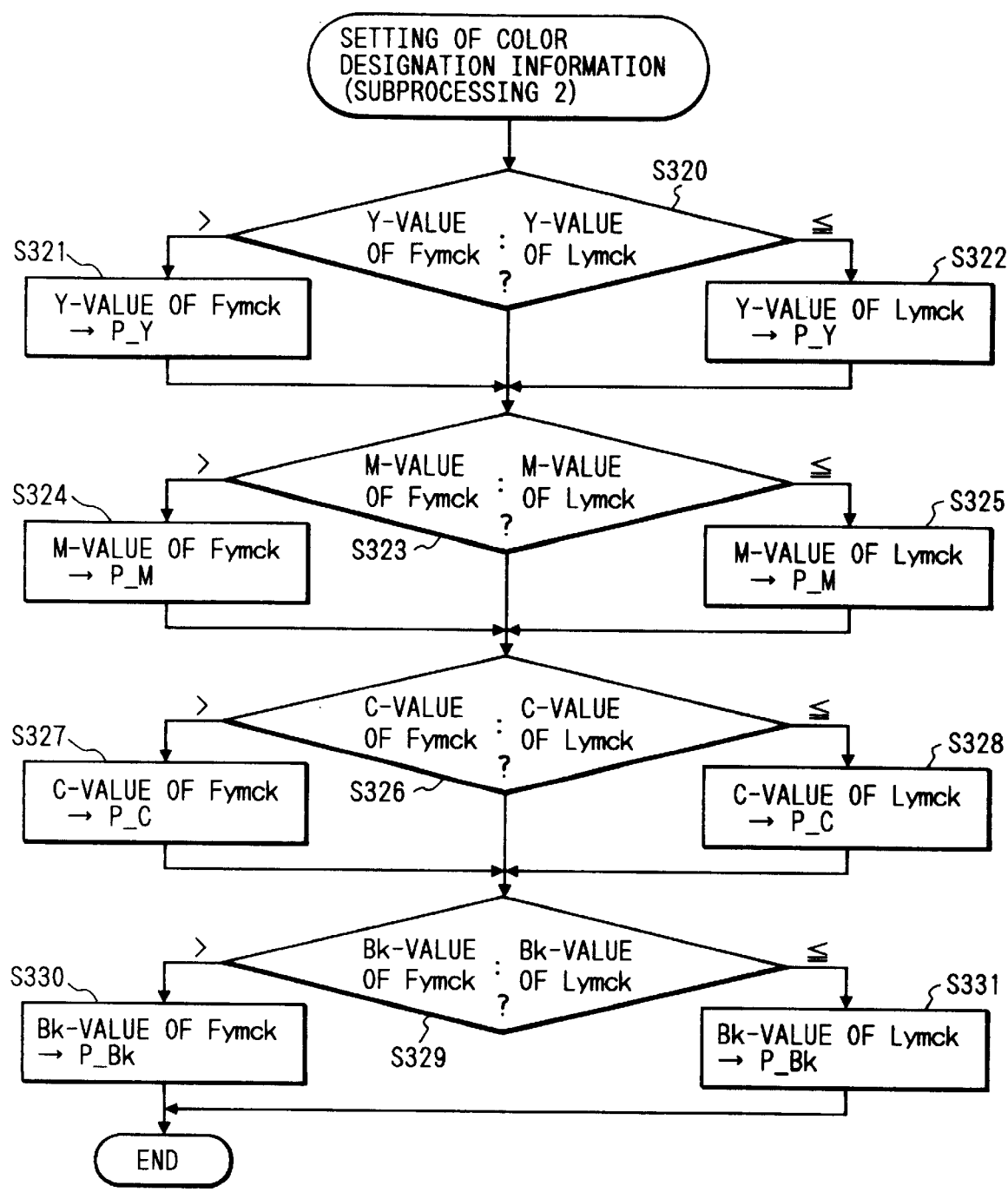
FIG. 72 is a flow chart showing processing in step S302 in FIG. 70.

FIG. 72 shows details of the processing in step S302 in FIG. 70.

In step S320, a Y-value of Fymck is compared with a Y-value of Lymck.

If the Y-value of Fyrck is larger than the Y-value of Lymck, the flow advances to step S321, and the Y-value of Fmck is set in P__Y. The flow then advances to step S323.

Otherwise, the flow advances to step S322, the Y-value of Lymck is set in P__Y, and the flow advances to step S323.

In step S323, an M-value of Fymck is compared with an M-value of Lymck.

If the M-value of Fymck is larger than the M-value of Lymck, the flow advances to step S324, and the M-value of Fyick is set in P__M. The flow then advances to step S326.

Otherwise, the flow advances to step S325, the M-value of Lymck is set in P__M, and the flow advances to step S326.

In step S326, a C-value of Fymck is compared with a C-value of Lymck.

If the C-value of Fymck is larger than the C-value of Lymck, the flow advances to step S327, and the C-value of Fymck is set in P__C. The flow then advances to step S329.

Otherwise, the flow advances to step S328, the C-value of Lymck is set in P__C, and the flow advances to step S329.

In step S329, a Bk-value of Fymck is compared with a Bk-value of Lymck.

If the Bk-value of Fymck is larger than the Bk-value of Lymck, the flow advances to step S330, and the Bk-value of Fymck is set in P__Bk, thus ending the processing.

Otherwise, the flow advances to step S331, the Bk-value of Lymck is set in P__Bk, thus ending the processing.

In this manner, color designation information for a closed figure can be set in P__Y, P__M, P__C, and P__Bk.

Figure 73:
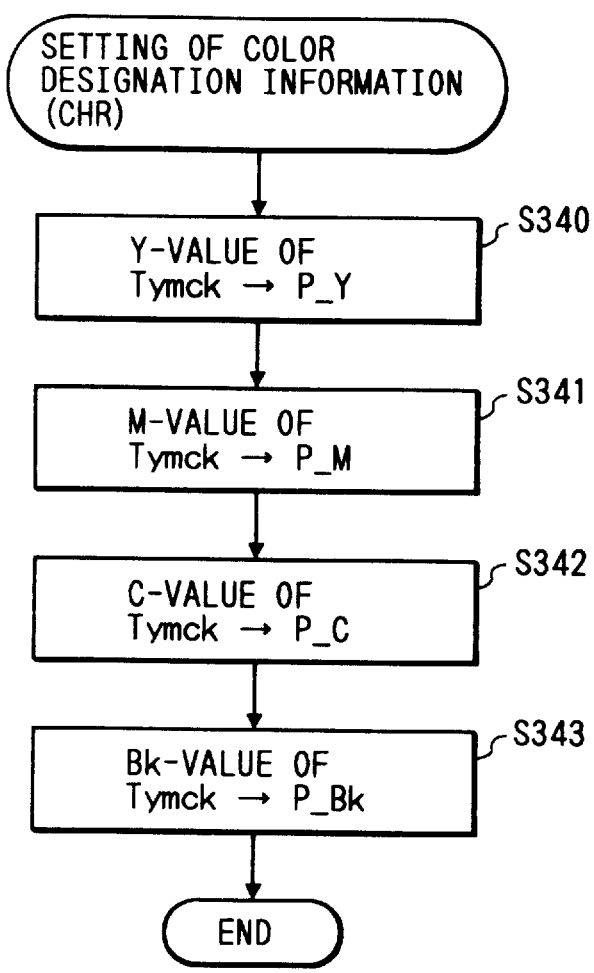
FIG. 73 is a flow chart showing processing for setting color designation information (character)

FIG. 73 shows details of the processing for setting color designation information (character) in step S222 in FIG. 57.

In step S340, a Y-value of Tymck is set in P__Y, and the flow advances to step S341.

In step S341, an M-value of Tymck is set in P__M, and the flow advances to step S342.

In step S342, a C-value of Tymck is set in P__C, and the flow advances to step S343.

In step S343, a Bk-value of Tymck is set in P__Bk, thus ending the processing.

In this manner, color designation information for a character can be set in P__Y, P__M, P__C, and P__Bk.

Figure 54:
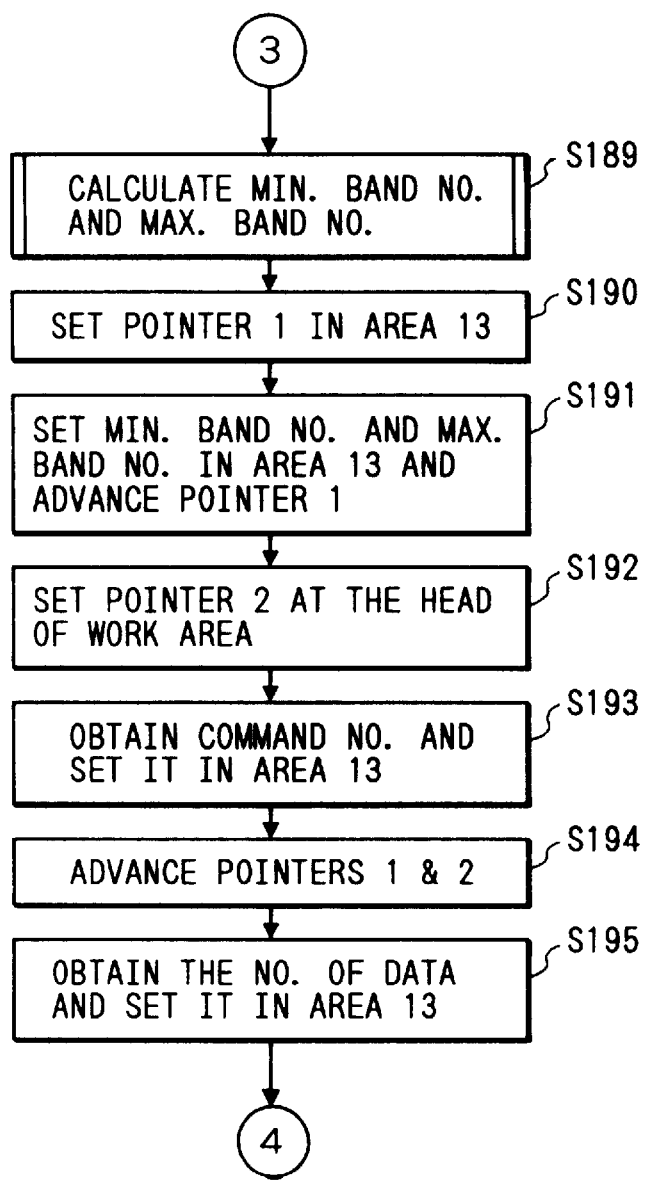
FIG. 54 is a flow chart showing the processing upon execution of the circle-drawing-command-analysis function.
Figure 55:
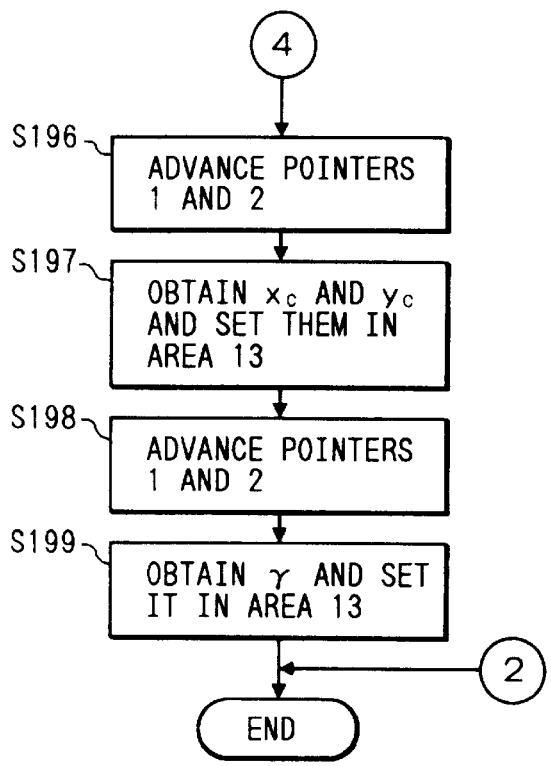
FIG. 55 is a flow chart showing the processing upon execution of the circle-drawing-command-analysis function.
Figure 56:
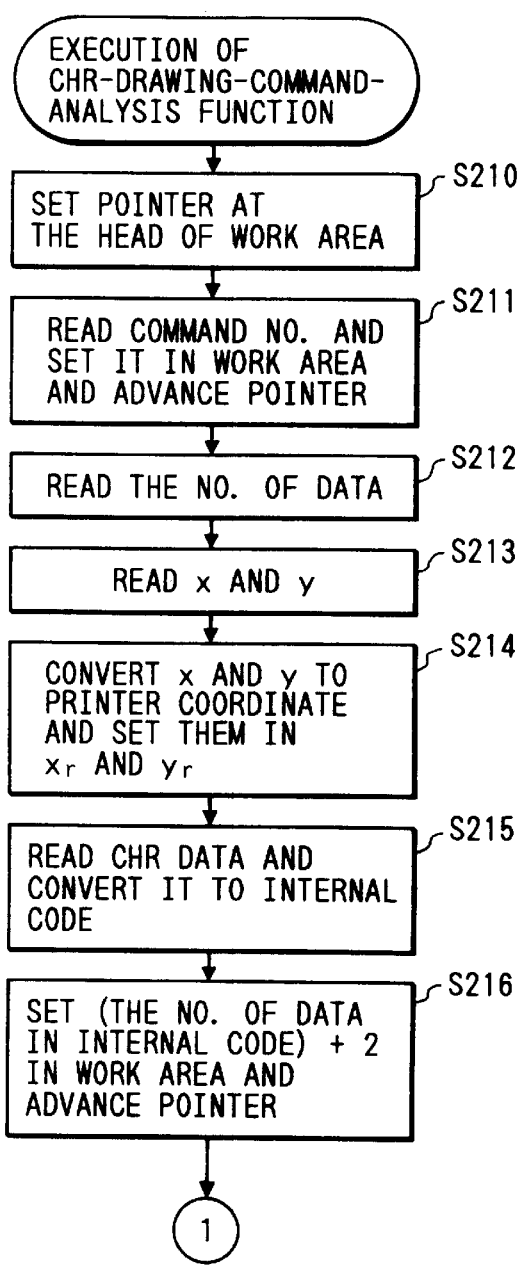
FIG. 56 is a flow chart showing processing upon execution of a character-drawing-command-analysis function.
Figure 74:
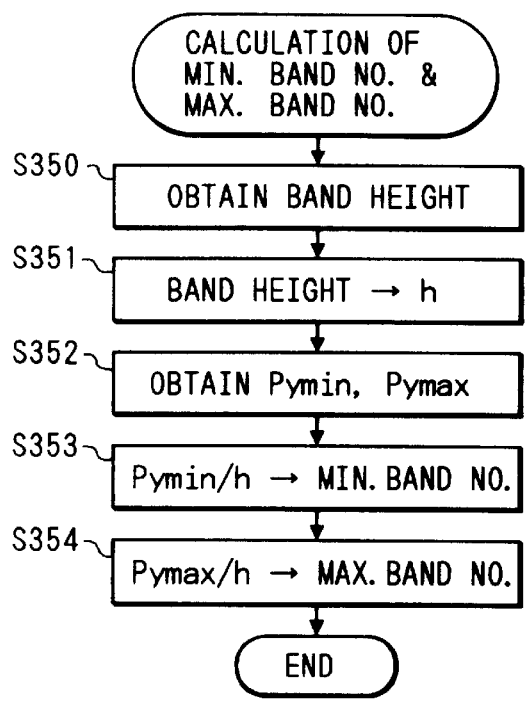
FIG. 74 is a flow chart showing processing for calculating a min band No. and a max band No.
Figure 75:
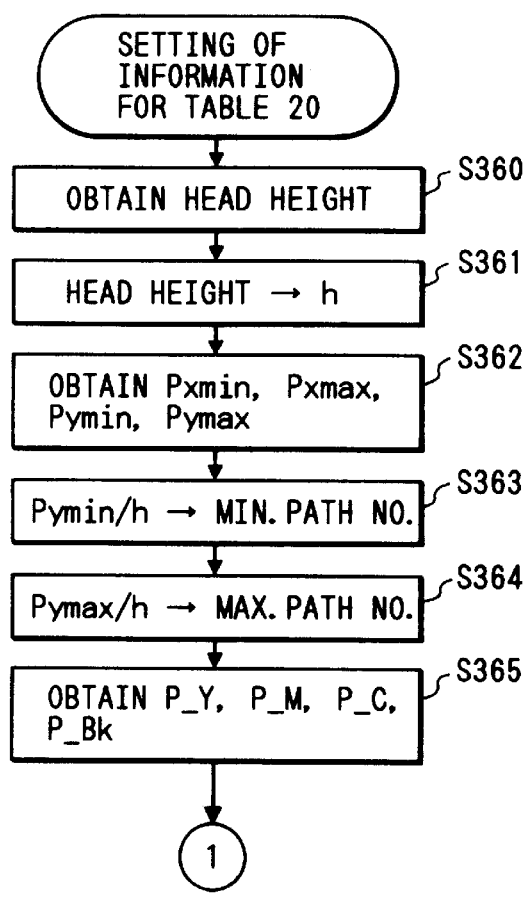
FIG. 75 is a flow chart showing processing for setting information in a path control table used in an output unit.
Figure 76:
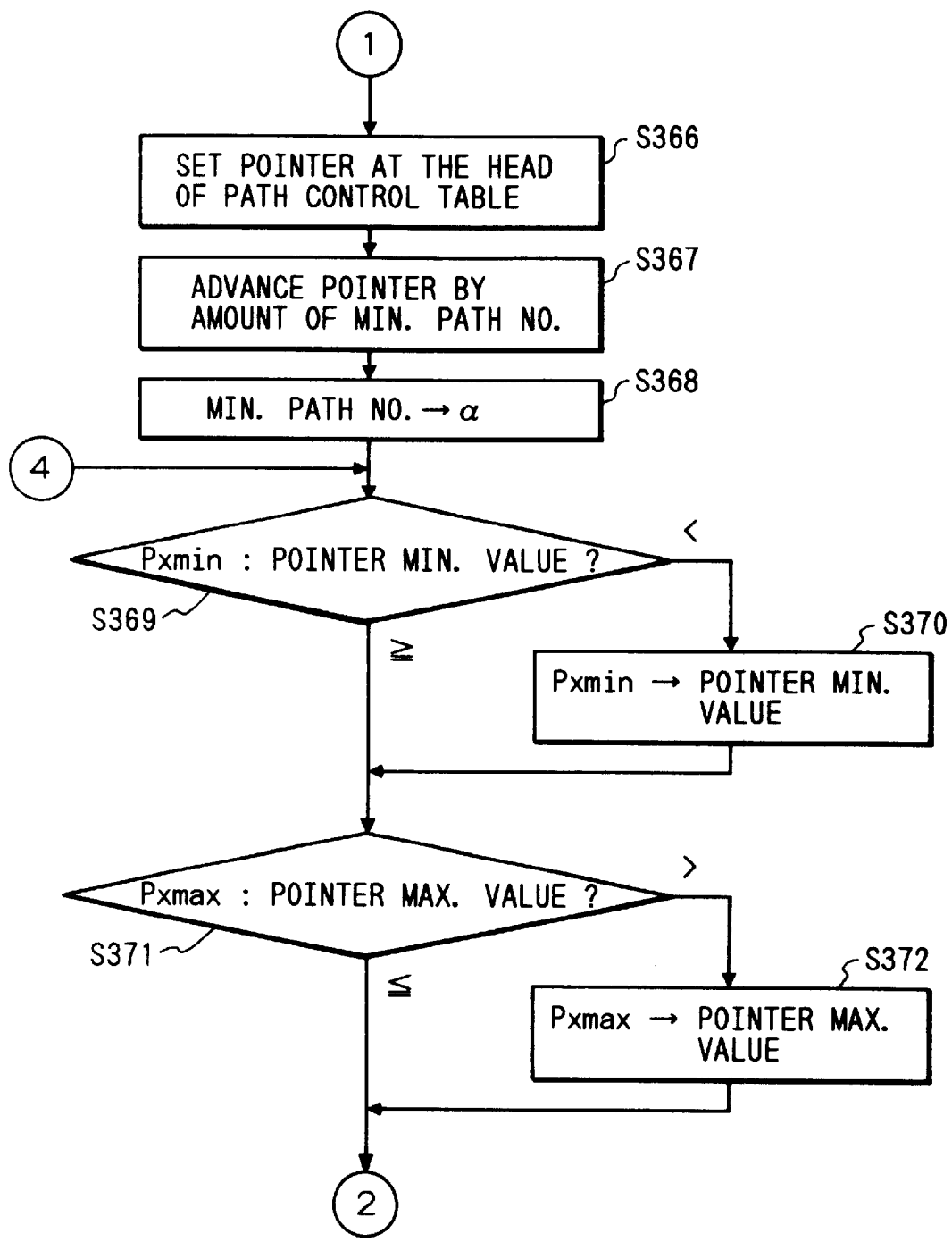
FIG. 76 is a flow chart showing the processing for setting information in the path control table used in the output unit.
Figure 77:
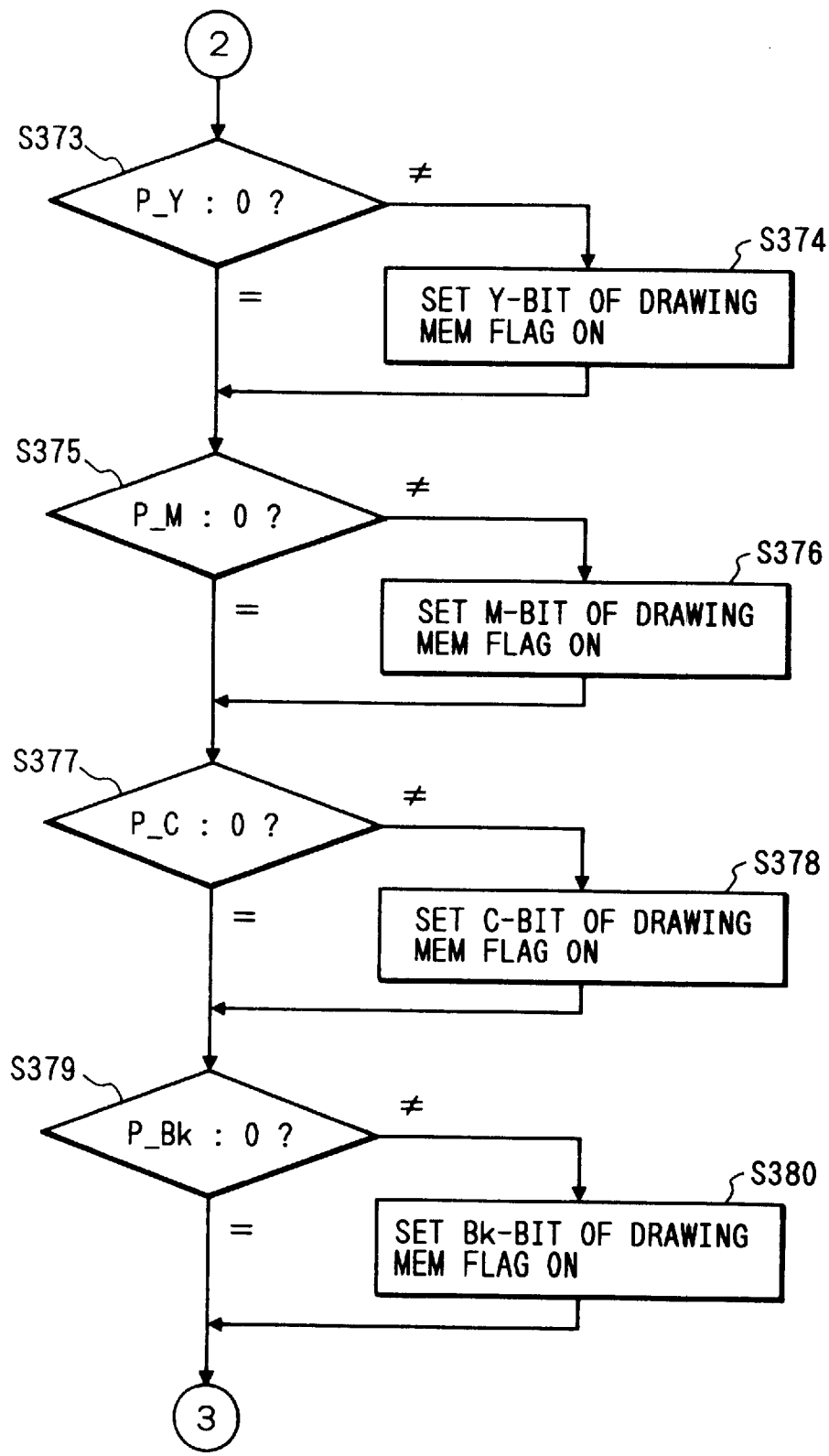
FIG. 77 is a flow chart showing the processing for setting information in the path control table used in the output unit.
Figure 78:
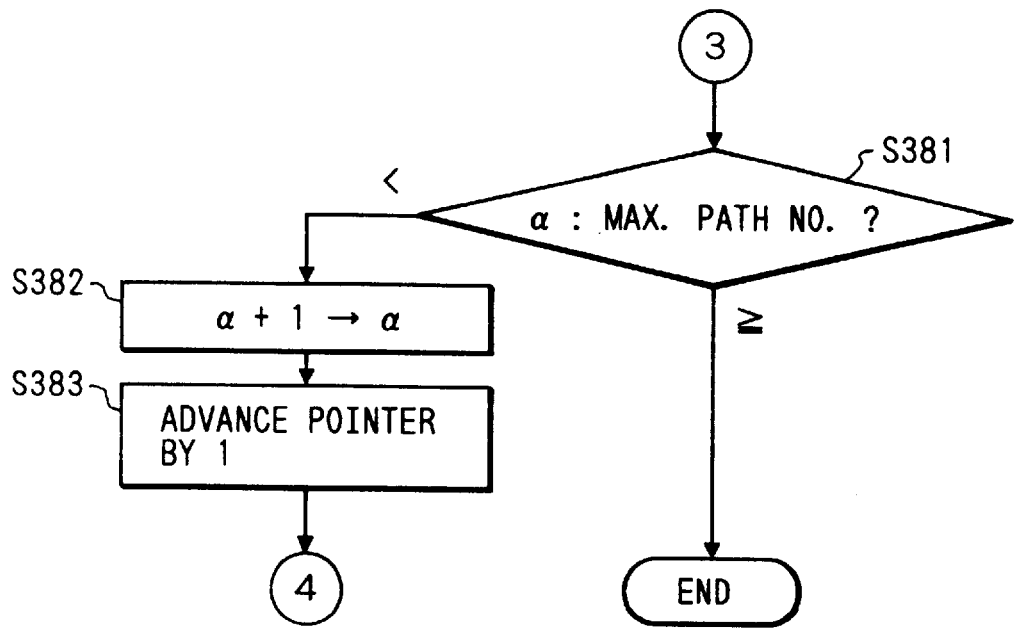
FIG. 78 is a flow chart showing the processing for setting information in the path control table used in the output unit.

FIG. 74 shows details of the processing for calculating the min band No. and the max band No. in step S606 in FIG. 44, step S126 in FIG. 47, step S189 in FIG. 54, and step S224 in FIG. 58.

In step S350, information indicating a band height (the height of one band) is obtained from the band storage 5, and the flow advances to step S351.

In step S351, the band height is set in h, and the flow advances to step S352.

In step S352, pymin and pymax of the drawing range information are obtained, and the flow advances to step S353.

In step S353, a quotient of (pymin/h) is set in the min band No., and the flow then advances to step S354.

In step S354, a quotient of (pymax/h) is set in the max band No., thus ending the processing.

In this manner, the min band No. and max band No. can be calculated from the drawing range information.

FIGS. 75 to 78 show details of the processing for setting information for the path control table used in the output unit in step S605 in FIG. 43, step S125 in FIG. 46, step S188 in FIG. 53, and step S223 in FIG. 57.

In step S360, information indicating a head height (the height of the print head) is obtained from the band storage 5, and the flow advances to step S361.

In step S361, the head height is set in h, and the flow advances to step S362.

In step S362, pxmin, pxmax, pymin, and pymax of the drawing range information are obtained, and the flow advances to step S363.

In step S363, a quotient of (pymin/h) is set in a min path No., and the flow advances to step S364.

In step S364, a quotient of (pymax/h) is set in a max path No., and the flow advances to step S365.

In step S365, P__Y, P__M, P__C, and P__Bk as the pieces of color designation information are obtained, and the flow advances to step S366.

In step S366, a pointer is set at the head of the path control table, and the flow advances to step S367.

In step S367, the pointer is advanced by the min path No., and the flow advances to step S368.

In step S368, the value of the min path No. is set in α, and the flow advances to step S369.

In step S369, a value pxmin is compared with a minimum value indicated by the pointer.

If the minimum value is larger than the value pxmin, the flow advances to step S370, and the value pxmin is set in the minimum value. Thereafter, the flow advances to step S371.

If pxmin≧minimum value, the flow advances to step S371.

In step S371, a value pxmax is compared with a maximum value indicated by the pointer.

If the value pxmax is larger than the maximum value, the flow advances to step S372, and the value pxmax is set in the maximum value. Thereafter, the flow advances to step S373.

If pxmax≦maximum value, the flow advances to step S373.

In step S373, the value P_Y is compared with 0.

If the value P_Y is not equal to 0, the flow advances to step S374, and a Y bit of a drawing information flag is set ON. Thereafter, the flow advances to step S375.

If the value P_Y is equal to 0, the flow advances to step S375.

In step S375, a value P_M is compared with 0.

If the value P_M is not equal to 0, the flow advances to step S376, and an M bit of the drawing information flag is set ON. Thereafter, the flow advances to step S377.

If the value P_M is equal to 0, the flow advances to step S377.

In step S377, a value P_C is compared with 0.

If the value P_C is not equal to 0, the flow advances to step S378, and a C bit of the drawing information flag is set ON. Thereafter, the flow advances to step S379.

If the value P_C is equal to 0, the flow advances to step S379.

In step S379, a value P_Bk is compared with 0.

If the value P_Bk is not equal to 0, the flow advances to step S380, and a Bk bit of the drawing information flag is set ON. Thereafter, the flow advances to step S381.

If the value P_Bk is equal to 0, the flow advances to step S381.

In step S381, the value of the max path No. is compared with the value α.

If the value of the max path No. is larger than α, the flow advances to step S382 to increment α by 1, and the flow advances to step S383.

In step S383, the pointer is advanced by one, and the flow returns to step S369.

If it is determined in step S381 that the max path No. is equal to or smaller than α, the processing is ended.

In this manner, information for the path control table used in the output unit can be set.

Figure 79:
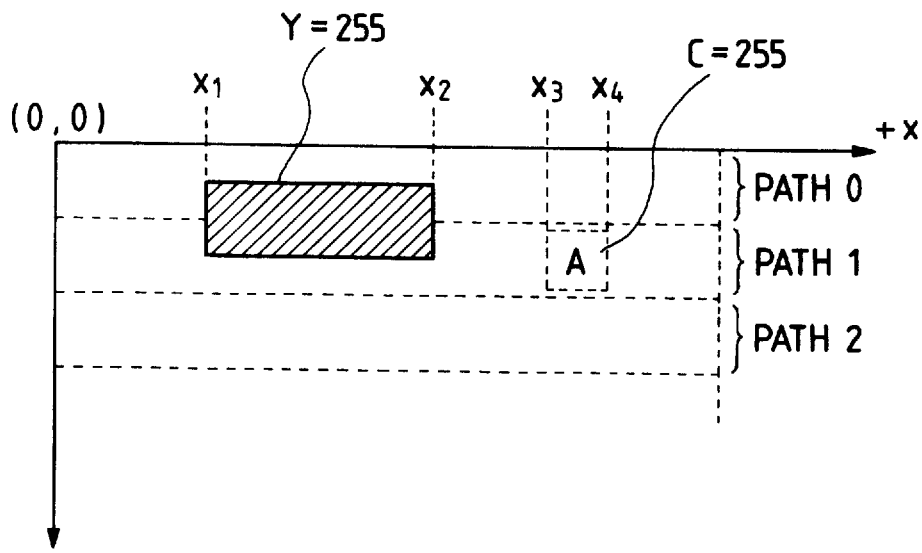
FIG. 79 is a view showing a case wherein a polygon and a character are drawn on areas of paths 0, 1, and 2.

FIG. 79 shows a case wherein a polygon and a character are drawn on areas of paths 0, 1, and 2.

x1 and x2 respectively indicate the minimum and maximum values of x-coordinates of a polygon drawing area.

x3 and x4 respectively indicate the minimum and maximum values of x-coordinates of a character drawing area.

Figures 80, 81:
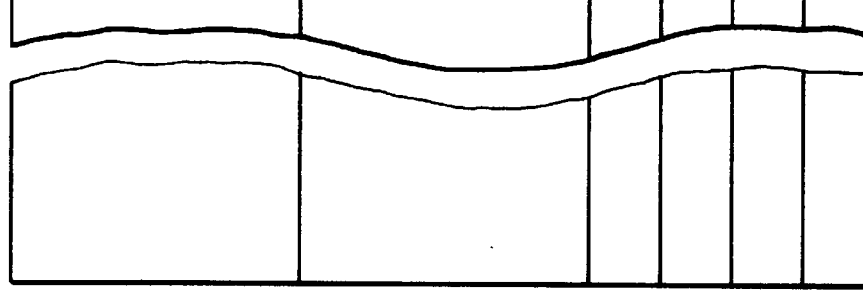
FIG. 80 is a view showing an example of the path control table.
FIG. 81 is a view showing an example of memory development information of a color designation command.

FIG. 80 shows the path control table when information for the path control table used in the processing shown in FIGS. 75 to 78 by the output unit is set for the drawing example shown in FIG. 79.

In FIG. 80, a value k is set in the initialization of the path control table shown in FIG. 25.

FIG. 81 shows an example of memory development information of color designation commands (line, paint, character) generated by analyzing the color designation command shown in FIG. 27 on the basis of the flow charts shown in FIGS. 33 to 35.

In FIG. 81, a command table No. varies depending on memory development information of color designation commands, and is used for identifying a command.

In this case, the content of the number-of-data parameter is 4.

Y-, M-, C-, and Bk-values are density data values of Y (yellow), M (magenta), C (cyan), and Bk (black) as primary colors of coloring agents (toners or inks), and represent that color designation data values are converted into Y, M, C, and Bk data values upon generation of memory development information after analysis even when a color designation command includes another kind of color designation data values.

FIGS. 82A, 82B, and 82C respectively show examples of memory development information generated by analyzing the line width designation command (FIG. 28A), the clip area designation command (FIG. 28B), and the paint definition designation command (FIG. 28C) according to the flow charts shown in FIGS. 36, 37, and 38.

In FIGS. 82A to 82C, a command table No. varies depending on memory development information, and is used for identifying a command.

The content of a number-of-data parameter indicates the number of data input after the number-of-data parameter.

FIGS. 83A and 83B respectively show examples of memory development information generated by analyzing the line and polygon drawing commands shown in FIG. 29 on the basis of the flow charts shown in FIGS. 43 to 45, and in FIGS. 46 to 48.

In FIGS. 83A and 83B, a command table No. varies depending on memory development information, and is used for identifying a command.

The content of a number-of-data parameter indicates the number of data input after the number-of-data parameter.

The final parameters of the memory development information of the polygon drawing command are x1 and y1, as shown in FIG. 83B, since they correspond to the start point (i.e., the polygon is closed at the start point).

FIGS. 84A and 84B respectively show examples of memory development information generated by analyzing the circle drawing command (FIG. 30A) and the character drawing command (FIG. 30B) on the basis of the flow charts shown in FIGS. 52 to 55 and in FIGS. 56 to 59.

In FIGS. 84A and 84B, a command table No. varies depending on memory development information, and is used for identifying a command.

The content of a number-of-data parameter indicates the number of data input after the number-of-data parameter.

Figure 85:
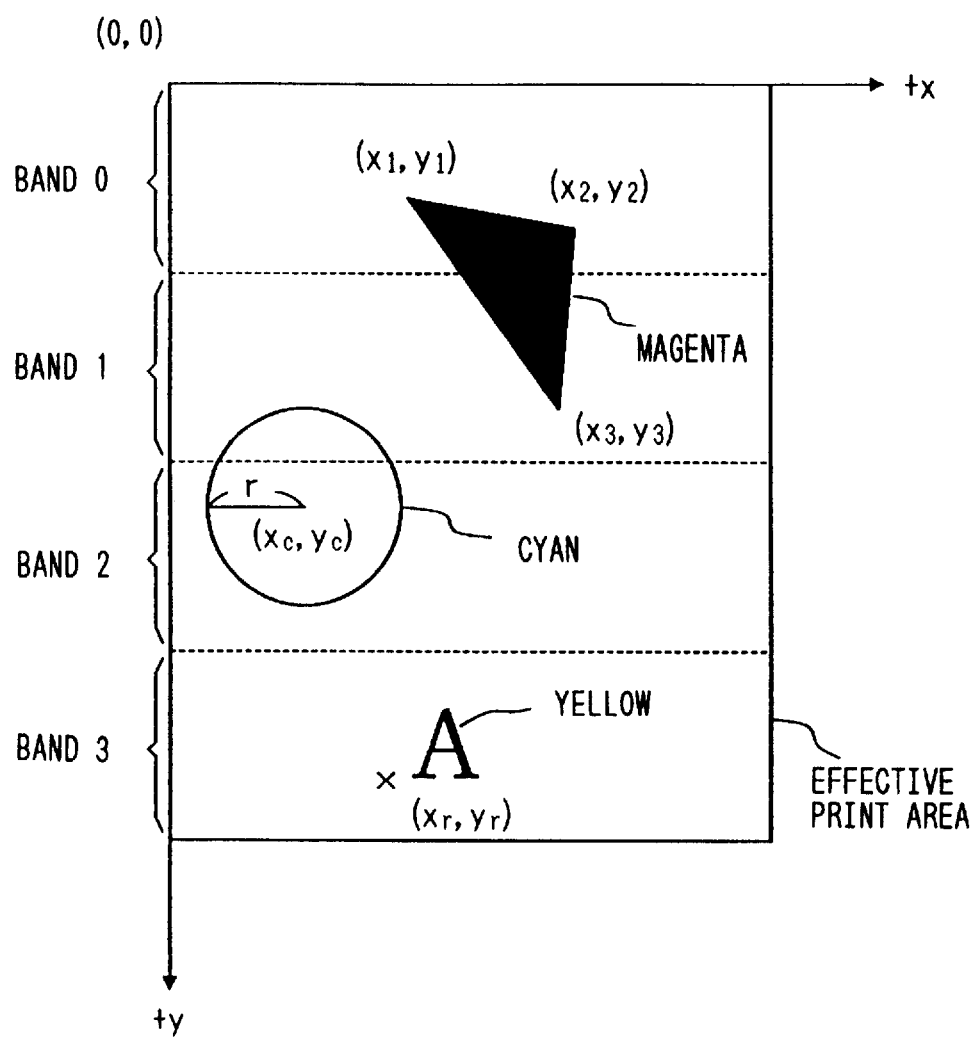
FIG. 85 is a view showing a case wherein a drawing operation is performed using band memories in units of coloring agents, drawing attribute commands, and drawing commands.

FIG. 85 shows a case wherein one page is divided into four bands, and a drawing operation is performed using Y, M, C, and Bk band memories each having this band size, and some of the drawing attribute commands and drawing commands shown in FIGS. 27A to 30B.

A drawing order is an order of a circle, polygon, and character.

The circle is designated to have an internal paint mode=OFF, an outline mode=ON, and an outline color of cyan.

The polygon is designated to have an internal paint mode=ON, an outline mode=OFF, and a paint color of magenta.

The character has an internal paint color of yellow.

FIGS. 86A to 86D and FIGS. 87A to 87E show memory development information used in the drawing operation shown in FIG. 85.

In FIGS. 86A to 86D and FIGS. 87A to 87E, pieces of information are aligned in the analysis order, i.e., in the reception order of commands.

As shown in FIGS. 86A to 86D and FIGS. 87A to 87E, in all the pieces of memory development information of the drawing attribute commands, the min band No. is set to be 0, and the max band No. is set to be 3, so that the corresponding commands are analyzed in all the bands.

If the pieces of memory development information of the drawing attribute commands are not set as described above, since drawing attribute information must be added to memory development information of a corresponding drawing command, the data amount of the memory development information is undesirably increased.

As for memory development information of each drawing command, a minimum band No. where a drawing range is present is set in the min band No., and a maximum band No. where the drawing range is present is set in the max band No.

For example, in the memory development information of the circle drawing command, the min band No. is 1, and the max band No. is 2.

Figure 88:
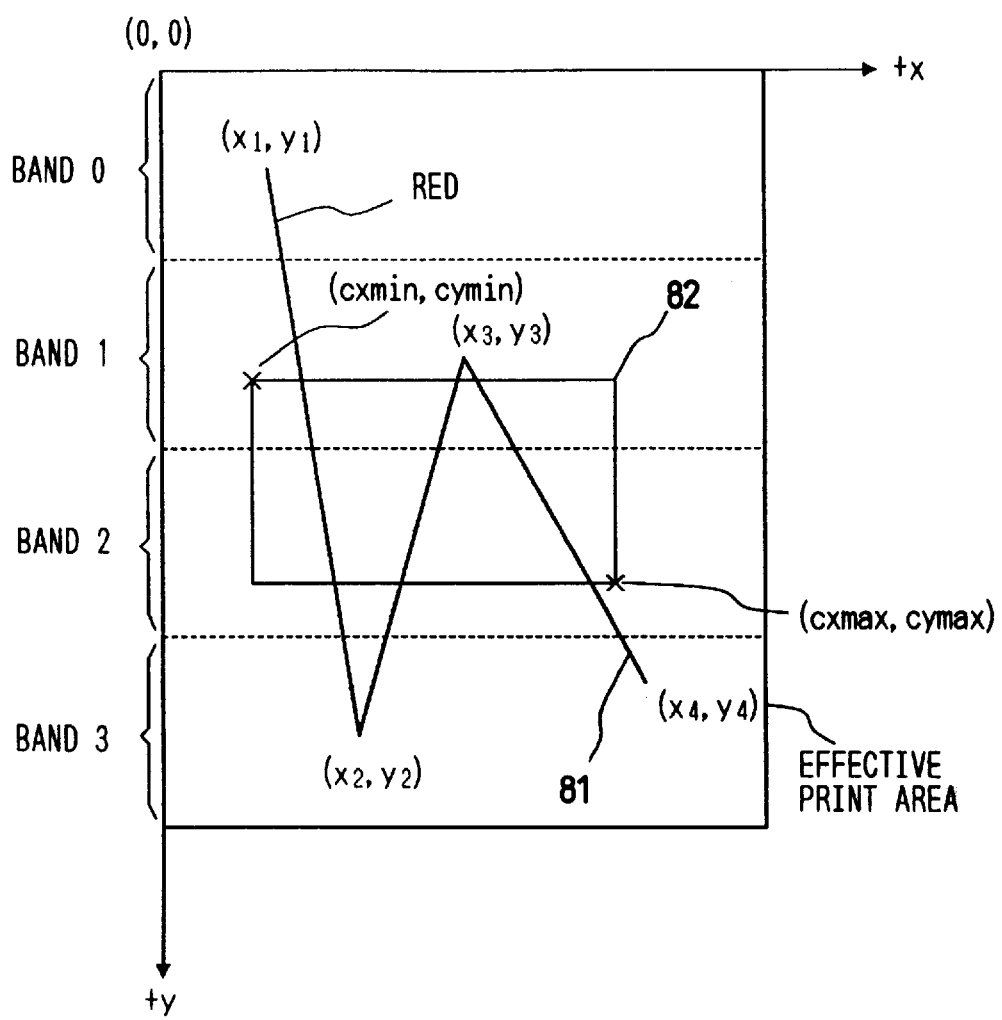
FIG. 88 is a view showing a case wherein a drawing operation is performed while setting a clip area designation mode for a line drawing operation.

FIG. 88 shows a case wherein one page is divided into four bands, Y, M, C, and Bk band memories each having this band size are used, a clip area designation mode is set in the line drawing command, and a drawing operation is performed.

The color of a line is assumed to be red (M100%, Y100%).

FIGS. 89A to 89D show memory development information used in the drawing operation shown in FIG. 88.

In FIGS. 89A to 89D, pieces of information are aligned in the analysis order, i.e., in the reception order of commands.

The drawing range of a line extends from a band "0" to a band "3" by the processing shown in FIG. 60 regardless of a clip area.

In consideration of the clip area, the drawing range of the line extends from a band "1" to a band "2" by the processing shown in FIGS. 66 and 67.

Therefore, as for the memory development information of the line drawing command, the min band No. is set to be 1, and the max band No. is set to be 2.

FIG. 90 shows the command execution jump table 1 (ROM), which stores jump addresses to functions for developing patterns to be drawn onto a memory in practice, and jump addresses to functions for designating drawing attributes (setting attributes in internal variables, and the like).

The jump addresses are stored in correspondence with command Nos. (0 to n).

Figure 91:
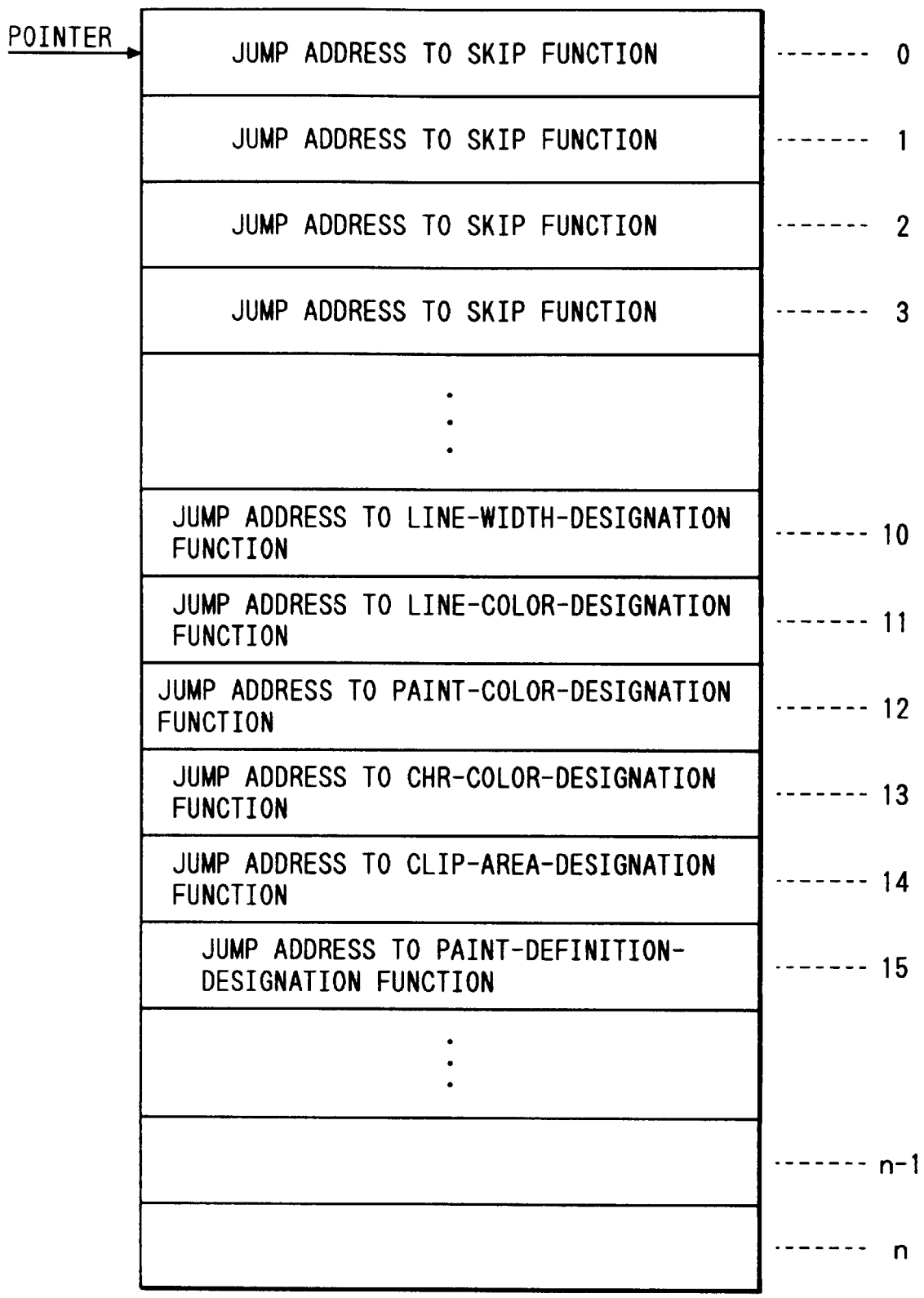
FIG. 91 shows a command execution jump table 2.

FIG. 91 shows the command execution jump table 2 (ROM) in which all the jump addresses to the functions for developing patterns to be drawn onto the memory in FIG. 90 are replaced with jump addresses to skip functions.

Like in FIG. 90, the jump addresses are stored in correspondence with command Nos. (0 to n).

Figure 92:
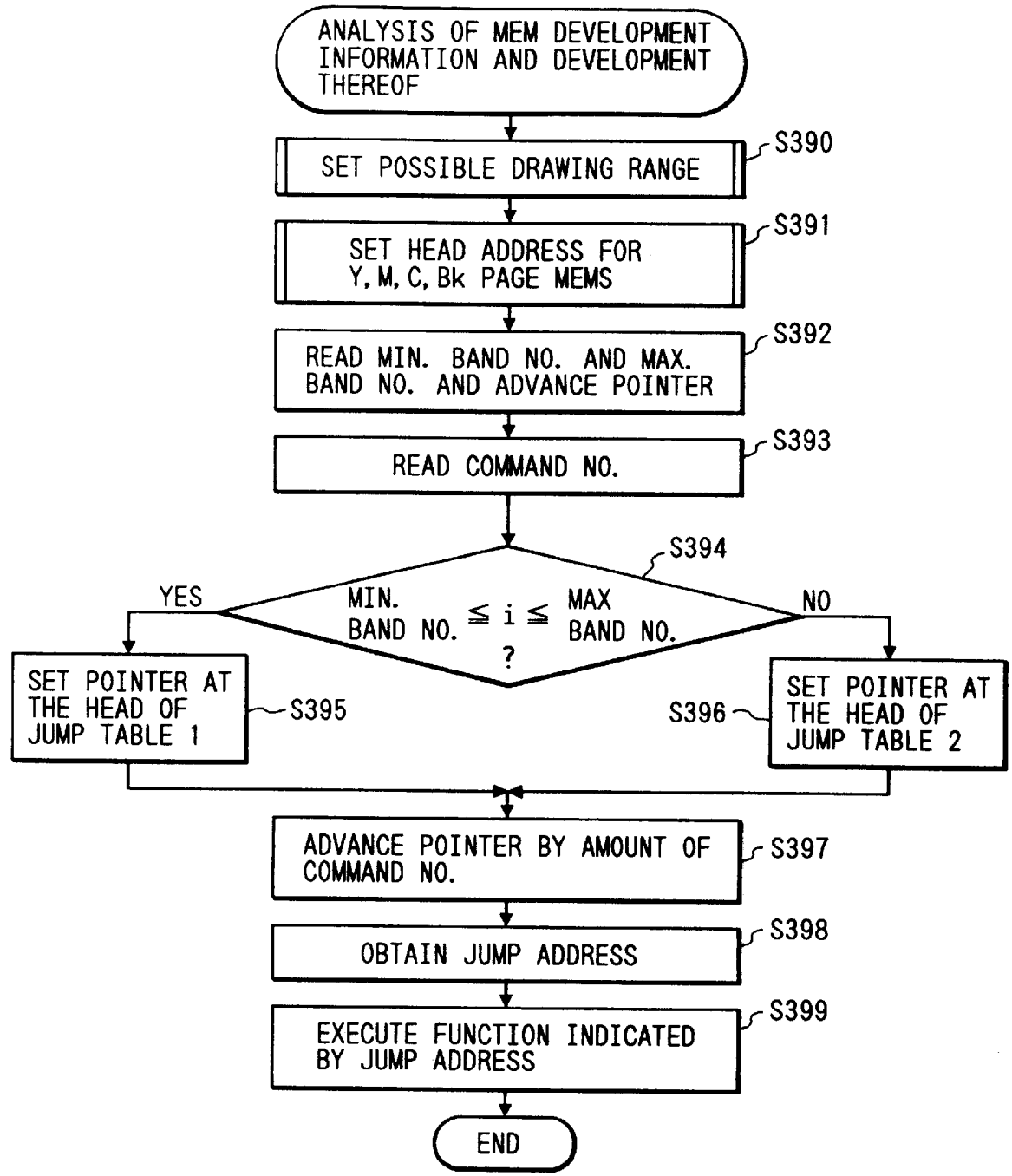
FIG. 92 is a flow chart showing details of processing in step S12 of FIG. 23.

FIG. 92 is a flow chart showing details of the processing in step S12 in FIG. 23.

In step S390, a possible drawing range is set in consideration of a clip range (a rectangular area for setting a possible drawing range of a figure, character, and the like), and the flow advances to step S391.

In step S391, the head addresses of Y, M, C, and Bk virtual page memories are calculated and set, and the flow advances to step S392.

In step S392, min and max band No. values of memory development information are read, and a pointer is advanced to indicate the next data. The flow then advances to step S393.

In step S393, a command No. is read, and the flow advances to step S394.

In step S394, it is checked if a relation of min band No.$\leq$i (current band No.)$\leq$max band No. is established.

If YES in step S394, the flow advances to step S395, and a pointer is set at the head of the command execution jump table 1 shown in FIG. 90. The flow then advances to step S397.

If NO in step S394, the flow advances to step S396, and a pointer is set at the head of the command execution jump table 2 shown in FIG. 91. The flow then advances to step S397.

In step S397, the table pointer is advanced by an address corresponding to the command No., and the flow advances to step S398.

In step S398, a content (jump address) indicated by the pointer is obtained, and the flow advances to step S399.

In step S399, a function indicated by the jump address is executed, and the processing is ended.

Figure 93:
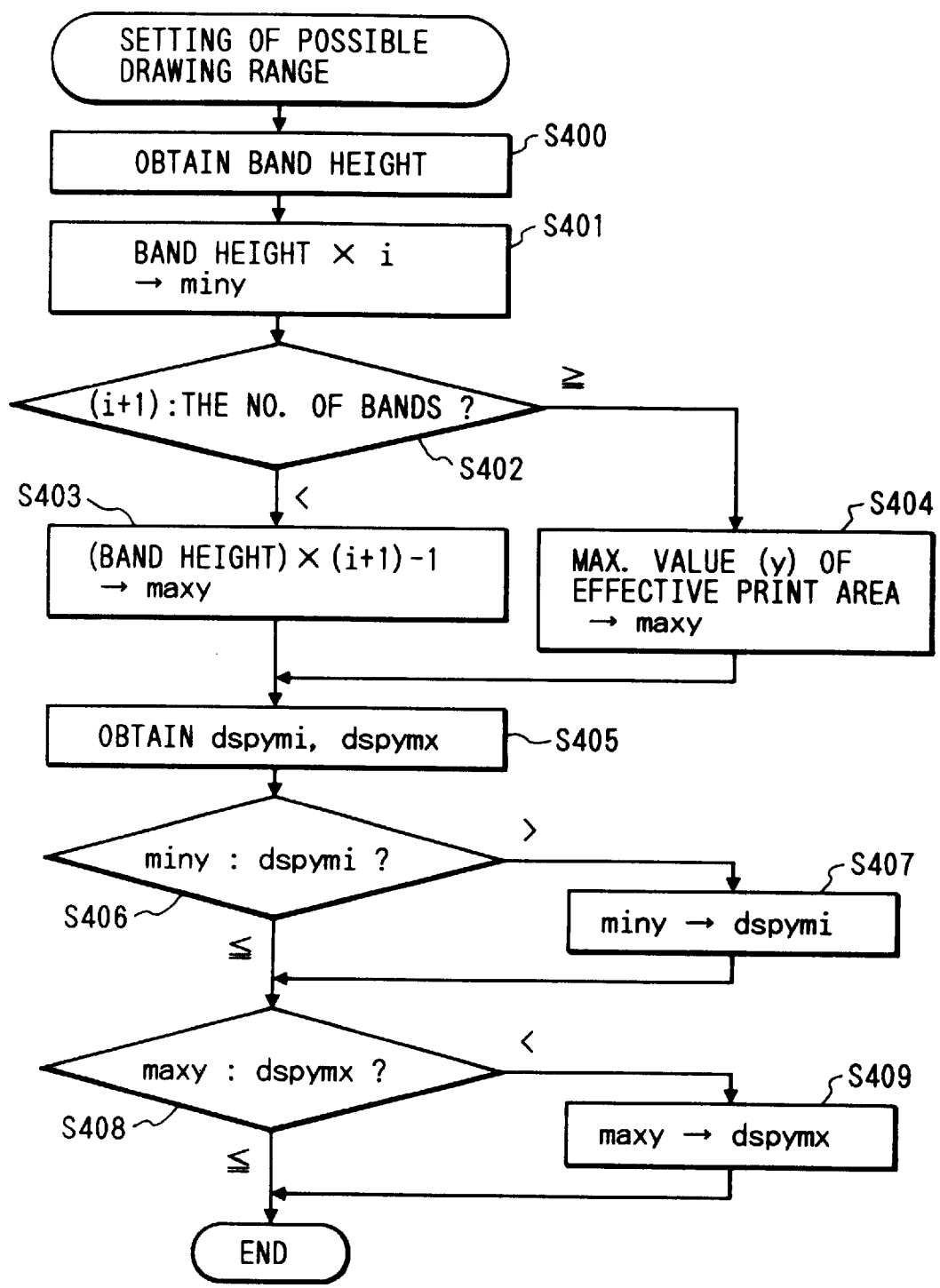
FIG. 93 is a flow chart showing details of processing in step S390 of FIG. 92.

FIG. 93 is a flow chart showing details of the processing in step S390 in FIG. 92.

In the following description, y-coordinate values of the drawing range, and clip area values are assumed to be those on the printer coordinate system.

In step S400, band height information [the height of one band (the number of dots or the number of scan lines)] is obtained from the band storage 5, and the flow advances to step S401.

In step S401, a value given by (the above-mentioned band height)×i (current band No.) is set in a minimum value many of the y-coordinate of the possible drawing range, and the flow advances to step S402.

In step S402, a value (i+1) is compared with the number of bands.

If the number of bands is larger than the value (i+1), the flow advances to step S403, a value given by (the above-mentioned band height)×(i+1)−1 is set in a maximum value maxy of the y-coordinate of the possible drawing range. Thereafter, the flow advances to step S405.

Otherwise, the flow advances to step S404, a maximum value of the y-coordinate of the effective print area of a sheet is set in the maximum value maxy of the y-coordinate of the possible drawing range. Thereafter, the flow advances to step S405.

In step S405, a minimum value dspymi and a maximum value dspymx of the y-coordinate of information of the clip area (a rectangular area for setting a possible drawing range of a figure, character, and the like) are obtained, and the flow advances to step S406.

In step S406, miny and dspymi are compared with each other.

If miny is larger than dspymi, the flow advances to step S407, and the value miny is set in dspymi. Thereafter, the flow advances to step S408.

If miny$\leq$dspymi, the flow directly advances to step S408.

In step S408, maxy and dspymx are compared with each other.

If dspymx is larger than maxy, the flow advances to step S409, and the value maxy is set in dspymx, thus ending the processing.

If maxy≦dspymx, the processing is directly ended.

An actual possible drawing range for a figure, character, and the like, used in band memory development uses dspymi and dspymx set in this flow.

Figure 94:
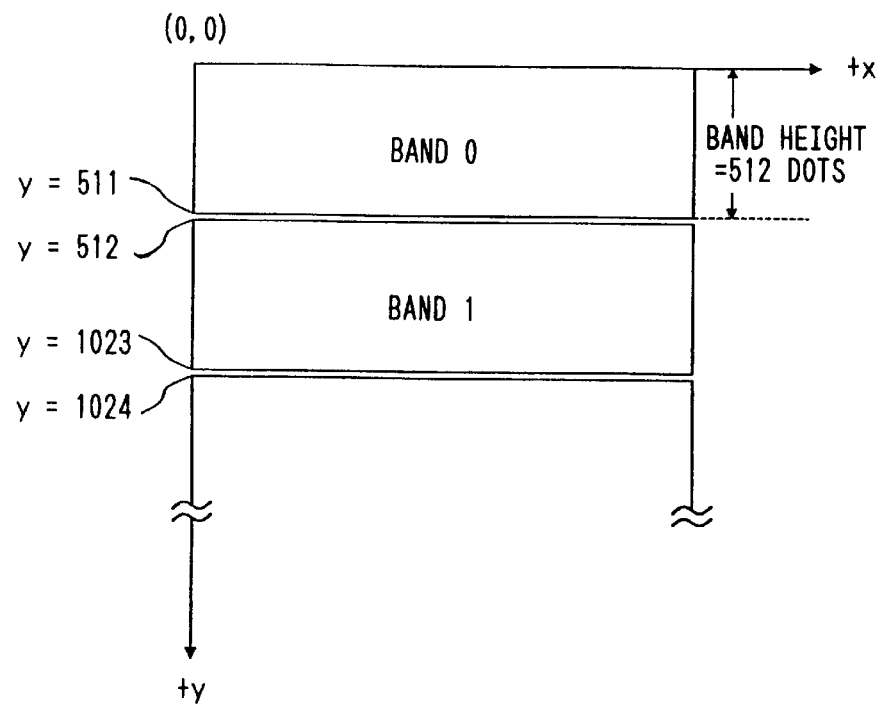
FIG. 94 is a view showing an example of printer coordinates set when the band height is set to be 512 dots.

FIG. 94 shows the printer coordinates set when a band height=512 dots.

In this case, as shown in FIG. 94, the value miny of a band "0" is 0, and the value maxy is 511. The value miny of a band "1" is 512, and the value maxy is 1023.

Figure 95:
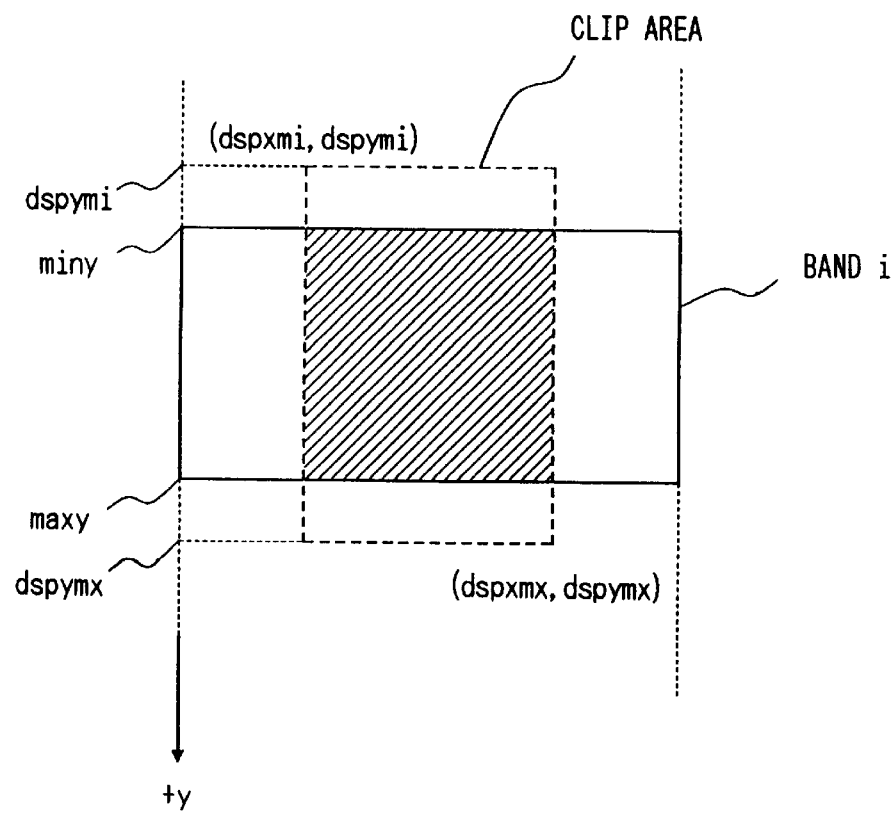
FIG. 95 is a view showing an example of a clip area setting operation.

FIG. 95 shows a case wherein a clip area satisfying dspymi<miny and maxy<dspymx is set for a possible drawing range for a figure, character, and the like when a band No.=i.

In this case, an actual possible drawing range for a figure, character, and the like used in band memory development having a band No. corresponding to i is a hatched portion in FIG. 95 according to the processing described above.

Note that dspxmi and dspxmx are minimum and maximum values of the x-coordinate of the clip area.

Figure 96:
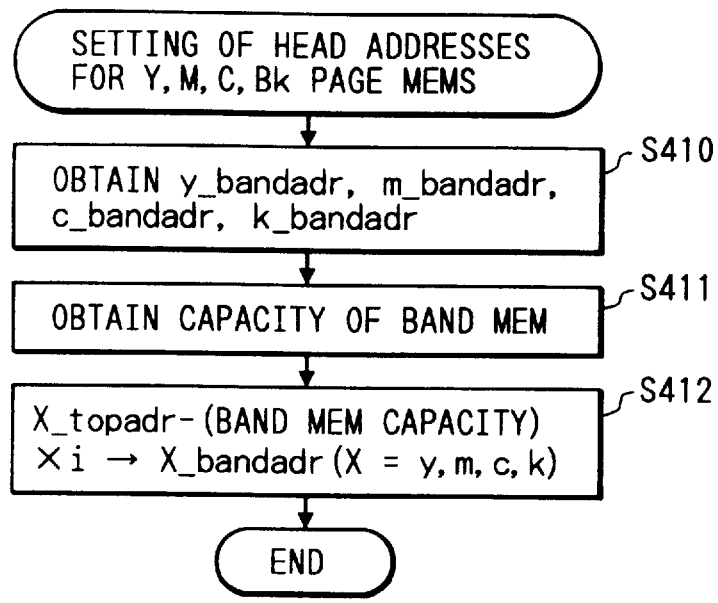
FIG. 96 is a flow chart showing details of processing in step S391 of FIG. 92.

FIG. 96 is a flow chart showing details of processing in step S391 in FIG. 92.

In step S410, information X_bandptr (X=y, m, c, k) of the head address of each of Y, M, C, and Bk band memories is obtained from the band storage 5, and the flow advances to step S411.

In step S411, information indicating the capacity (byte) of each band memory is obtained from the band storage 5, and the flow advances to step S412.

In step S412, the head addresses of Y, M, C, and Bk virtual page memories are calculated by X_topadr (X=y, m, c, k)×i (current band No.), thus ending processing.

Figure 97:
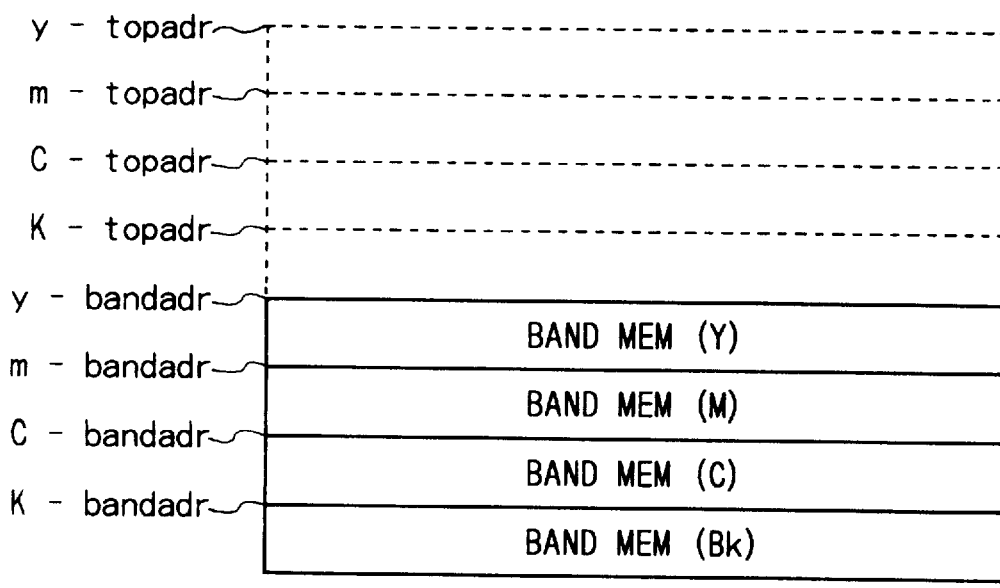
FIG. 97 is a view showing top or head addresses of virtual memories in units of coloring agents.

FIG. 97 shows the head addresses of the Y, M, C, and Bk virtual page memories when a pattern is to be developed on a fifth band (band No. 4) shown in FIG. 17.

The addresses shown in FIG. 97 are obtained by the processing shown in FIG. 96.

Figure 98:
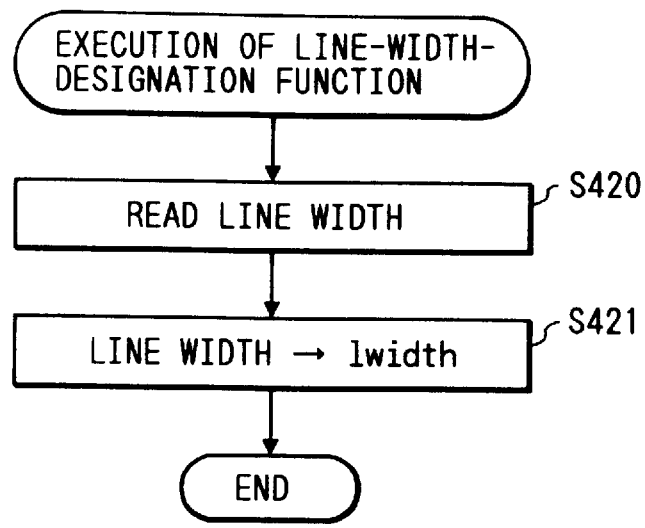
FIG. 98 is a flow chart showing processing upon execution of a line-width-designation function.

FIG. 98 shows processing upon execution of a line-width-designation function in step S399 in FIG. 92.

In step S420, a line width value is read from memory development information of the line width designation command, and the flow advances to step S421.

In step S421, the line width value is set in a variable lwidth as line width information used when a drawing pattern is developed onto a memory upon execution of a drawing function, thus ending the processing.

Figure 99:
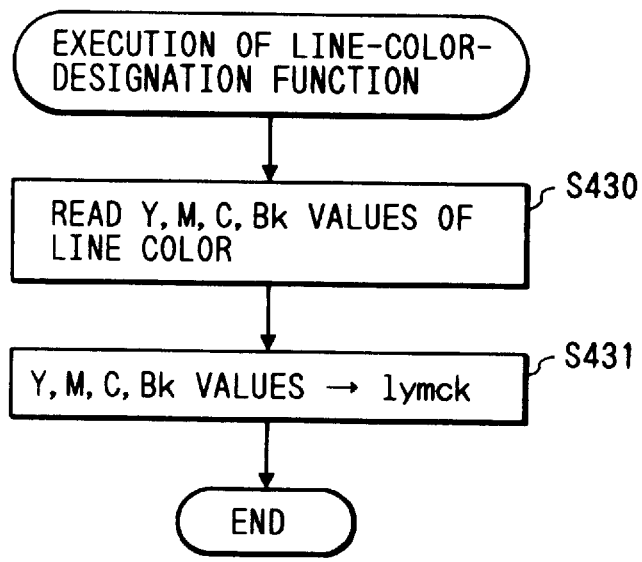
FIG. 99 is a flow chart showing processing upon execution of a line-color-designation function.

FIG. 99 shows processing upon execution of a line-color-designation function in step S399 in FIG. 92.

In step S430, Y-, M-, C-, and Bk-values of a line color are read from memory development information of a line color designation command, and the flow advances to step S431.

In step S431, the Y-, M-, C-, and Bk-values are set in a variable lymck as line color information used when a drawing pattern is developed onto a memory upon execution of a drawing function, thus ending the processing.

Figure 100:
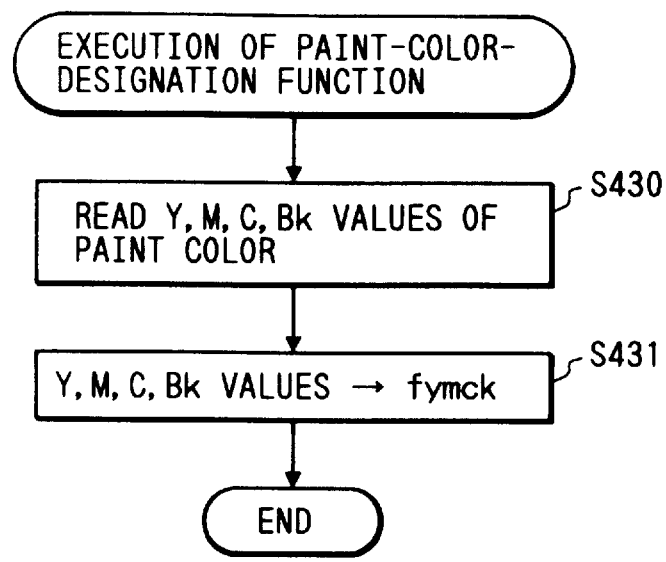
FIG. 100 is a flow chart showing processing upon execution of a paint-color-designation function.

FIG. 100 shows processing upon execution of a paint-color-designation function in step S399 in FIG. 92.

In step S430, Y-, M-, C-, and Bk-values of a paint color are read from memory development information of a paint color designation command, and the flow advances to step S431.

In step S431, the Y-, M-, C-, and Bk-values are set in a variable fymck as paint color information used when a drawing pattern is developed onto a memory upon execution of a drawing function, thus ending the processing.

Figure 101:
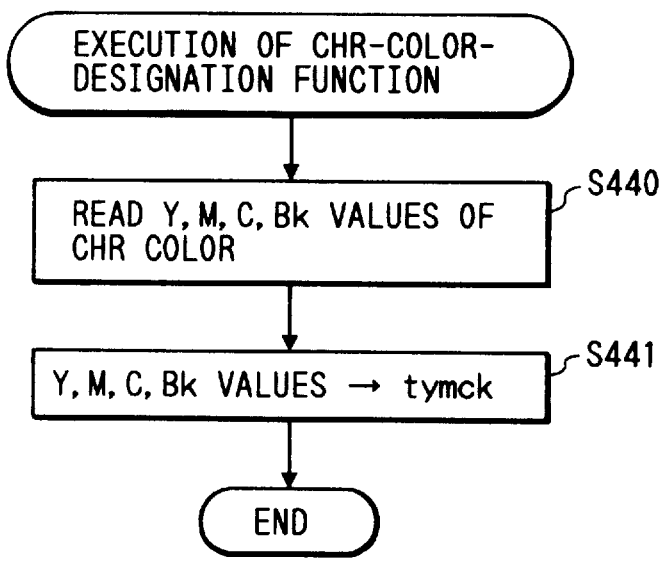
FIG. 101 is a flow chart showing processing upon execution of a character-color-designation function.

FIG. 101 shows processing upon execution of a character-color-designation function in step S399 in FIG. 92.

In step S440, Y-, M-, C-, and Bk-values of a character color are read from memory development information of a character color designation command, and the flow advances to step S441.

In step S441, the Y-, M-, C-, and Bk-values are set in a variable tymck as character color information used when a drawing pattern is developed onto a memory upon execution of a drawing function, thus ending the processing.

Figure 102:
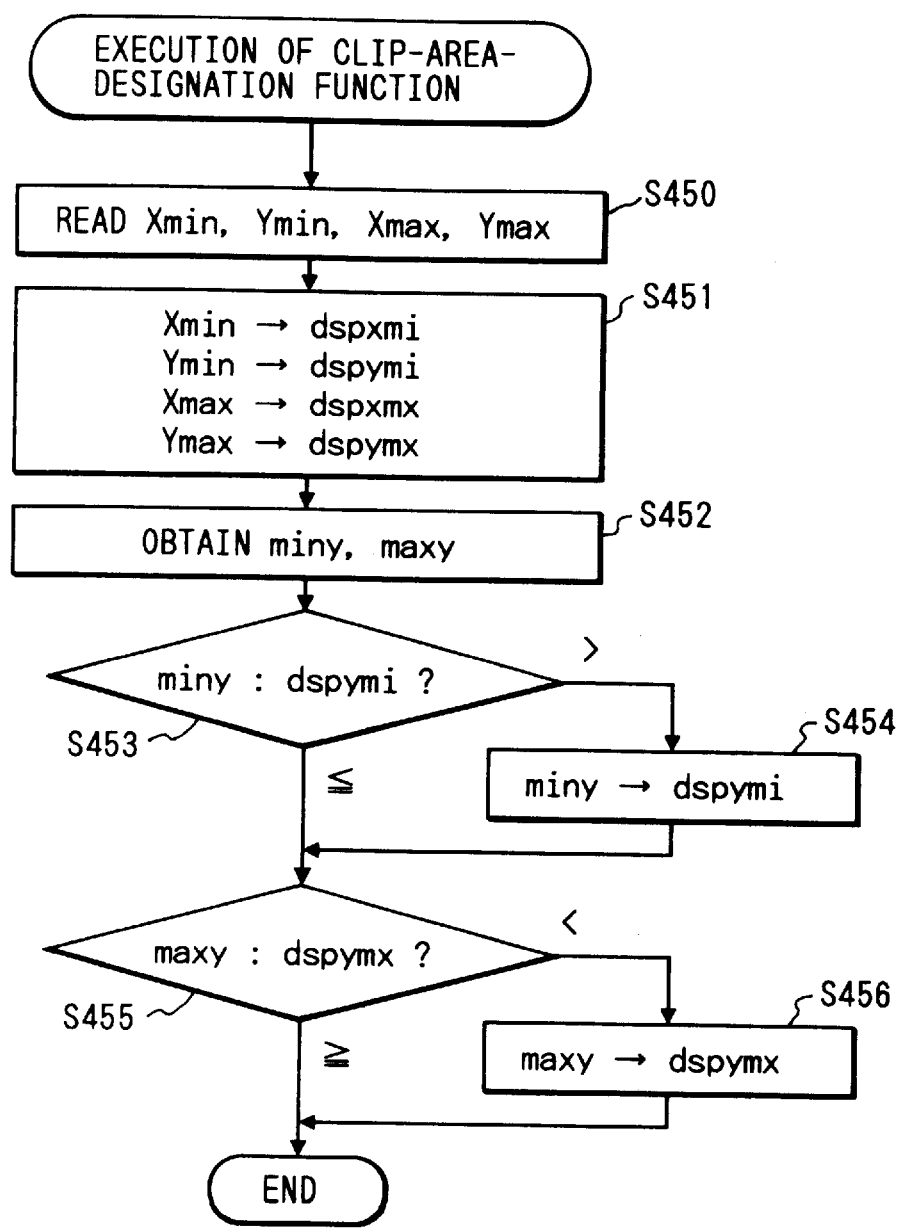
FIG. 102 is a flow chart showing processing upon execution of a clip-area-designation function.

FIG. 102 shows processing upon execution of a clip-area-designation function in step S399 in FIG. 92.

In step S450, values xmin, ymin, xmax, and ymax of a clip area are read from memory development information of a clip area designation command, and the flow advances to step S451.

In step S451, the values xmin, ymin, xmax, and ymax are respectively set in variables dspxmi, dspymi, dspxmx, and dspymx as clip area information used when a drawing pattern is developed onto a memory upon execution of a drawing function. The flow then advances to step S452.

In step S452, values miny and maxy (on the printer coordinates) of a drawing range of a band corresponding to a band No. i are obtained from the band storage 5, and the flow advances to step S453.

In step S453, miny and dspymi are compared with each other.

If miny is larger than dspymi, the flow advances to step S454 to set the value miny in dspymi. The flow then advances to step S455.

If miny≦dspymi, the flow advances to step S455.

In step S455, maxy and dspymx are compared with each other.

If dspymx is larger than maxy, the flow advances to step S456 to set the value maxy in dspymx, thus ending the processing.

If dspymx≦maxy, the processing is directly ended.

Figure 103:
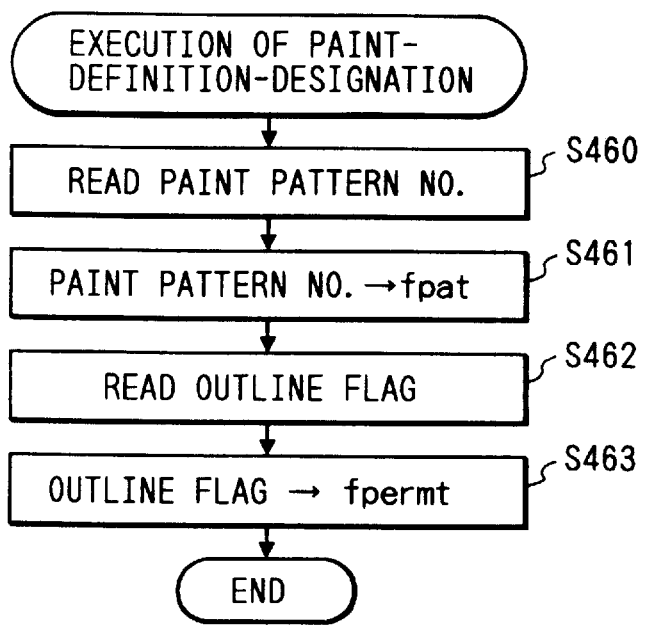
FIG. 103 is a flow chart showing processing upon execution of a paint-definition-designation function.

FIG. 103 shows processing upon execution of a paint-definition-designation function in step S399 in FIG. 92.

In step S460, a paint pattern No. is read from memory development information of a paint definition designation command, and the flow advances to step S461.

In step S461, the paint pattern No. is set in a variable fpat as paint pattern information used when a drawing pattern is developed onto a memory upon execution of a drawing function. The flow then advances to step S462.

In step S462, an outline flag value is read from the memory development information of the paint definition designation command, and the flow advances to step S463.

In step S463, the outline flag value is set in a variable fpermt as information indicating the presence/absence of an outline used when a drawing pattern is developed onto a memory upon execution of a drawing function, thus ending processing.

Figure 105:
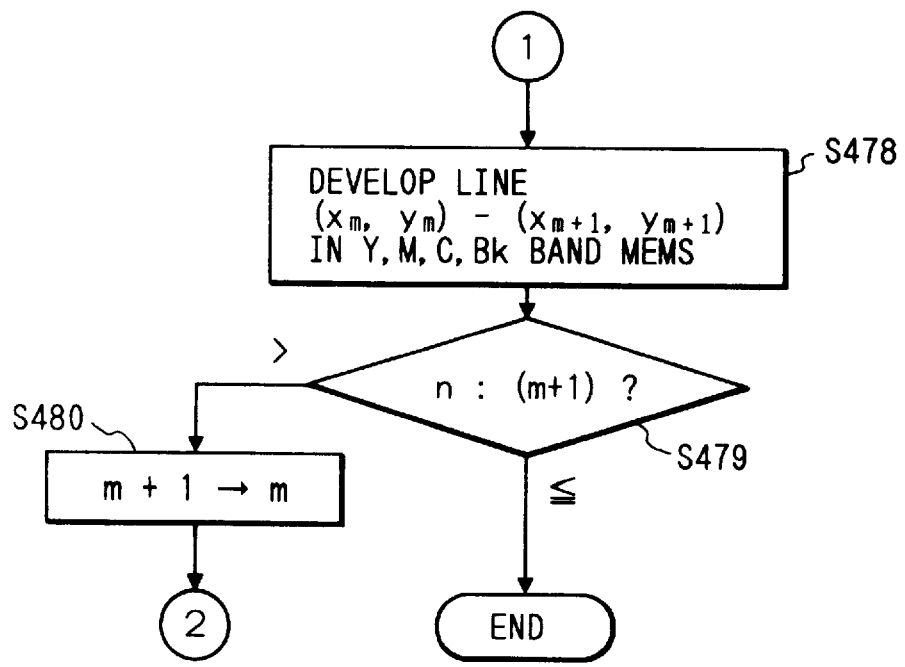
FIG. 105 is a flow chart showing the processing upon execution of the line-drawing function.
Figure 104:
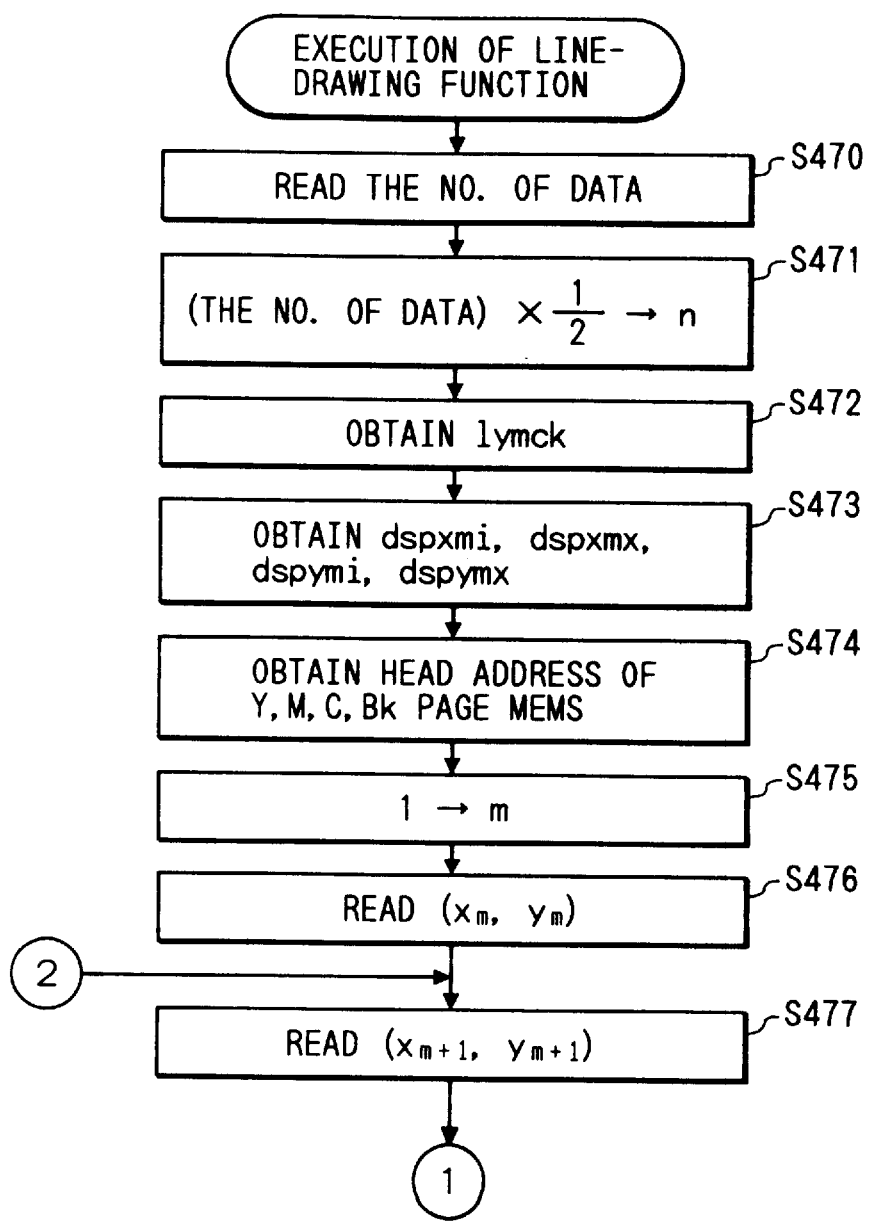
FIG. 104 is a flow chart showing processing upon execution of a line-drawing function.

FIGS. 104 and 105 show processing upon execution of a line-drawing function in step S399 in FIG. 92.

In step S470, the number of data is read from memory development information of a line drawing command, and the flow advances to step S471.

In step S471, a value (the number of coordinate points of a line) ½ the number of data is set in a constant n, and the flow advances to step S472.

In step S472, values of line color information lymck are obtained, and the flow advances to step S473.

In step S473, clip area information values dspxmi, dspxmx, dspymi, and dspymx are obtained, and the flow advances to step S474.

In step S474, the head addresses of the Y, M, C, and Bk virtual page memories are obtained, and the flow advances to step S475.

In step S475, 1 is set in a constant m, and the flow advances to step S476.

In step S476, a point (xm, ym) on the printer coordinates is read from the memory development information of the line drawing command, and the flow advances to step S477.

In step S477, another point (xm+1, ym+1) on the printer coordinates is read from the memory development information of the line drawing command, and the flow advances to step S478.

In step S478, a line pattern between the two points (xm, ym) and (xm+1, ym+1) on the printer coordinates is developed onto the Y, M, C, and Bk band memories together with the line color information lymck, clip area information, and the head addresses of the Y, M, C, and Bk virtual page memories. Thereafter, the flow advances to step S479.

In step S479, values n and (m+1) are compared with each other.

If n is larger than (m+1), the flow advances to step S480 to increment m by one. The flow then returns to step S477.

Otherwise, the processing is ended.

In this manner, a line drawing pattern can be developed onto the band memories using the memory development information of the line drawing, line color designation, and line width designation commands.

Figure 106:
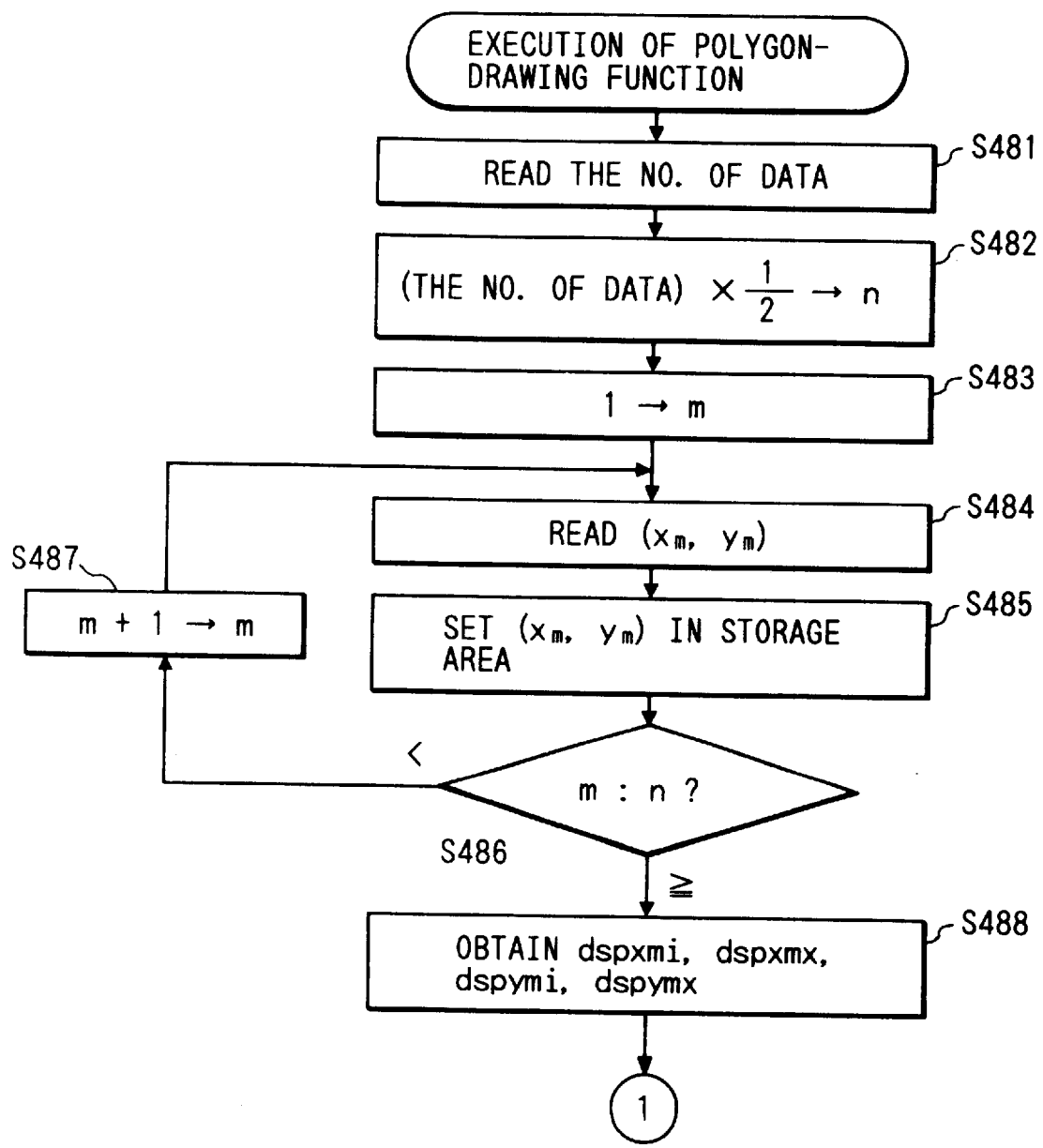
FIG. 106 is a flow chart showing processing upon execution of a polygon-drawing function.
Figure 107:
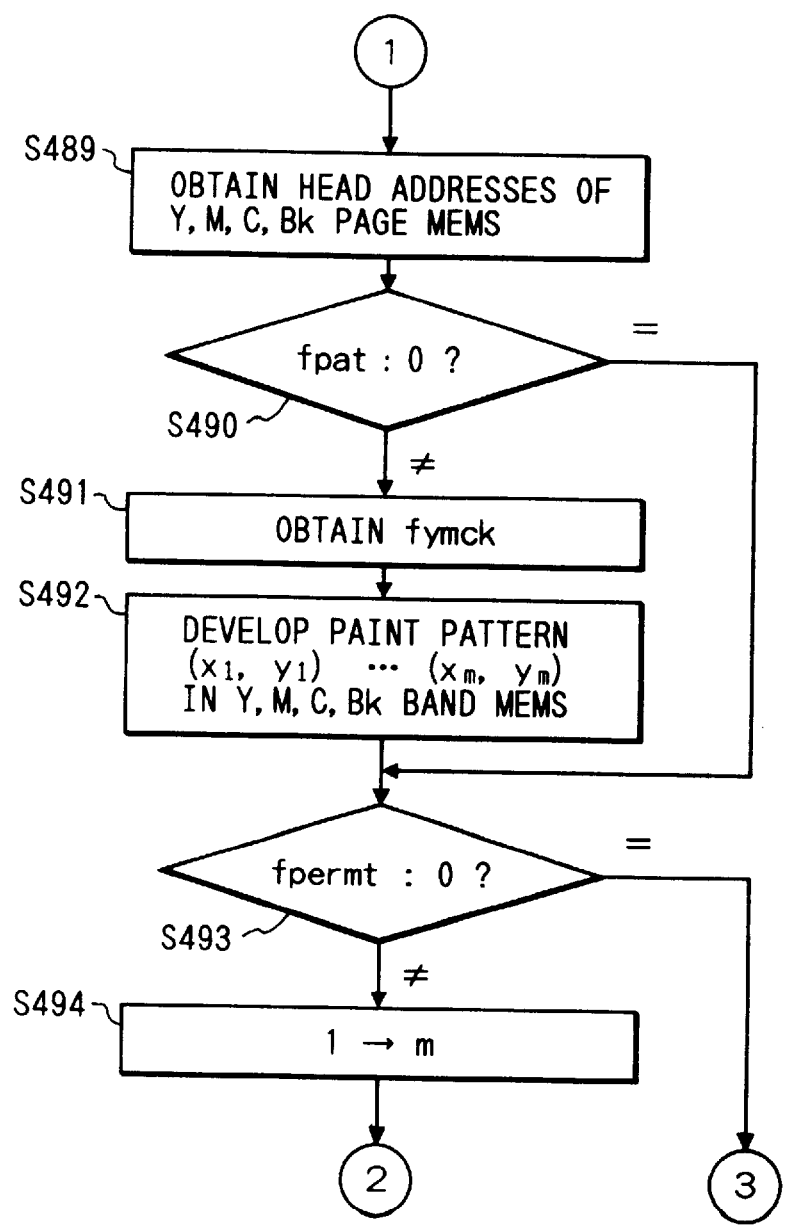
FIG. 107 is a flow chart showing the processing upon execution of the polygon-drawing function.
Figure 108:
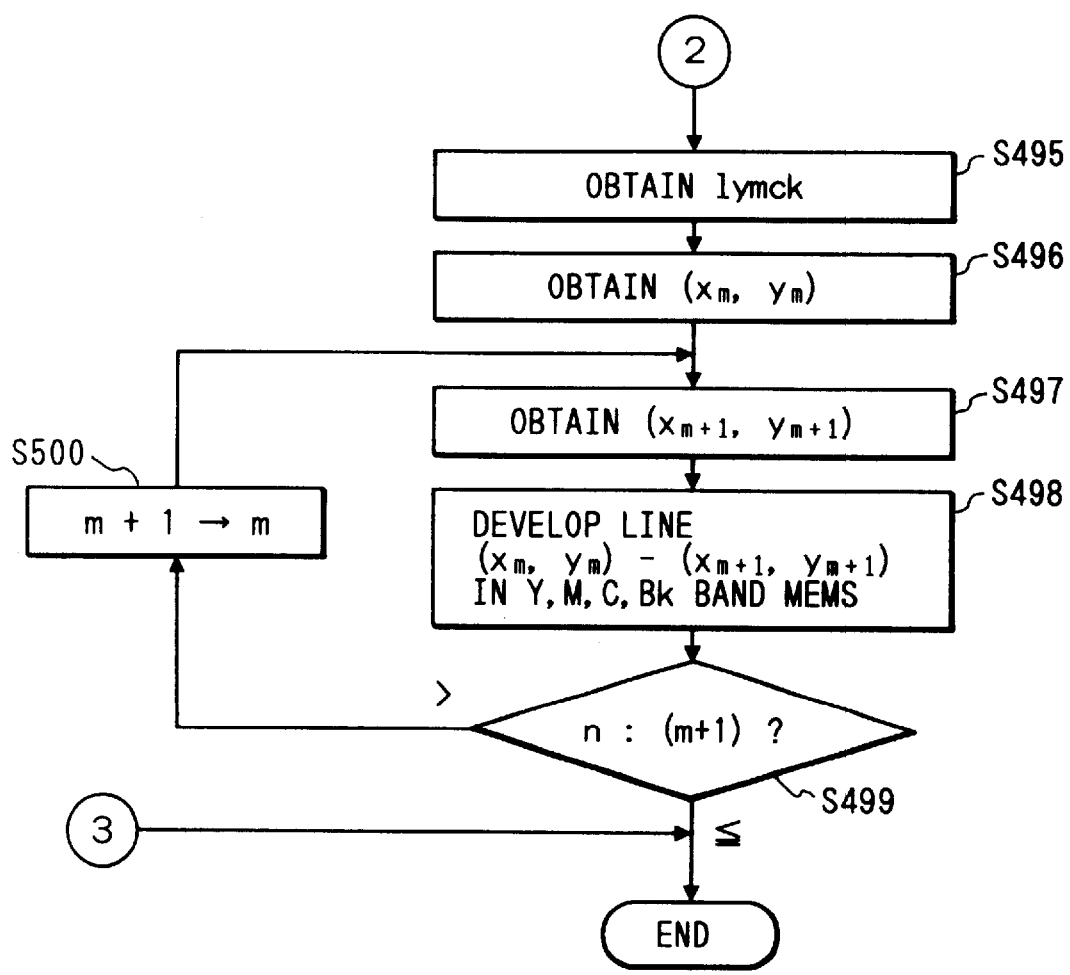
FIG. 108 is a flow chart showing the processing upon execution of the polygon-drawing function.

FIGS. 106 to 108 show processing upon execution of a polygon-drawing function in step S399 in FIG. 92.

In step S481, the number of data is read from memory development information of a polygon drawing command, and the flow advances to step S482.

In step S482, a value (the number of coordinate points of a polygon) ½ the number of data is set in a constant n, and the flow advances to step S483.

In step S483, 1 is set in a constant m, and the flow advances to step S484.

In step S484, a point (xm, ym) on the printer coordinates is read from the memory development information of the polygon drawing command, and the flow advances to step S485.

In step S485, the values xm and ym are set in a storage area in the system work memory, and the flow advances to step S486.

In step S486, the values n and m are compared with each other.

If n is larger than m, the flow advances to step S487 to increment m by one, and the flow returns to step S484.

If n≦m, the flow advances to step S488.

In step S488, values dspxmi, dspxmx, dspymi, and dspymx of clip area information are obtained, and the flow advances to step S489.

In step S489, the head addresses of the Y, M, C, and Bk virtual page memories are obtained, and the flow advances to step S490.

In step S490, the value of paint pattern information fpat is compared with 0.

If the value of the information fpat is equal to 0, flow advances to step S493.

If the value of the information fpat is not equal to 0, the flow advances to step S491 to obtain values of paint color information fymck, and the flow advances to step S492.

In step S492, an internal paint pattern of a polygon is developed onto an area surrounded by outline points (x1, y1), ..., (xm, ym) of the polygon set in the storage area of the system work memory in step S485 on the Y, M, C, and Bk band memories on the basis of the paint pattern information fpat, the paint color information fymck, the clip area information, and the head addresses of the Y, M, C, and Bk virtual page memories. Thereafter, the flow advances to step S493.

In step S493, a value of outline information fpermt is compared with 0.

If the value of the information fpermt is equal to 0, the processing is ended.

If the value of the information fpermt is not equal to 0, the flow advances to step S494, and 1 is set in the constant m. The flow then advances to step S495.

In step S495, values of line color information lymck are obtained, and the flow advances to step S496.

In step S496, coordinates xm and ym of an outline point of a polygon are obtained from the storage area in the system work memory, and the flow advances to step S497.

In step S497, coordinates xm+1 and ym+1 of another outline point of the polygon are obtained from the storage area in the system work memory, and the flow advances to step S498.

In step S498, a line pattern between the two points (xm, ym) and (xm+1, ym+1) on the printer coordinates is developed onto the Y, M, C, and Bk band memories on the basis of the line color information lymck, the clip area information, and the head addresses of the Y, M, C, and Bk virtual page memories. Thereafter, the flow advances to step S499.

In step S499, values n and (m+1) are compared with each other.

If n is larger than (m+1), the flow advances to step S500 to increment m by one, and the flow then returns to step S497.

Otherwise, the processing is ended.

In this manner, a polygon drawing pattern can be developed onto the band memories on the basis of the memory development information of the polygon drawing, paint definition designation, line color designation, and paint color designation commands.

Figure 109:
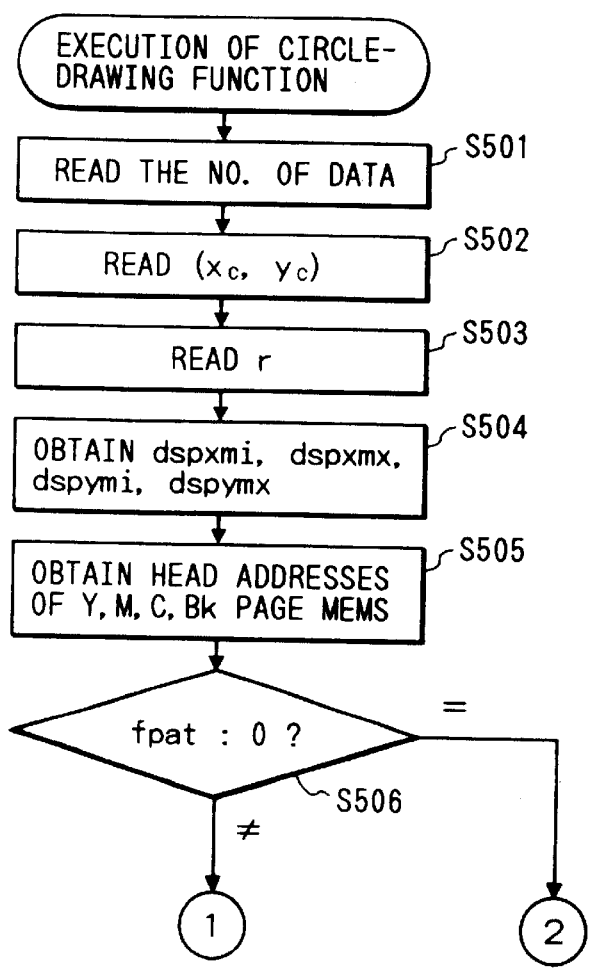
FIG. 109 is a flow chart showing processing upon execution of a circle-drawing function.
Figure 110:
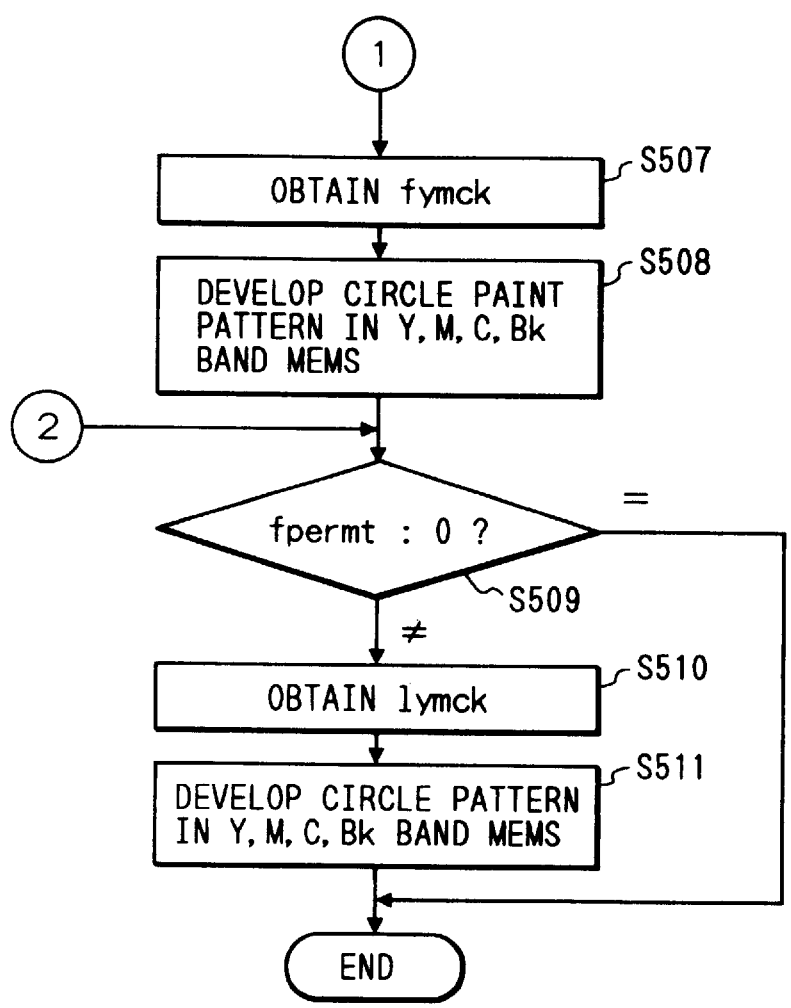
FIG. 110 is a flow chart showing the processing upon execution of the circle-drawing function.

FIGS. 109 and 110 show processing upon execution of a circle-drawing function in step S399 in FIG. 92.

In step S501, the number of data is read from memory development information of a circle drawing command, and the flow advances to step S502.

In step S502, xc and yc as the x- and y-coordinates of the center are read from the memory development information of the circle drawing command, and the flow advances to step S503.

In step S503, a radius r is read from the memory development information of the circle drawing command, and the flow advances to step S504.

In step S504, values dspxmi, dspxmx, dspymi, and dspymx of clip area information are obtained, and the flow advances to step S505.

In step S505, the head addresses of the Y, M, C, and Bk virtual page memories are obtained, and the flow advances to step S506.

In step S506, a value of paint pattern information fpat is compared with 0.

If the value of the information fpat is equal to 0, the flow advances to step S509.

If the value of the information fpat is not equal to 0 the flow advances to step S507 to obtain values of paint color information fymck. The flow then advances to step S508.

In step S508, an internal paint pattern of a circle is developed onto the Y, M, C, and Bk band memories on the basis of xc and yc, the radius r, the paint pattern information fpat, the paint color information fymck, the clip area information, and the head addresses of the Y, M, C, and Bk virtual page memories. The flow then advances to step S509.

In step S509, a value of outline information fpermt is compared with 0.

If the value of the information fpermt is equal to 0, the processing is ended.

If the value of the information fpermt is not equal to 0, the flow advances to step S510 to obtain values of color information lymck, and the flow then advances to step S511.

In step S511, an outline pattern of a circle is developed onto the Y, M, C, and Bk band memories on the basis of xc and yc, the radius r, the paint color information lymck, the clip area information, and the head addresses of the Y, M, C, and Bk virtual page memories. Thereafter, the processing is ended.

In this manner, a circle drawing pattern can be developed onto the band memories on the basis of the memory development information of the circle drawing, paint definition designation, line color designation, and paint color designation commands.

Figure 111:
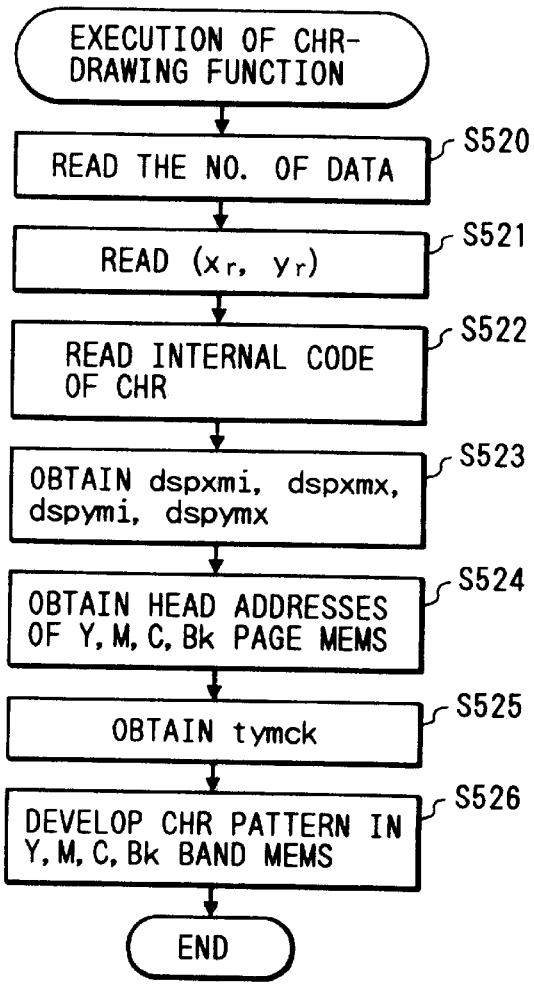
FIG. 111 is a flow chart showing processing upon execution of a character-drawing function.

FIGS. 111 and 112 show processing upon execution of a character-drawing function in step S399 in FIG. 92.

In step S520, the number of data is read from memory development information of a character drawing command, and the flow advances to step S521.

In step S521, the x- and y-coordinates xr and yr of the drawing position are read from the memory development information of the character drawing command, and the flow advances to step S522.

In step S522, the internal code of a character is read from the memory development information of the character drawing command, and the flow advances to step S523.

In step S523, values dspxmi, dspxmx, dspymi, and dspymx of clip area information are obtained, and the flow advances to step S524.

In step S524, the head addresses of the Y, M, C, and Bk virtual page memories are obtained, and the flow advances to step S525.

In step S525, values of character color information tymck are obtained, and the flow advances to step S526.

In step S526, a character pattern is developed onto the Y, M, C, and Bk band memories on the basis of xr and yr, the internal code, the character color information tymck, the clip area information, and the head addresses of the Y, M, C, and Bk virtual page memories, thus ending the processing.

In this manner, a character pattern can be developed onto the band memories on the basis of the memory development information of the character drawing and character color designation commands.

FIG. 112 shows processing upon execution of a skip function in step S399 in FIG. 92.

In step S530, the number of data is read from memory development information, and the flow advances to step S531.

In step S531, the number of data is set in a constant n, and the flow advances to step S532.

In step S532, 0 is set in a constant j, and the flow advances to step S533.

In step S533, a pointer is set at data next to the number-of-data parameter, and the flow advances to step S534.

In step S534, data indicated by the pointer is read, and the flow advances to step S535.

In step S535, the constant j is incremented by one, and the flow advances to step S536.

In step S536, the pointer is advanced to indicate the next data, and the flow advances to step S537.

In step S537, the constant j and the number n of data are compared with each other. If these values are not equal to each other, the flow returns to step S534.

If these values are equal to each other, the processing is ended.

In this manner, the control can skip memory development information of a drawing command.

Figure 113:
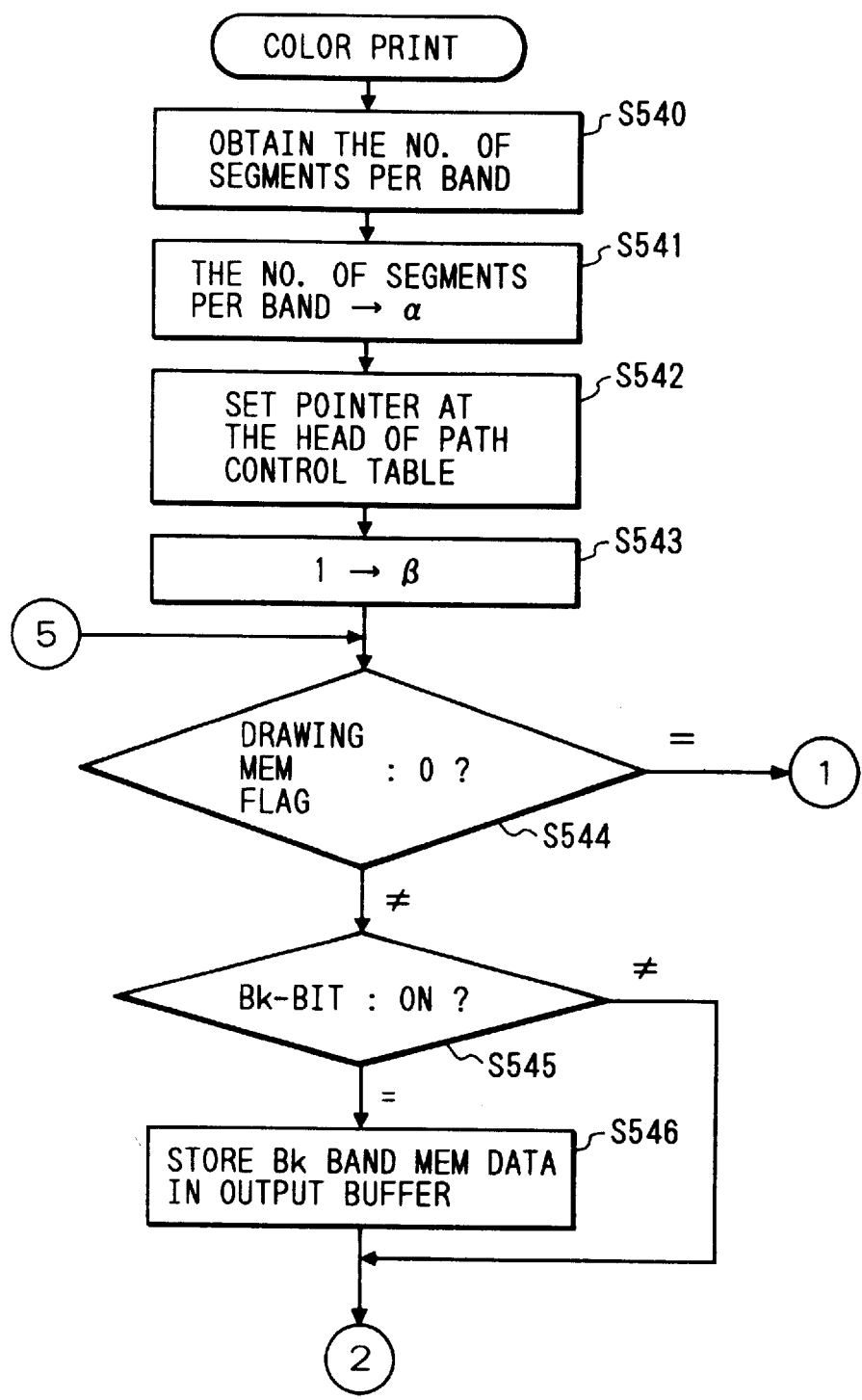
FIG. 113 is a flow chart showing processing upon execution of a skip operation.
Figure 114:
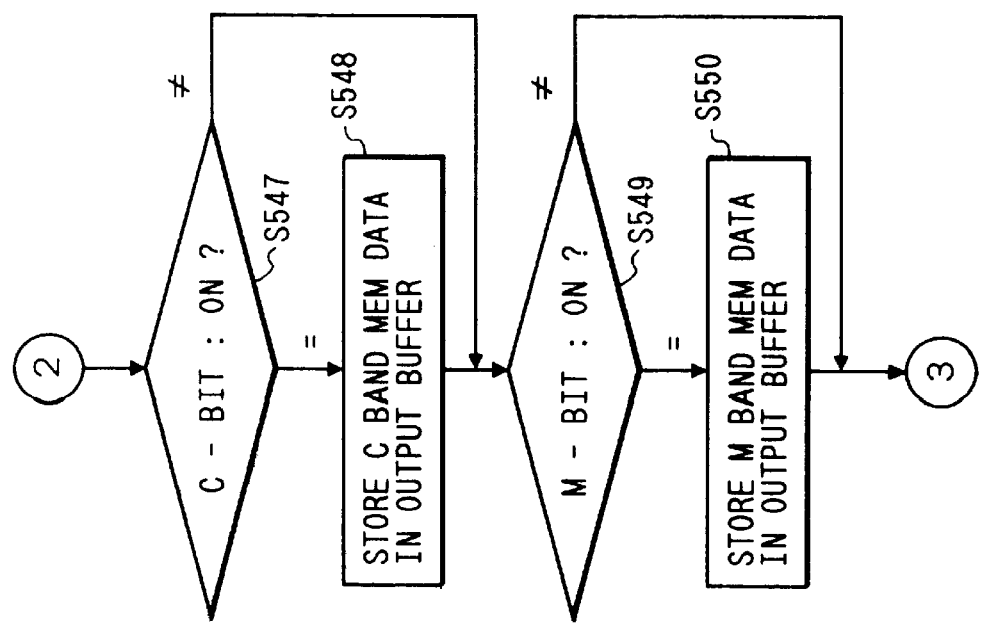
FIG. 114 is a flow chart showing the processing upon execution of a color print operation.
Figure 115:
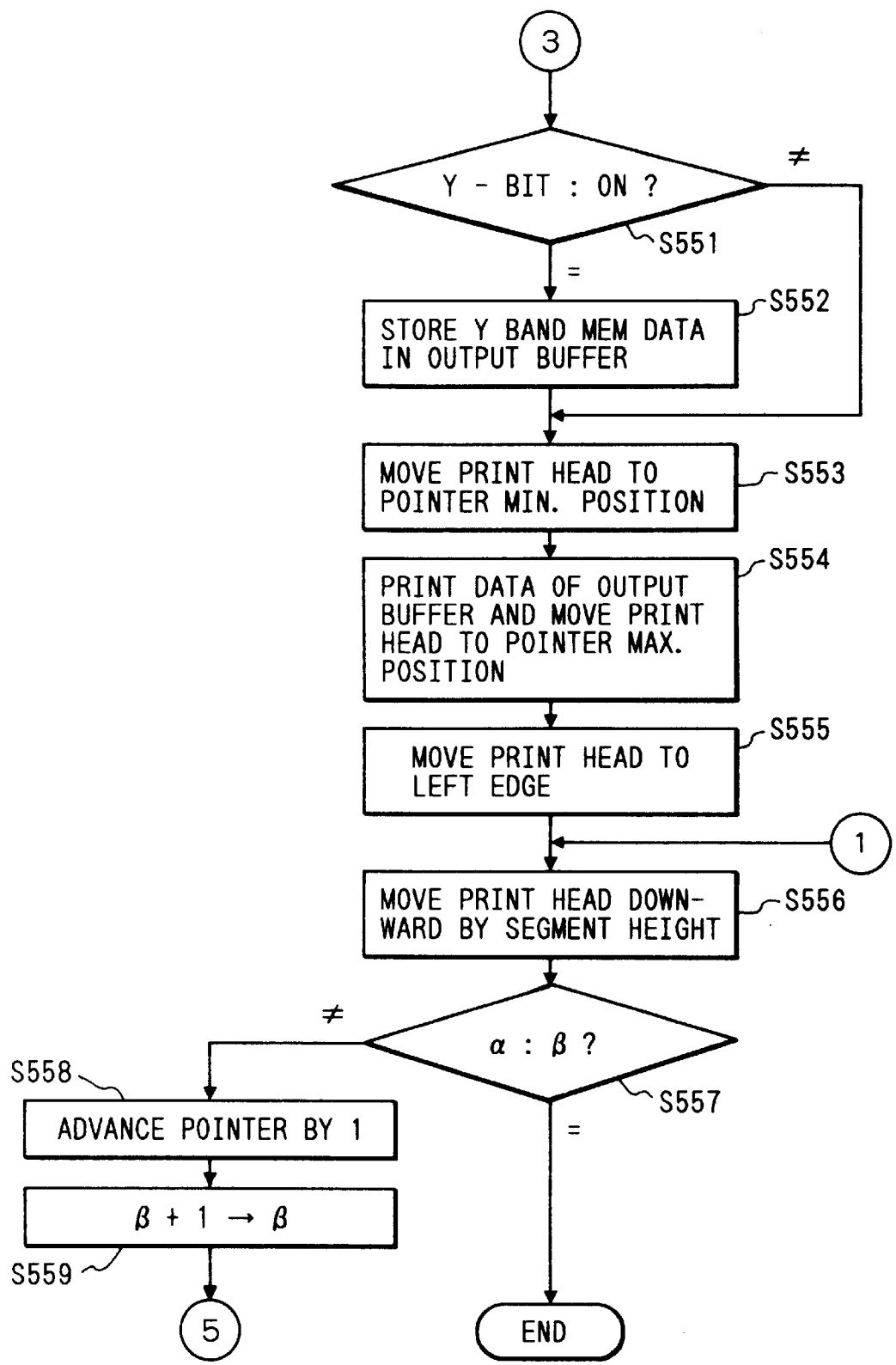
FIG. 115 is a flow chart showing the processing upon execution of the color print operation.

FIGS. 113 to 115 show processing upon execution of a color print operation in step S15 in FIG. 23.

In step S540, the number of segments (the number of paths) per band is obtained from the band storage 5, and the flow advances to step S541.

In step S541, the number of segments per band is set in a constant $\alpha$, and the flow advances to step S542.

In step S542, a pointer is set at the head of the path control table, and the flow advances to step S543.

In step S543, 1 is set in a constant $\beta$, and the flow advances to step S544.

In step S544, a value of a drawing memory flag indicated by the pointer is compared with 0.

If the value of the flag is equal to 0, the flow advances to step S556.

If the value of the flag is not equal to 0, the flow advances to step S545.

In step S545, it is checked if the Bk-bit of the drawing memory flag is ON.

If the Bk-bit is not ON, the flow advances to step S547.

If a Bk-bit is ON, the flow advances to step S546, and the memory content of the current segment from the minimum value to the maximum value indicated by the pointer of the Bk band memory is stored in an output buffer. Thereafter, the flow advances to step S547.

In step S547, it is checked if a C-bit of the drawing memory flag is ON.

If the C-bit is not ON, the flow advances to step S549.

If the C-bit is ON, the flow advances to step S548, and the memory content of the current segment from the minimum value to the maximum value indicated by the pointer of the C band memory is stored in the output buffer. Thereafter, the flow advances to step S549.

In step S549, it is checked if an M-bit of the drawing memory flag is ON.

If the M-bit is not ON, the flow advances to step S551.

If the M-bit is ON, the flow advances to step S550, and the memory content of the current segment from the minimum value to the maximum value indicated by the pointer of the M band memory is stored in the output buffer. Thereafter, the flow advances to step S551.

In step S551, it is checked if a Y-bit of the drawing memory flag is ON.

If the Y-bit is not ON, the flow advances to step S553.

If the Y-bit is ON, the flow advances to step S552, and the memory content of the current segment from the minimum value to the maximum value indicated by the pointer of the Y band memory is stored in the output buffer. Thereafter, the flow advances to step S553.

In step S553, the print head is horizontally moved to the position of the minimum value indicated by the pointer, and the flow advances to step S554.

In step S554, the content of the output buffer is recorded on a sheet in correspondence with the horizontal movement of the print head to the position of the maximum value indicated by the pointer. Thereafter, the flow advances to step S555.

In step S555, the print head is horizontally moved to the left edge, and the flow advances to step S556.

In step S556, the print head is vertically moved by the height of one segment (path), and the flow advances to step S557.

In step S557, the values $\alpha$ and $\beta$ are compared with each other.

If the two values are equal to each other, the processing is ended.

If the two values are not equal to each other, the flow advances to step S558 to advance the pointer by one, and the flow then advances to step S559.

In step S559, the value $\beta$ is incremented by one, and the processing is ended.

Figure 116:
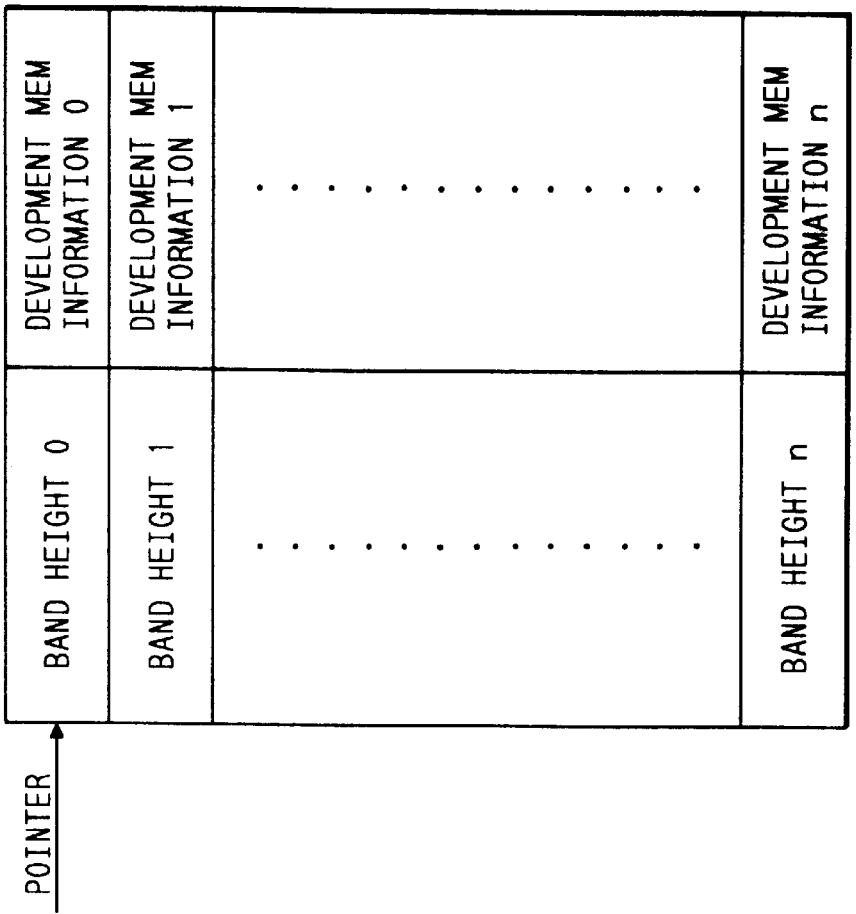
FIG. 116 is a view showing a band height information table storing band heights and memory capacities.

FIG. 116 shows a band height information table storing band heights and corresponding development memory information (memory capacity) for one coloring agent.

Figure 117:
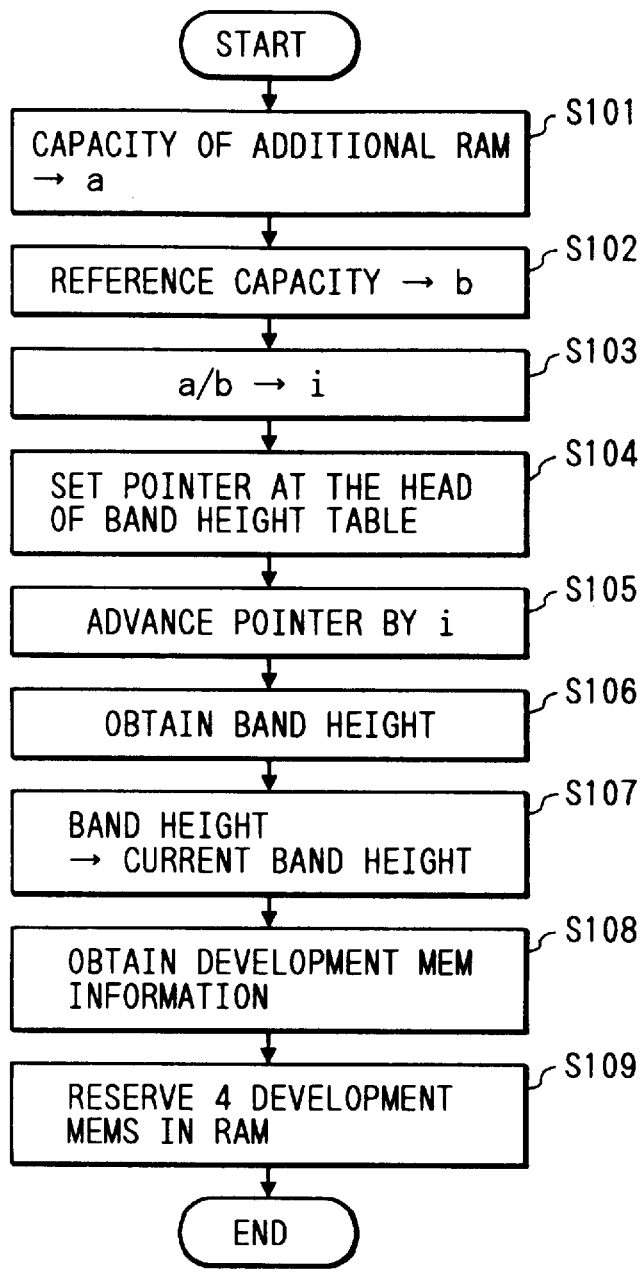
FIG. 117 is a flow chart showing processing for changing and setting development memories in units of coloring agents on the basis of RAM capacity information.

FIG. 117 is a flow chart showing an operation for changing band height information on the basis of capacity information of an additional RAM, and changing and setting the Y, M, C, and Bk development memories.

In step S101, information of the memory capacity of an additional RAM is obtained, and is set in a constant a. The flow then advances to step S102.

In step S102, a reference value (a memory capacity serving as a reference for changing a band height) of the memory capacity is set in b, and the flow advances to step S103.

In step S103, the value a is divided (rounded) by the value b, and the quotient is set in a constant i. The flow then advances to step S104.

In step S104, a pointer is set at the head of the band height information table shown in FIG. 116, and the flow advances to step S105.

In step S105, the pointer is advanced by the value i, and the flow advances to step S106.

In step S106, band height information is obtained from the content indicated by the pointer, and the flow advances to step S107.

In step S107, the obtained band height information is set in the current band height information, and the flow advances to step S108.

In step S108, development memory information is obtained from the content indicated by the pointer, and the flow advances to step S109.

In step S109, the four, i.e., Y, M, C, and Bk development memories are assured and set on the RAM on the basis of the obtained development memory information, thus ending the processing.

As described above, the height of one band can be changed according to the capacity of an additional memory, and the development memory for one band can be changed.

Figure 118:
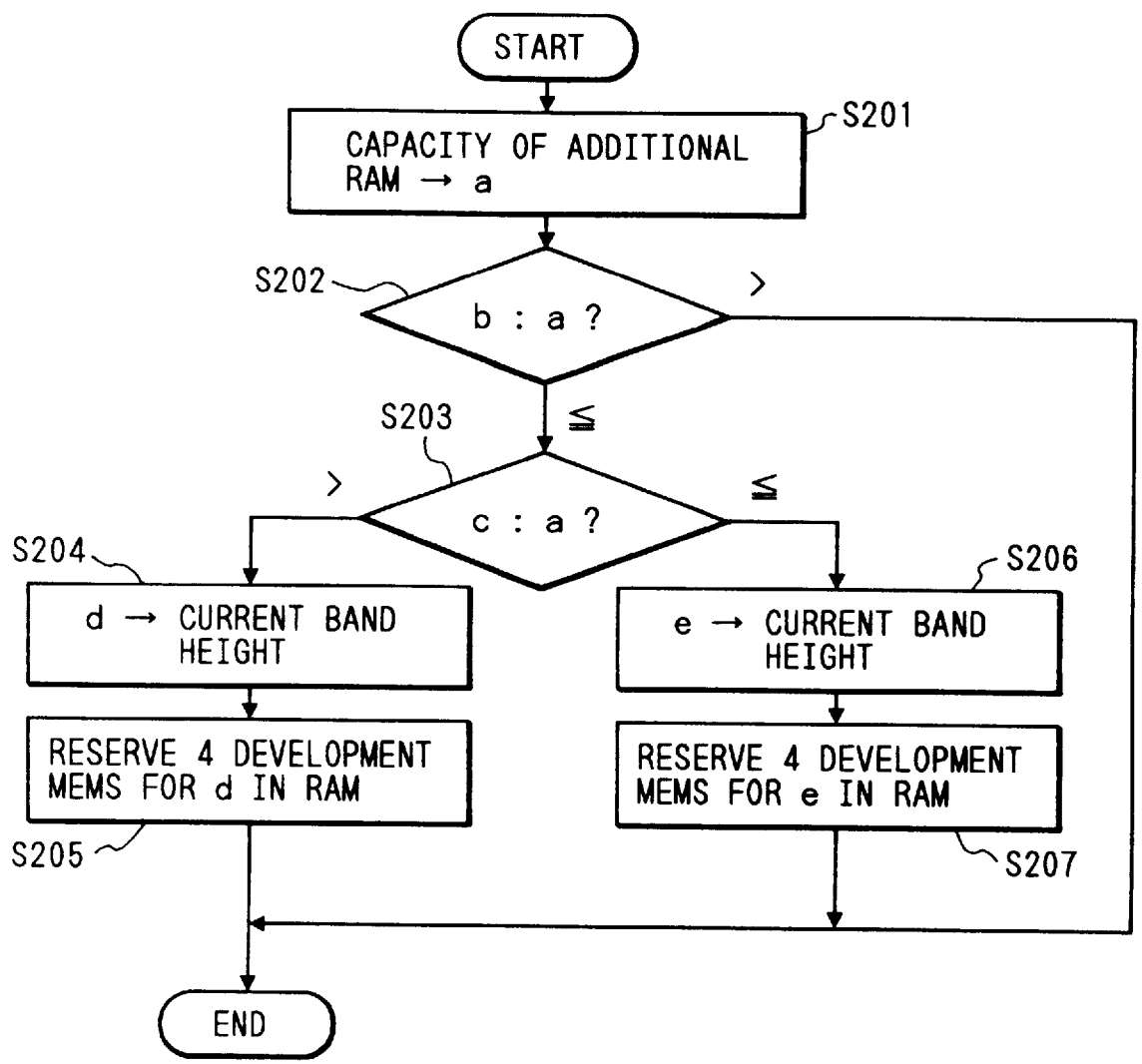
FIG. 118 is a flow chart showing another embodiment of FIG. 117.

The processing shown in FIG. 117 can also be realized by processing shown in FIG. 118.

In step S201, information of the memory capacity of an additional RAM is obtained, and is set in a constant a. The flow then advances to step S202.

In step S202, a constant b as a reference value (a memory capacity serving as a reference for changing a band height) of a predetermined memory capacity is compared with the constant a.

If b is larger than a, the processing is ended.

Therefore, neither the band height nor the development memory are changed.

If a is equal to or larger than b, the flow advances to step S203.

In step S203, a constant c as a reference value (a memory capacity serving as a reference for changing a band height; c>b) of a predetermined memory capacity is compared with the constant a.

If c is larger than a, the flow advances to step S204. In step S204, a constant d (a predetermined band height information value for the reference value b of the memory capacity) is set in the current band height information, and the flow advances to step S205.

In step S205, the four, i.e., Y, M, C, and Bk development memories corresponding to the band height information d are assured and set on the RAM, thus ending the processing.

If it is determined in step S203 that a is equal to or larger than c, the flow advances to step S206.

In step S206, a constant e (a predetermined band height information value for the reference value c of the memory capacity) is set in the current band height information, and the flow advances to step S207.

In step S207, the four, i.e., Y, M, C, and Bk development memories corresponding to the band height information e are assured and set on the RAM, thus ending the processing.

As described above, the height of one band can be changed according to the capacity of an additional memory, and the development memory for one band can be changed.

Figure 119:
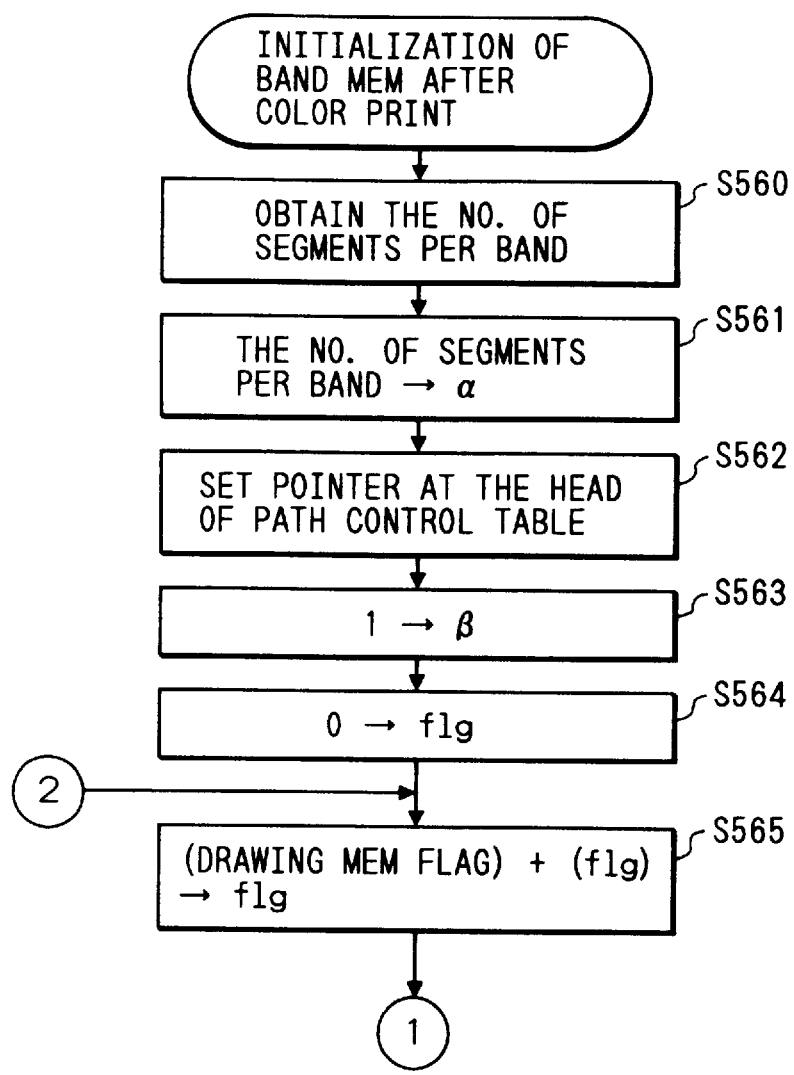
FIG. 119 is a flow chart showing processing for initializing a band memory.
Figure 120:
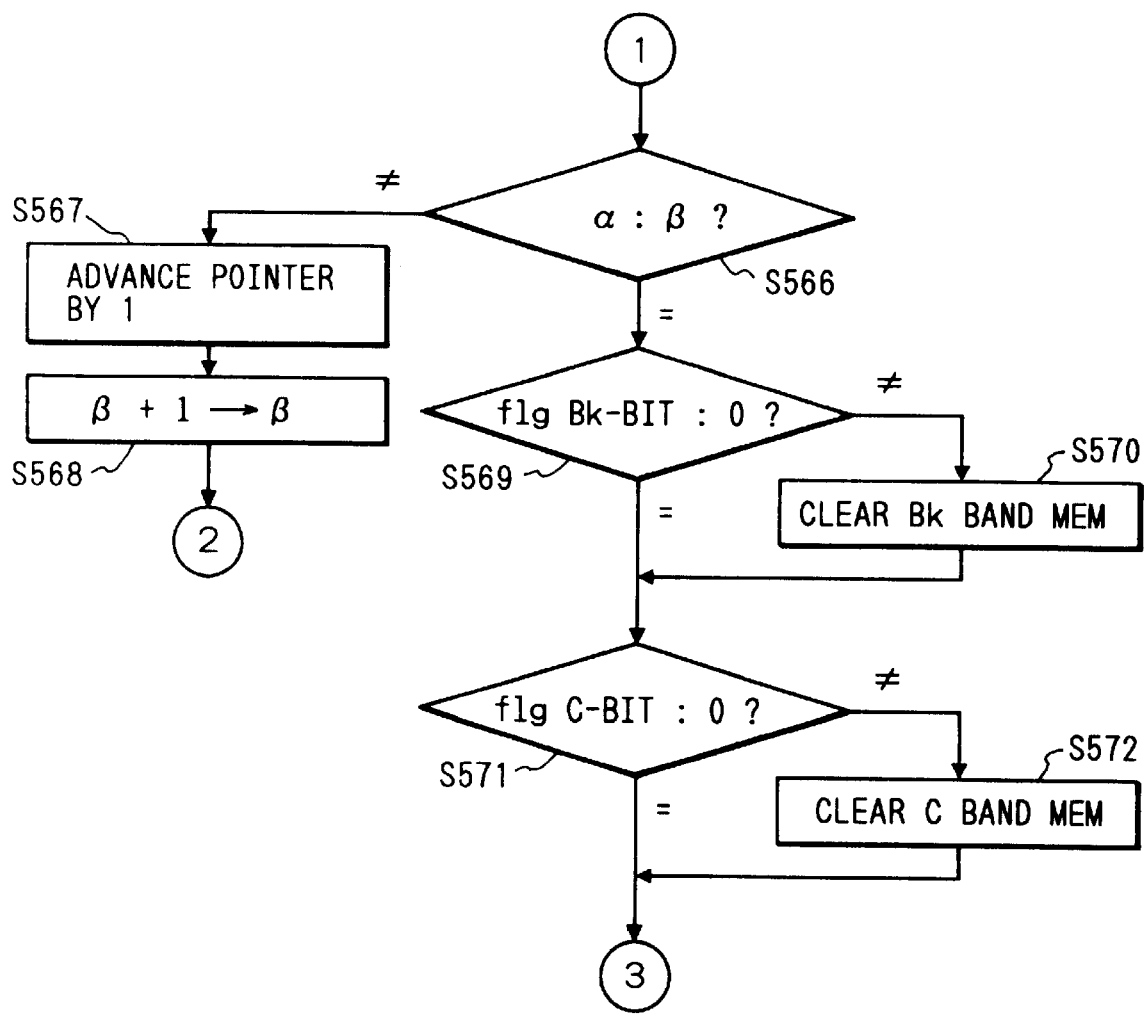
Figure 121:
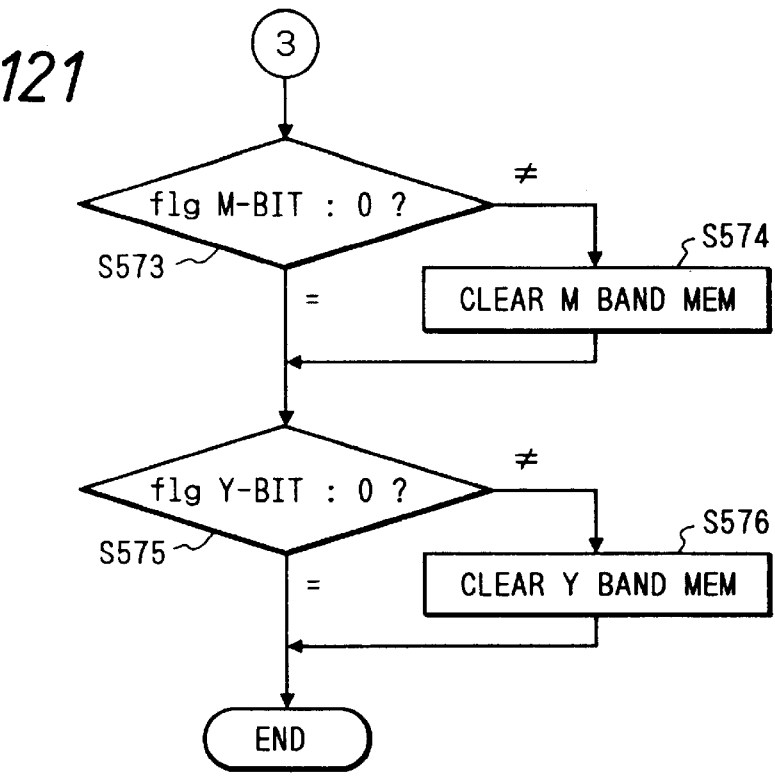
Figure 123:
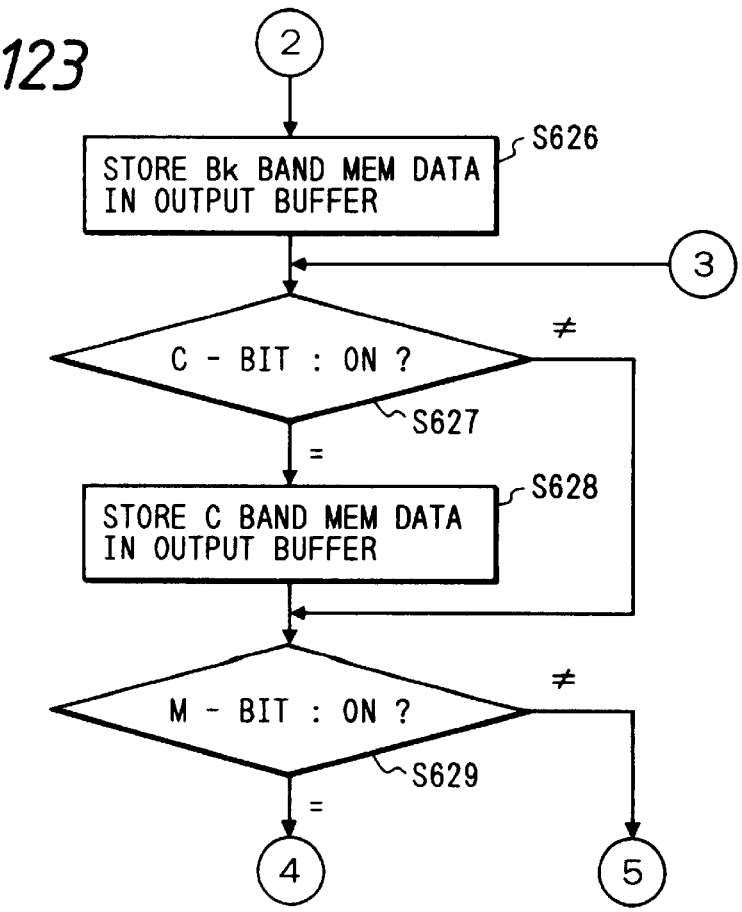
Figure 122:
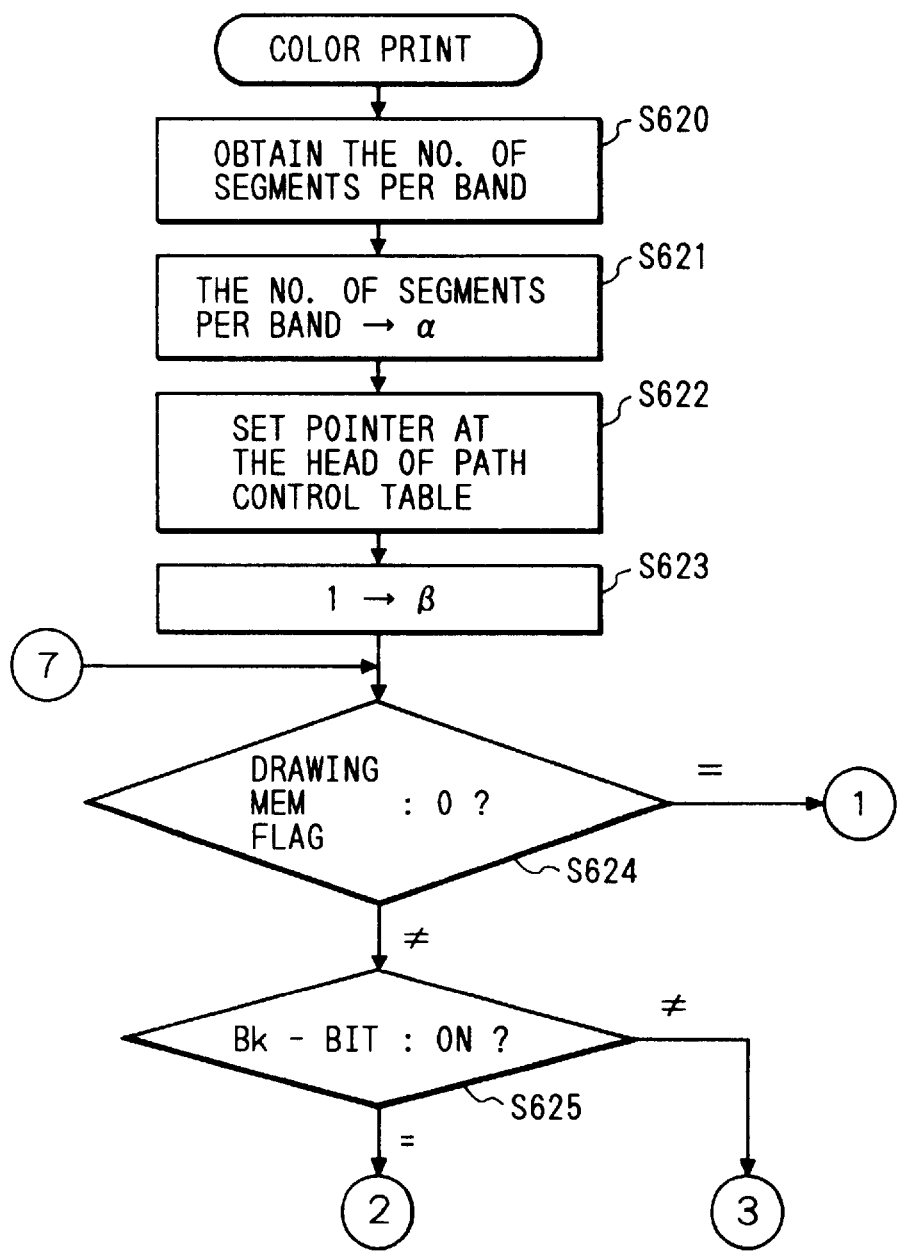
Figure 124:
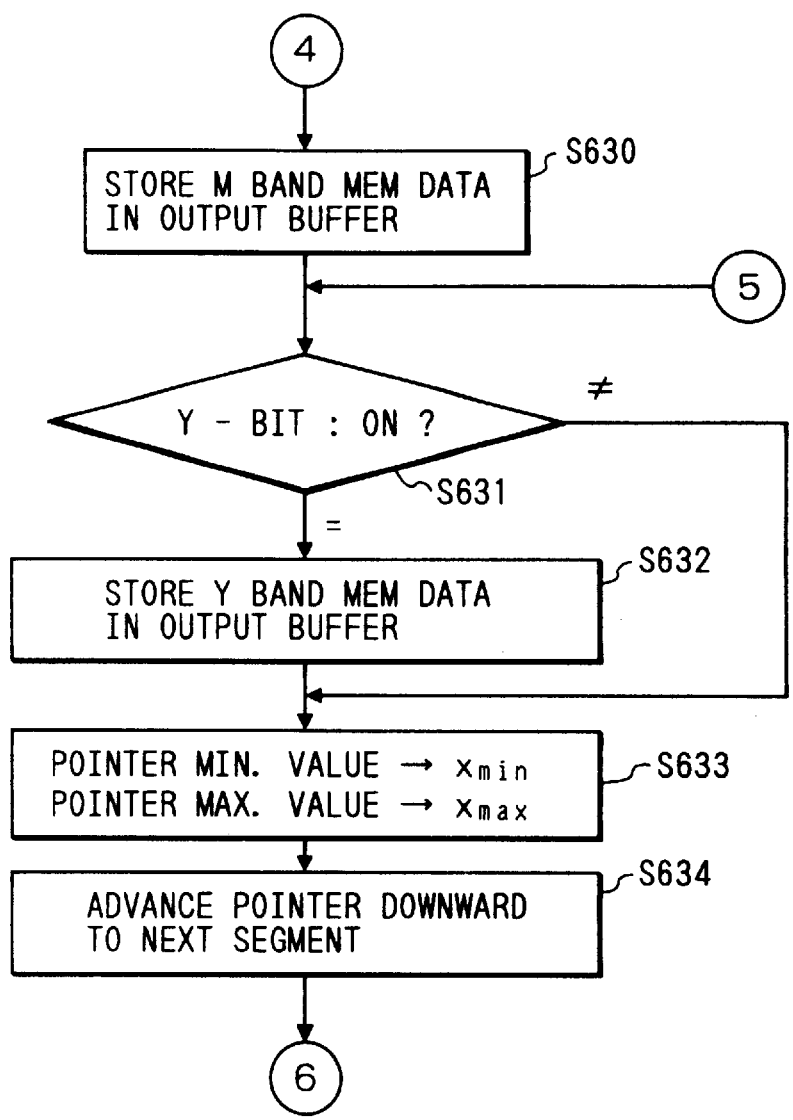
Figure 125:
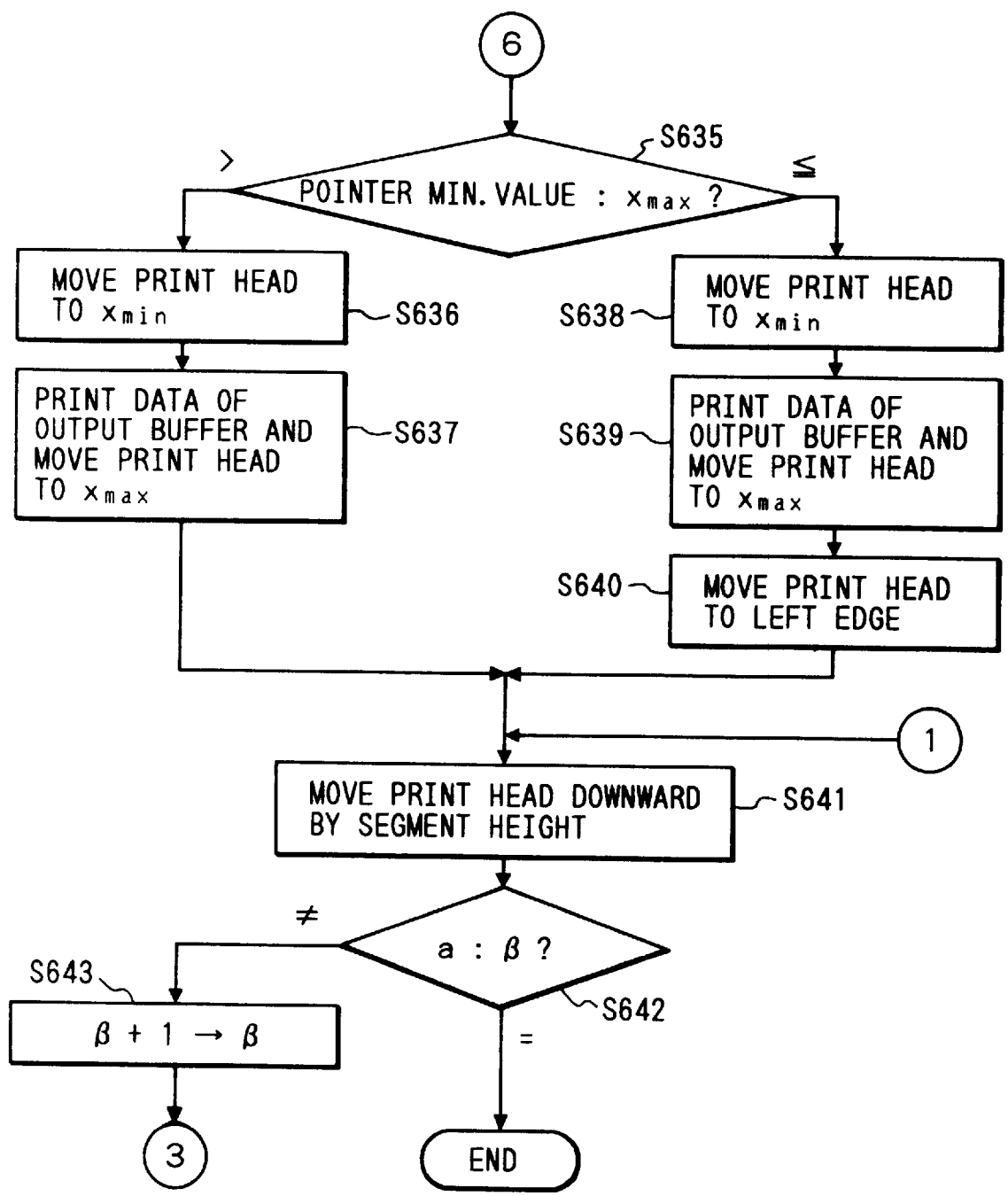

FIGS. 119 to 121 show band memory initialization processing that can be replaced with the processing in step S17 shown in FIG. 23.

In step S560, the number of segments (the number of paths) per band is obtained from the band storage 5, and the flow advances to step S561.

In step S561, the number of segments per band is set in a constant $\alpha$, and the flow advances to step S562.

In step S562, a pointer is set at the head of the path control table, and the flow advances to step S563.

In step S563, 1 is set in a constant $\beta$, and the flow advances to step S564.

In step S564, 0 is set in flg (4 bits), and the flow advances to step S565.

In step S565, a drawing memory flag indicated by the pointer and the content of flg are logically ORed, and the ORed result is set in flg. The flow then advances to step S566.

In step S566, the values $\alpha$ and $\beta$ are compared with each other.

If the two values are not equal to each other, the flow advances to step S567 to advance the pointer by one. Thereafter, the flow advances to step S568.

In step S568, the value β is incremented by one, and the flow returns to step S565.

If it is determined in step S566 that the two values are equal to each other, the flow advances to step S569.

In step S569, it is checked if a Bk-bit (0th bit) of flg is equal to 0.

If the two values are equal to each other, the flow advances to step S571.

If the two values are not equal to each other, the flow advances to step S570, and the content of the Bk band memory is cleared. Thereafter, the flow advances to step S571.

In step S571, it is checked if a C-bit (1st bit) of flg is equal to 0.

If the two values are equal to each other, the flow advances to step S573.

If the two values are not equal to each other, the flow advances to step S572, and the content of the C band memory is cleared. Thereafter, the flow advances to step S573.

In step S573, it is checked if an M-bit (2nd bit) of fig is equal to 0.

If the two values are equal to each other, the flow advances to step S575.

If the two values are not equal to each other, the flow advances to step S574, and the content of the M band memory is cleared. Thereafter, the flow advances to step S575.

In step S575, it is checked if a Y-bit (3rd bit) of fig is equal to 0.

If the two values are equal to each other, the processing is ended.

If the two values are not equal to each other, the flow advances to step S576, and the content of the Y band memory is cleared. Thereafter, the processing is ended.

FIGS. 122 to 125 show processing that can be replaced with the color print processing shown in FIGS. 113 to 115.

In step S620, the number of segments (the number of paths) per band is obtained from the band storage 5, and the flow advances to step S621.

In step S621, the number of segments per band is set in a constant α, and the flow advances to step S622.

In step S622, a pointer is set at the head of the path control table, and the flow advances to step S623.

In step S623, 1 is set in a constant β, and the flow advances to step S624.

In step S624, the value of a drawing memory flag indicated by the pointer is compared with 0.

If the value of the flag is equal to 0, the flow advances to step S641.

If the value of the flag is not equal to 0, the flow advances to step S625.

In step S625, it is checked if a Bk-bit of the drawing memory flag is ON.

If the Bk-bit is not ON, the flow advances to step S627.

If the Bk-bit is ON, the flow advances to step S626, and the memory content of the current segment from the minimum value to the maximum value indicated by the pointer of the Bk band memory is stored in the output buffer. Thereafter, the flow advances to step S627.

In step S627, it is checked if a C-bit of the drawing memory flag is ON.

If the C-bit is not ON, the flow advances to step S629.

If the C-bit is ON, the flow advances to step S628, and the memory content of the current segment from the minimum value to the maximum value indicated by the pointer of the C band memory is stored in the output buffer. Thereafter, the flow advances to step S629.

In step S629, it is checked if an M-bit of the drawing memory flag is ON.

If the M-bit is not ON, the flow advances to step S631.

If the M-bit is ON, the flow advances to step S630, and the memory content of the current segment from the minimum value to the maximum value indicated by the pointer of the M band memory is stored in the output buffer. Thereafter, the flow advances to step S631.

In step S631, it is checked if a Y-bit of the drawing memory flag is ON.

If the Y-bit is not ON, the flow advances to step S633.

If the Y-bit is ON, the flow advances to step S632, and the memory content of the current segment from the minimum value to the maximum value indicated by the pointer of the Y band memory is stored in the output buffer. Thereafter, the flow advances to step S633.

In step S633, the minimum and maximum values indicated by the pointer are respectively set in xmin and xmax, and the flow then advances to step S634.

In step S634, the pointer is advanced to indicate a segment immediately below the current segment, and the flow advances to step S635.

In step S635, the minimum value indicated by the pointer is compared with the value xmax.

If the minimum value is larger than xmax, the flow advances to step S636 to horizontally move the print head to the position of xmin. Thereafter, the flow advances to step S637.

In step S637, the content of the output buffer is recorded on a sheet in correspondence with the horizontal movement of the print head to the position of xmax. Thereafter, the flow advances to step S641.

If it is determined in step S635 that the minimum value is equal to or smaller than the value xmax, the flow advances to step S638 to horizontally move the print head to the position of xmin. Thereafter, the flow advances to step S639.

In step S639, the content of the output buffer is recorded on a sheet in correspondence with the horizontal movement of the print head to the position of xmax. Thereafter, the flow advances to step S640 to horizontally move the print head to the left edge, and the flow then advances to step S641.

In step S641, the print head is vertically moved by the height of one segment (path), and the flow advances to step S642.

In step S642, the values α and β are compared with each other.

If the two values are equal to each other, the processing is ended.

If the two values are not equal to each other, the flow advances to step S643 to increment the value β by one. Thereafter, the flow returns to step S624.

The image processing apparatus of this embodiment can select one of a mode for performing a color print operation using a set of Y, M, C, and Bk band memories, and a mode for performing a color print operation using two sets of Y, M, C, and Bk band memories according to an instruction from the host computer 1 (FIG. 13) or the operator control panel 22 (FIG. 13), and can perform color print processing in the selected mode.

Figure 126:
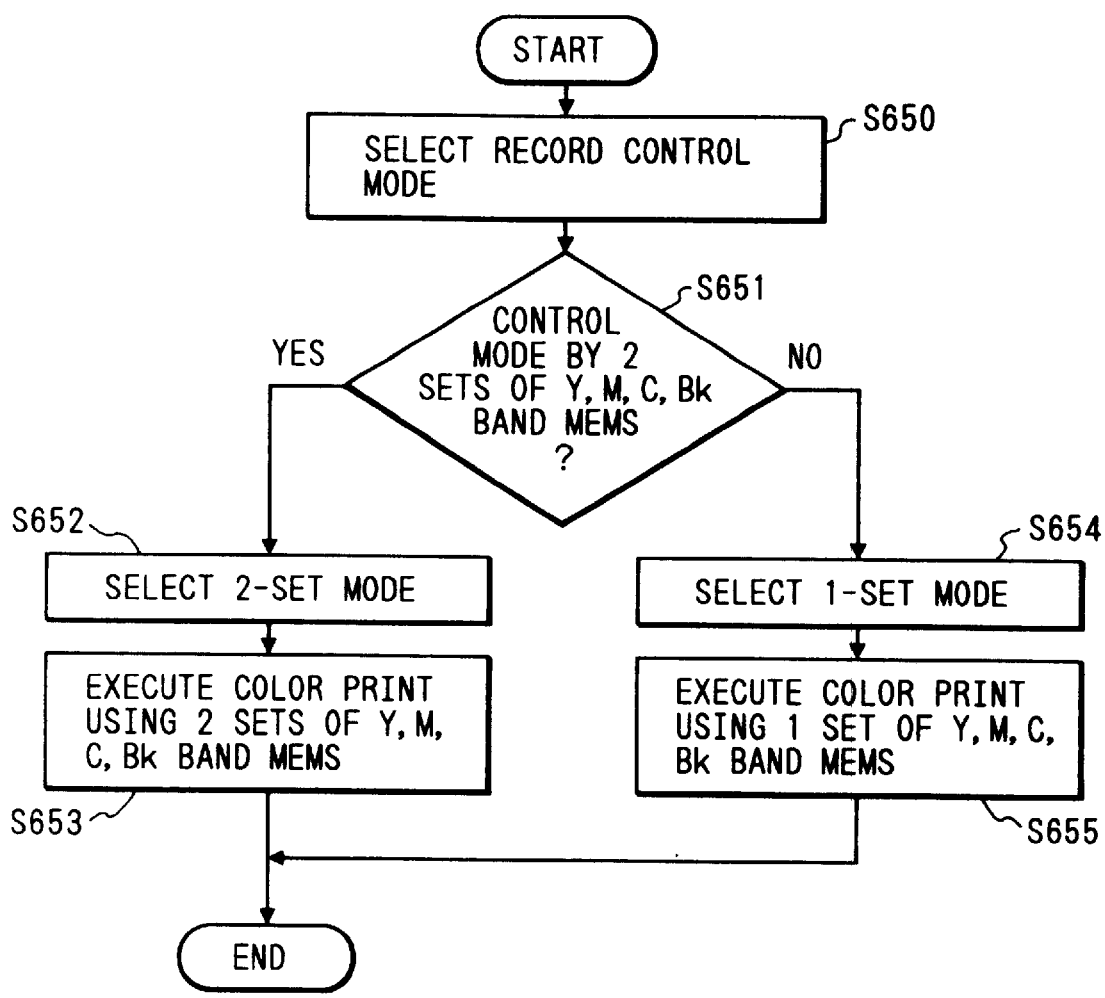

FIG. 126 is a flow chart showing processing for selecting one of the above-mentioned mode according to an instruction from the operator control panel 22 (FIG. 13), and performing color print processing.

In step S650, a record control mode of the operator control panel 22 (FIG. 13) is selected, and the flow advances to step S651.

In step S651, the selected record control mode is checked.

If the control mode using two sets of Y, M, C, and Bk band memories is selected, the flow advances to step S652 to select a record control mode (2-set mode) using two sets of Y, M, C, and Bk band memories. The flow advances to step S653 to perform color print processing using the two sets of Y, M, C, and Bk band memories, thus ending the processing.

If the control mode using one set of Y, M, C, and Bk band memories is selected, the flow advances to step S654 to select a record control mode (1-set mode) using one set of Y, M, C, and Bk band memories. The flow then advances to step S655 to perform color print processing using one set of Y, M, C, and Bk band memories, thus ending the processing.

As described above, one of the color print mode using one set of Y, M, C, and Bk band memories, and the color print mode using two sets of Y, M, C, and Bk band memories can be selected on the operator control panel, and the color print processing can be performed in the selected mode.

Figure 127:
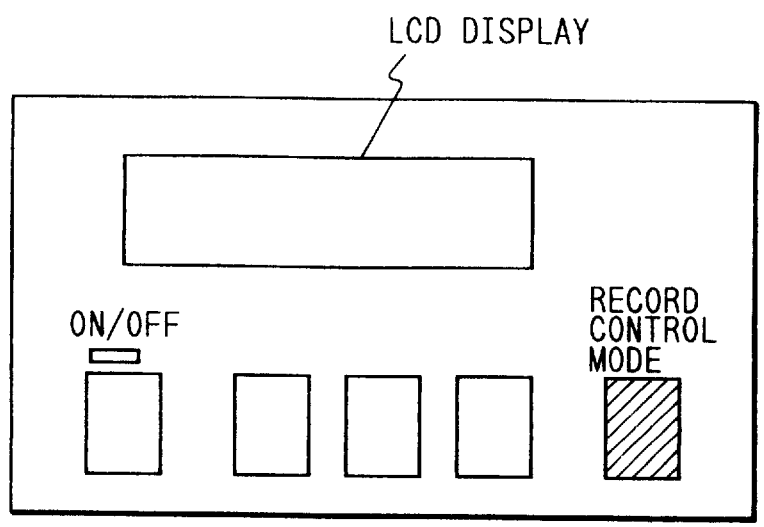

FIG. 127 shows the operator control panel 22 shown in FIG. 13.

As shown in FIG. 127, the operator control panel is constituted by an LCD display and switches. A switch at the right end in FIG. 127 is used for selecting the above-mentioned record control mode.

Figure 128:
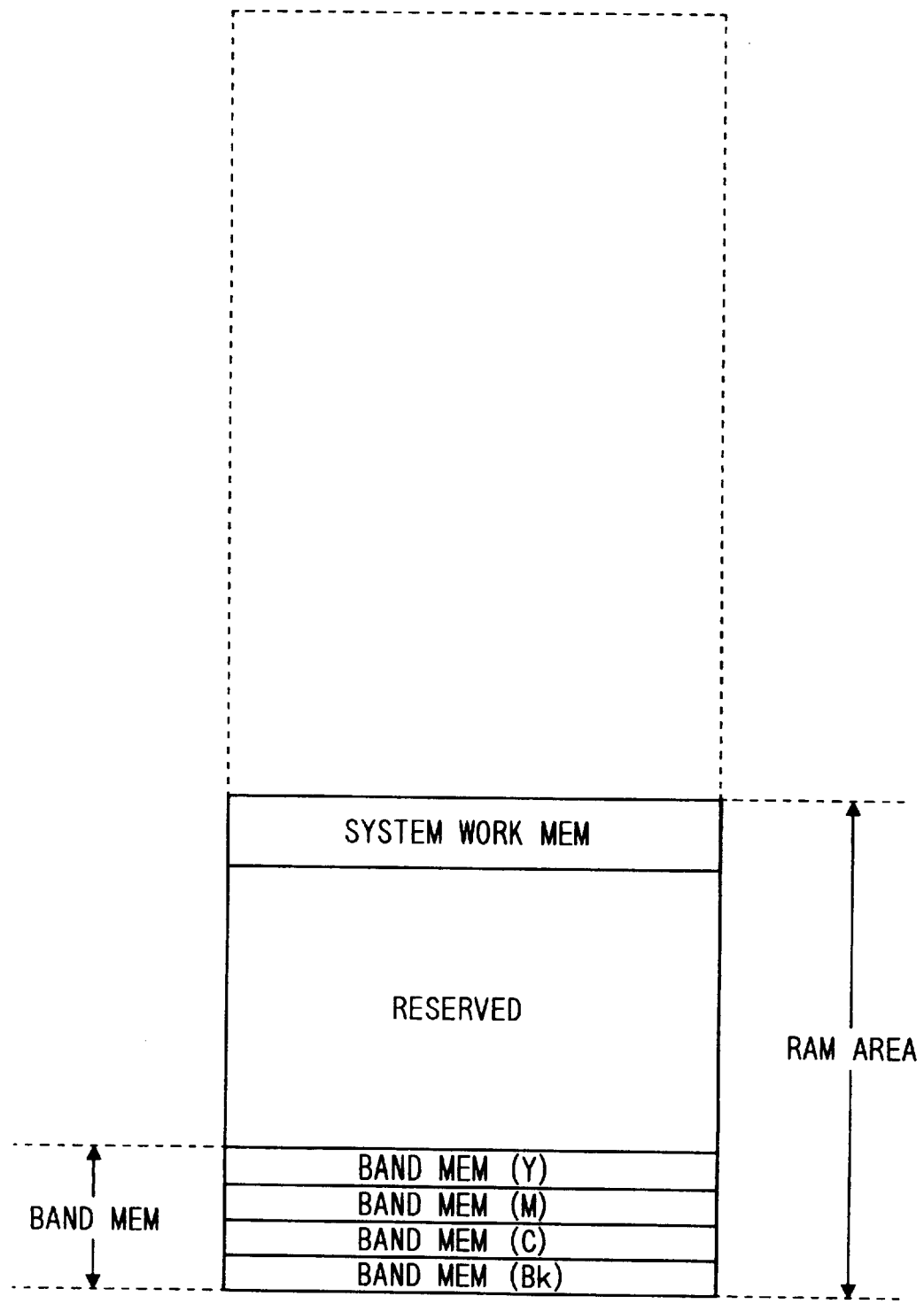

FIG. 128 shows an example of the memory map of a RAM area used upon execution of record control using one set of Y, M, C, and Bk band memories.

As can be understood from comparison with FIG. 19 showing the example of the memory map of the RAM area used execution of record control using two sets of Y, M, C, and Bk band memories, a reserved area that can be used for a character cache memory, and the like is large.

Figure 129:
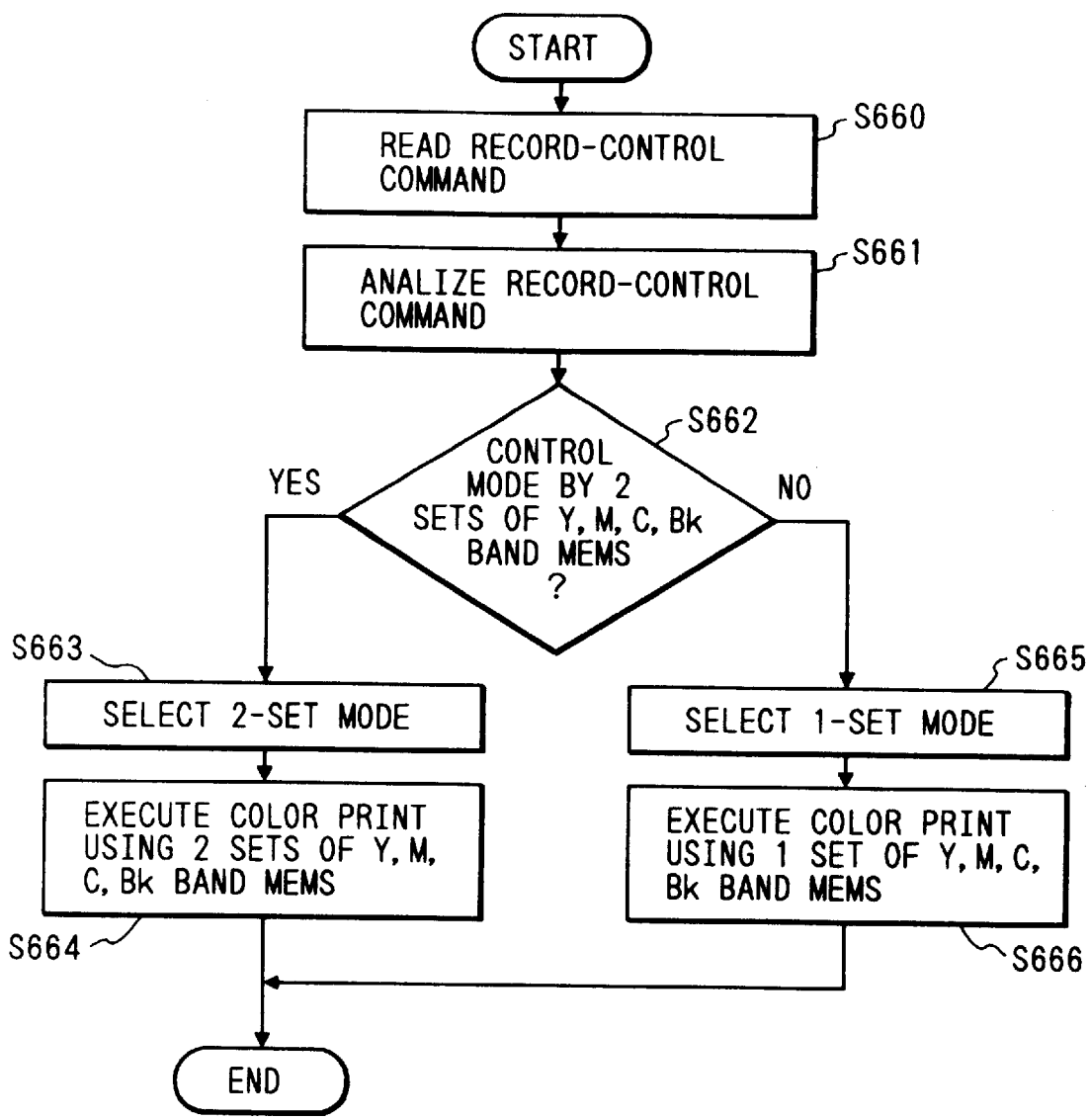

FIG. 129 is a flow chart showing processing for selecting a record control mode upon analysis of a record control command, and performing color print processing.

In step S660, a record control command is read, and the flow advances to step S661.

In step S661, the read control command is analyzed by the command analyzer 3, and the flow advances to step S662.

In step S662, the selected record control mode is checked.

If the control mode using two sets of Y, M, C, and Bk band memories is selected, the flow advances to step S663 to select a record control mode (2-set mode) using the two sets of Y, M, C, and Bk band memories. Thereafter, the flow advances to step S664 to perform color print processing using the two sets of Y, M, C, and Bk band memories, thus ending the processing.

If the control mode using one set of Y, M, C, and Bk band memories is selected, the flow advances to step S665 to select a record control mode (1-set mode) using one set of Y, M, C, and Bk band memories. Thereafter, the flow advances to step S666 to perform color print processing using one set of Y, M, C, and Bk band memories, thus ending the processing.

As described above, one of the color print mode using one set of Y, M, C, and Bk band memories, and the color print mode using two sets of Y, M, C, and Bk band memories can be selected by analyzing the record control command, and the color print processing can be performed in the selected mode.

Figure 130:
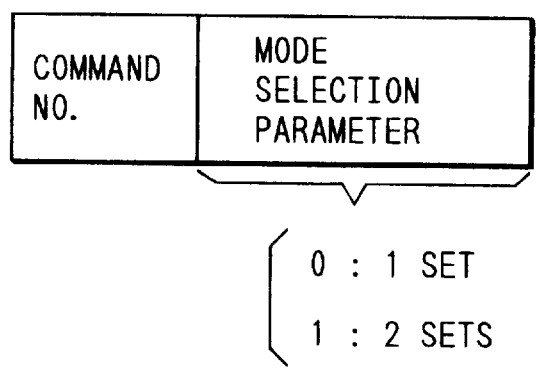

FIG. 130 shows an example of the record control command shown in FIG. 129.

As shown in FIG. 130, the record control command consists of a command No. for identifying a command, and a record control mode selection parameter.

When the value of the record control mode selection parameter is 0, it indicates the mode for performing color print control using one set of Y, M, C, and Bk band memories; when it is 1, it indicates the mode for performing color print control using two sets of Y, M, C, and Bk band memories.

Figure 131:
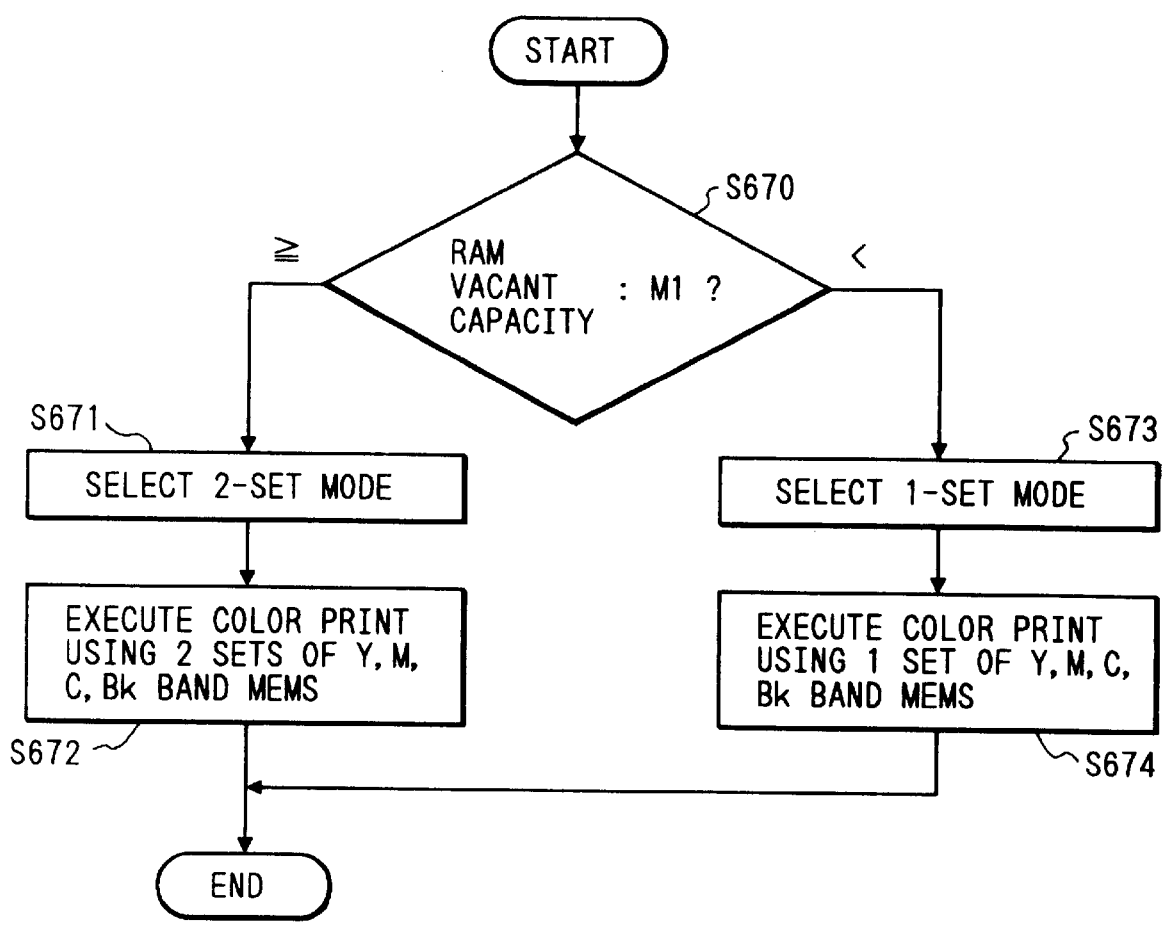

FIG. 131 is a flow chart showing processing for selecting the record control mode on the basis of a vacant capacity of the RAM area, and performing color print processing.

In step S670, the vacant capacity of the RAM area is compared with a constant M1 (a given capacity).

If the vacant capacity of the RAM area is equal to or larger than the constant M1, the flow advances to step S671 to select a record control mode (2-set mode) using the two sets of Y, M, C, and Bk band memories. Thereafter, the flow advances to step S672 to perform color print processing using the two sets of Y, M, C, and Bk band memories, thus ending the processing.

If the vacant capacity of the RAM area is smaller than the constant M1, the flow advances to step S673 to select a record control mode (1-set mode) using one set of Y, M, C, and Bk band memories. Thereafter, the flow advances to step S674 to perform color print processing using one set of Y, M, C, and Bk band memories, thus ending the processing.

As described above, one of the color print mode using one set of Y, M, C, and Bk band memories, and the color print mode using two sets of Y, M, C, and Bk band memories can be selected according to the vacant capacity of the RAM area, and the color print processing can be performed in the selected mode.

Figure 132:
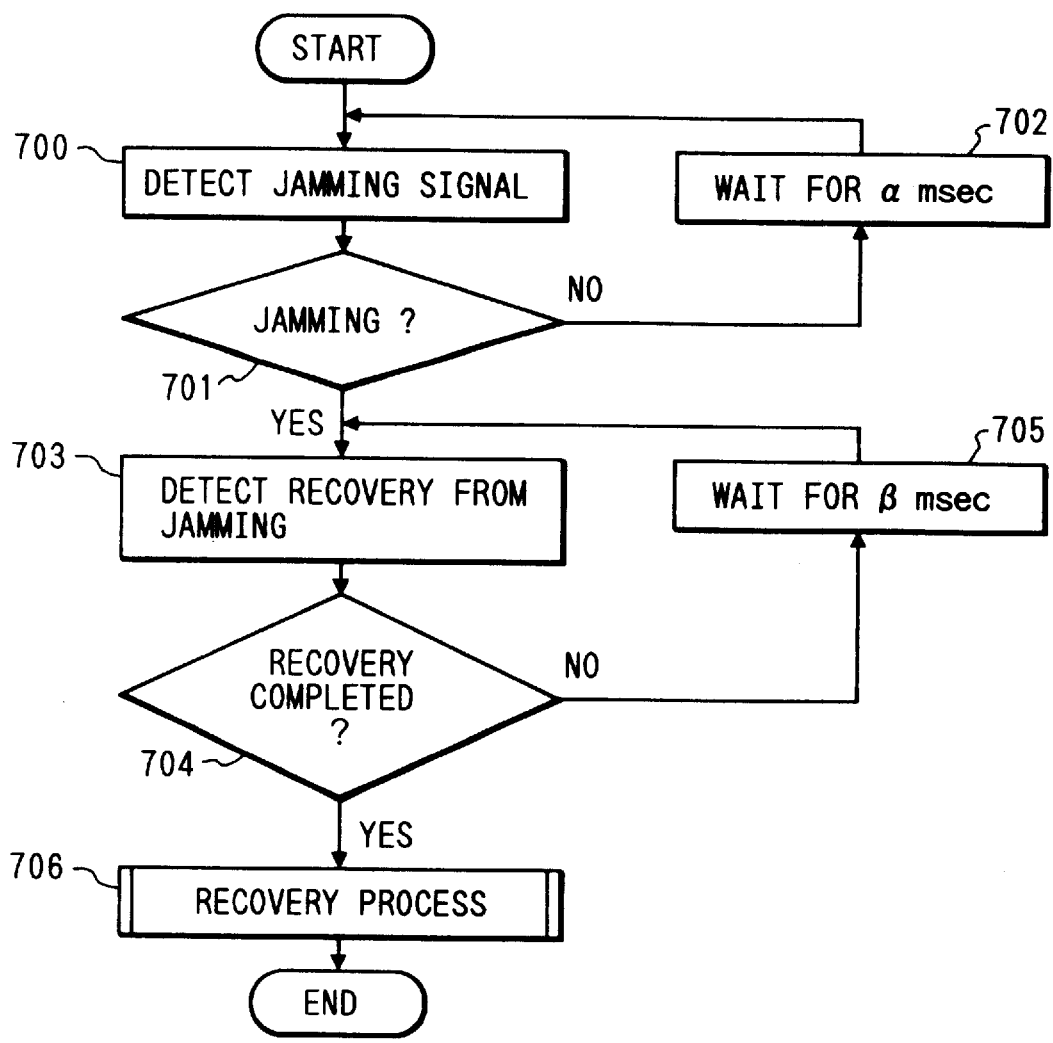

FIG. 132 is a flow chart showing jamming detection/recovery processing executed in step S6 and subsequent steps in FIG. 22, i.e., after page description commands in units of pages are analyzed, and setting for the path control table and formation of memory development information are completed.

In step S700, a jamming signal is detected, and the flow advances to step S701 to check if jamming occurs.

If NO in step S701, the flow advances to step S702, and the control waits for a time α (msec) [α is a constant]. If YES in step S701, recovery from jamming is detected in step S703. The flow then advances to step S704 if recovery from jamming is completed.

If NO in step S704, the flow advances to step S705, and the control waits for a time β (msec) [β is a constant]. Thereafter, the flow returns to step S703.

If YES in step S704, the flow advances to step S706, and jamming recovery processing is performed, thus ending processing.

FIGS. 133 and 134 are flow charts showing the jamming recovery processing in step S706 in FIG. 132.

In step S710, 0 is set in a constant i, and the flow advances to step S711.

In step S711, a pointer is set at the head of first memory development information (one set) stored in the memory development information area 13, and the flow advances to step S712.

In step S712, the memory development information read in step S711 is analyzed by the memory development analyzer 14 to develop the information onto the development memories (Y, M, C, and Bk band memories) corresponding to band i portions. Thereafter, the flow advances to step S713.

If it is determined in step S713 that another memory development information remains, the flow advances to step S714, and the pointer is set at the head of the next memory development information (one set). Thereafter, the flow returns to step S712.

If no information remains, the flow advances to step S715.

In step S715, the contents of the memories developed in step S712 are color-printed by the output unit 19, and the flow advances to step S176.

In step S176, i is incremented by one, and the flow advances to step S717.

In step S717, the Y, M, C, and Bk band memories are cleared, and the flow advances to step S718.

In step S718, the number of bands is compared with i. If a coincidence is found between them, the processing is ended.

If no coincidence is found between them, the flow advances to step S719, drawing attributes temporarily retreated in the retreat areas of the attributes area 12 in step S6 in FIG. 22 are loaded, and are set in the variable areas of attributes area 12. The flow then returns to step S711.

The processing in step S712 is the same as that in step S12 in FIG. 23, and the processing in step S715 is the same as that in step S15 in FIG. 23.

With the above-mentioned processing, jamming recovery processing can be performed using the content of the path control table set at the time of step S6 in FIG. 22.

What is claimed is:

1. An image processing method for receiving a coded record information in units of pages for use with a recording head, comprising the steps of:

analyzing the received coded record information to derive a minimum band number and a maximum band number of a band in which an object image represented by the coded record information exists, the band having a height which is an integer multiple of a height of the record head;

storing the minimum band number and the maximum band number derived in the analyzing step for each object image;

comparing the minimum band number and the maximum band number stored in the storing step with a current band number to obtain a comparison result; and determining, in response to the comparison result obtained in said comparing step, whether the object image is to be developed into dot data in the band.

2. A method according to claim 1, further comprising the steps of:

storing information of a specified area where the record information is recorded;

checking upon development of the record information into bit image data whether or not the bit image data is included in the specified area; and controlling operation so as not to develop the bit image data when the bit map data is not included in the specified area.

3. A method according to claim 1, further comprising the step of:

controlling to perform jamming recovery processing while holding a table information stored before detection of paper jam when it is detected that paper jam occurs during recording of the record information.

4. A method according to claim 1, further comprising the step of:

using an attribute information of an image to be drawn, the image having been used in a previous page, in development of a current page when the image to be drawn is included in the previous page.

5. A method according to claim 1, wherein said method is carried out in a printer.

6. A method according to claim 1, wherein the height of the band is determined to correspond to the height of the record head.

7. A method according to claim 1, wherein the band in which a certain object is drawn is obtained by dividing a start coordinate of the certain object by the height of the band and by dividing an end coordinate of the certain object by the band height.

8. A method according to claim 1, wherein the record information for each object comprises the minimum band number and the maximum band number.

9. A method according to claim 1, wherein the coded record information representing a certain object includes coordinates of a start point and an end point of the certain object.

10. A method according to claim 1, wherein the coded record information is received from a host computer.

11. A method according to claim 1, further comprising the steps of:

discriminating a storage area for developing the record information into bit image data; and determining a development range based on a result of the discriminating.

12. An image processing apparatus which receives a coded record information in units of pages for use with a recording head, comprising:

analyzing means for analyzing the received coded record information to derive a minimum band number and a maximum band number of a band in which an object image represented by the coded record information exists, the band having a height which is an integer multiple of a height of the record head;

storing means for storing the minimum band number and the maximum band number derived by said analyzing means for each object image;

comparing means for comparing the minimum band number and the maximum band number stored in said storing means with a current band number to obtain a comparison result; and determining means for determining, in response to the comparison result obtained by said comparing means, whether the object image is to be developed into dot data in the band.

13. An apparatus according to claim 12, further comprising:

discrimination means for discriminating a storage area for developing the record information into bit image data; and determination means for determining a development range based on a discrimination result.

14. An apparatus according to claim 12, further comprising:

storage means for storing information of a specified area where the record information is recorded;

checking means for checking upon development of the record information into bit image data whether or not the bit image data is included in the specified area; and control means for, controlling operation so as not to develop the bit image data when the bit image data is not included in the specified area.

15. An apparatus according to claim 12, further comprising control means for controlling to perform a jamming recovery processing while holding information in a table before detection of a paper jam, when it is detected that the paper jam occurs during recording of the record information.

16. An apparatus according to claim 12, further comprising control means for using an attribute information of an image, the image having been included in a previous page, in development of a current page.

17. An image processing apparatus according to claim 12, wherein said apparatus is a printer.

18. An image processing apparatus according to claim 12, wherein the height of the band is determined to correspond to the height of the record head.

19. An image processing apparatus according to claim 12, wherein the band in which a certain object is drawn is obtained by dividing a start coordinate of the certain object by the height of the band and by dividing an end coordinate of the certain object by the band height.

20. An image processing apparatus according to claim 12, wherein the record information for each object comprises the minimum band number and the maximum band number.

21. An image processing apparatus according to claim 12, wherein the coded record information representing a certain object includes coordinates of a start point and an end point of the certain object.

22. An image processing apparatus according to claim 12, wherein the coded record information is received from a host computer.

23. A computer readable memory medium in which is stored a computer readable program to be executed by a computer to receive a coded record information in units of pages for use with a recording head, the computer readable program comprising the steps of:

analyzing the received coded record information to derive a minimum band number and a maximum band number of a band in which an object image represented by the coded record information exists, the band having a height which is an integer multiple of a height of the record head;

storing the minimum band number and the maximum band number derived in the analyzing step for each object image;

comparing the minimum band number and the maximum band number stored in the storing step with a current band number to obtain a comparison result; and determining, in response to the comparison result obtained in said comparing step, whether the object image is to be developed into dot data in the band.

* * * * *